(12) United States Patent
Momo et al.

(10) Patent No.: US 10,581,060 B2
(45) Date of Patent: Mar. 3, 2020

(54) APPARATUS, SECONDARY BATTERY, MANUFACTURING METHOD, AND ELECTRONIC DEVICE

(71) Applicant: Semiconductor Energy Laboratory Co., Ltd., Atsugi-shi, Kanagawa-ken (JP)

(72) Inventors: Junpei Momo, Sagamihara (JP); Yohei Momma, Isehara (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 993 days.

(21) Appl. No.: 15/046,877

(22) Filed: Feb. 18, 2016

(65) Prior Publication Data

US 2016/0248077 A1 Aug. 25, 2016

(30) Foreign Application Priority Data

Feb. 24, 2015 (JP) ................. 2015-034223

(51) Int. Cl.
*H01M 4/04* (2006.01)
*H01M 10/0525* (2010.01)
*H01M 4/485* (2010.01)
*H01M 4/587* (2010.01)

(52) U.S. Cl.
CPC ..... *H01M 4/0452* (2013.01); *H01M 10/0525* (2013.01); *H01M 4/485* (2013.01); *H01M 4/587* (2013.01); *H01M 2220/30* (2013.01)

(58) Field of Classification Search
CPC .......... H01M 4/0452; C25C 3/02; C25C 1/22
See application file for complete search history.

(56) References Cited

U.S. PATENT DOCUMENTS

| 4,764,853 | A | 8/1988 | Thomas et al. |
| 5,100,519 | A | 3/1992 | Tsubomura et al. |
| 5,721,067 | A | 2/1998 | Jacobs et al. |
| 6,134,902 | A | 10/2000 | Curry |
| 6,200,707 | B1 | 3/2001 | Takada et al. |
| 7,179,561 | B2 | 2/2007 | Niu et al. |

(Continued)

FOREIGN PATENT DOCUMENTS

| CN | 101962782 A | 2/2011 |
| EP | 2843748 A | 3/2015 |

(Continued)

OTHER PUBLICATIONS

Chinese Office Action (Application No. 201610100897.4) dated Oct. 8, 2019.

*Primary Examiner* — Barbara L Gilliam
*Assistant Examiner* — Nathanael T Zemui
(74) *Attorney, Agent, or Firm* — Robinson Intellectual Property Law Office; Eric J. Robinson

(57) ABSTRACT

A lithium-ion secondary battery having stable charge characteristics and lifetime characteristics is manufactured. Before the secondary battery is completed, a positive electrode is subjected to an electrochemical reaction in a large amount of electrolyte solution in advance, so that the positive electrode can have stability. The use of the positive electrode enables the secondary battery to be highly reliable. If a negative electrode is also subjected to an electrochemical reaction in a large amount of electrolyte solution in advance, the secondary battery can be more highly reliable.

12 Claims, 31 Drawing Sheets

(56) References Cited

U.S. PATENT DOCUMENTS

| | | |
|---|---|---|
| 7,745,047 B2 | 6/2010 | Zhamu et al. |
| 7,842,432 B2 | 11/2010 | Niu et al. |
| 7,939,218 B2 | 5/2011 | Niu |
| 7,977,007 B2 | 7/2011 | Niu et al. |
| 7,977,013 B2 | 7/2011 | Niu et al. |
| 8,278,011 B2 | 10/2012 | Zhu et al. |
| 8,884,845 B2 | 11/2014 | Yamazaki et al. |
| 9,847,524 B2 | 12/2017 | Yamamoto et al. |
| 2001/0010289 A1 | 8/2001 | Imaya et al. |
| 2005/0079423 A1 | 4/2005 | Matsubara et al. |
| 2007/0122706 A1 | 5/2007 | Inoue et al. |
| 2007/0295718 A1 | 12/2007 | Takei et al. |
| 2008/0254296 A1 | 10/2008 | Handa et al. |
| 2008/0261112 A1 | 10/2008 | Nagata et al. |
| 2009/0045680 A1 | 2/2009 | Litch et al. |
| 2009/0070988 A1 | 3/2009 | Honda et al. |
| 2009/0123850 A1 | 5/2009 | Takeuchi et al. |
| 2010/0035093 A1 | 2/2010 | Ruoff et al. |
| 2010/0081057 A1 | 4/2010 | Liu et al. |
| 2010/0143798 A1 | 6/2010 | Zhamu et al. |
| 2010/0176337 A1 | 7/2010 | Zhamu et al. |
| 2010/0248023 A1 | 9/2010 | Tsuruta et al. |
| 2010/0248034 A1 | 9/2010 | Oki et al. |
| 2010/0310941 A1 | 12/2010 | Kumta et al. |
| 2010/0330421 A1 | 12/2010 | Cui et al. |
| 2011/0012067 A1 | 1/2011 | Kay |
| 2011/0111303 A1 | 5/2011 | Kung et al. |
| 2011/0121240 A1 | 5/2011 | Amine et al. |
| 2011/0159372 A1 | 6/2011 | Zhamu et al. |
| 2011/0229795 A1 | 9/2011 | Niu et al. |
| 2011/0244328 A1 | 10/2011 | Iriyama et al. |
| 2011/0291240 A1 | 12/2011 | Yamazaki |
| 2011/0292564 A1 | 12/2011 | Yamazaki |
| 2012/0279055 A1 | 11/2012 | Tsuruta et al. |
| 2013/0017443 A1 | 1/2013 | Yamazaki |
| 2013/0067726 A1 | 3/2013 | Kuriki et al. |
| 2016/0006017 A1 | 1/2016 | Momma et al. |
| 2016/0028133 A1* | 1/2016 | Miles .................... H01M 12/02 429/405 |
| 2016/0111710 A1 | 4/2016 | Momo et al. |
| 2016/0190545 A1 | 6/2016 | Momo et al. |

FOREIGN PATENT DOCUMENTS

| | | |
|---|---|---|
| JP | 08-255635 A | 10/1996 |
| JP | 10-223259 A | 8/1998 |
| JP | 10-512712 | 12/1998 |
| JP | 2002-093411 A | 3/2002 |
| JP | 2005-157317 A | 6/2005 |
| JP | 2005-302630 A | 10/2005 |
| JP | 2006-190556 A | 7/2006 |
| JP | 2006-216451 A | 8/2006 |
| JP | 2007-305475 A | 11/2007 |
| JP | 2008-098155 A | 4/2008 |
| JP | 2008-159316 A | 7/2008 |
| JP | 2009-076372 A | 4/2009 |
| JP | 2010-232037 A | 10/2010 |
| JP | 2013-069418 A | 4/2013 |
| WO | WO-1997/031401 | 8/1997 |
| WO | WO-2013/161445 | 10/2013 |

* cited by examiner

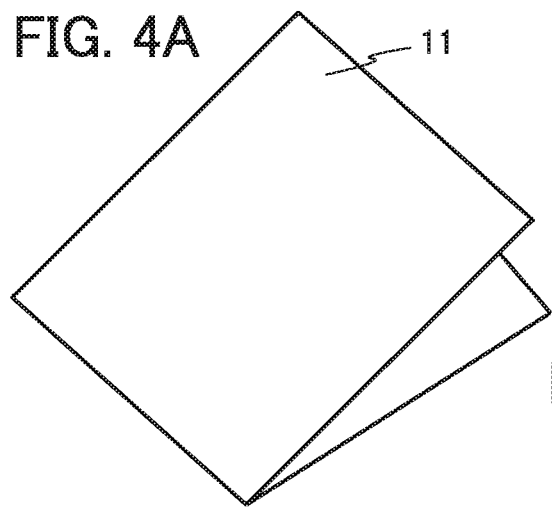
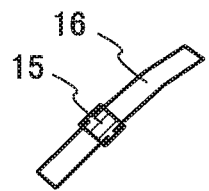
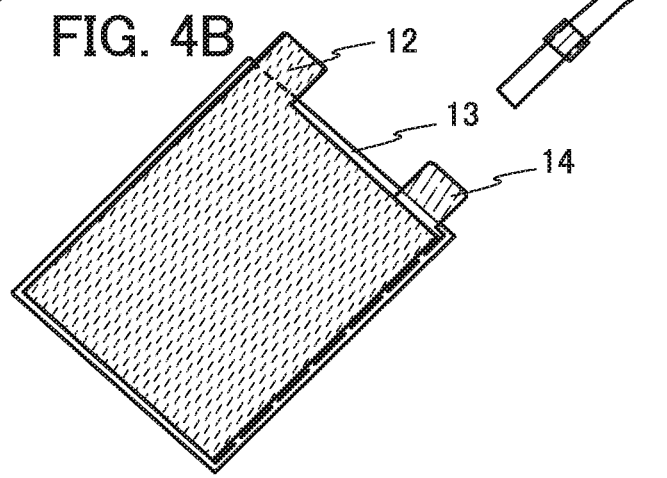
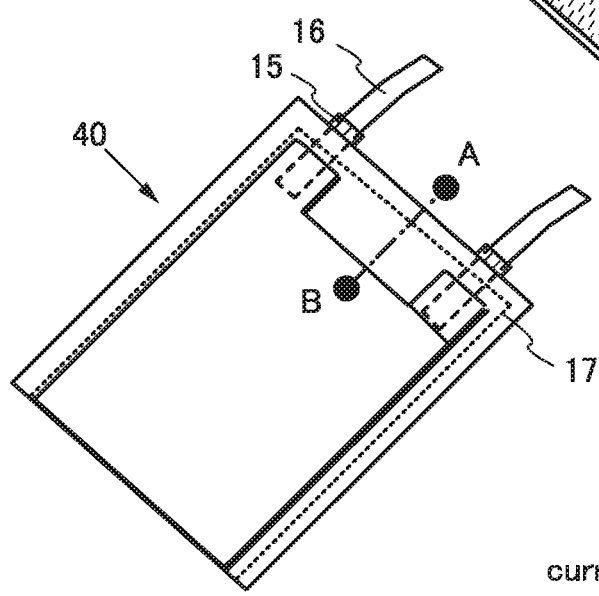
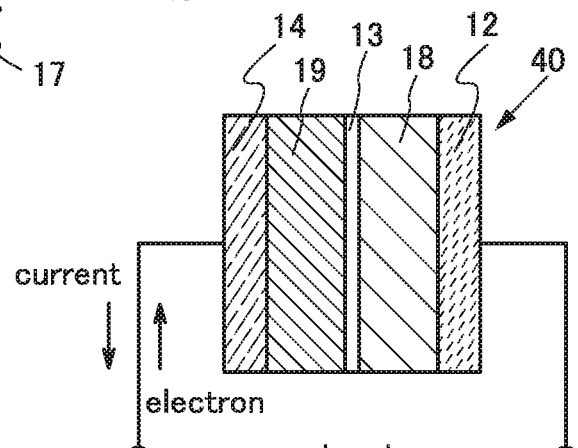
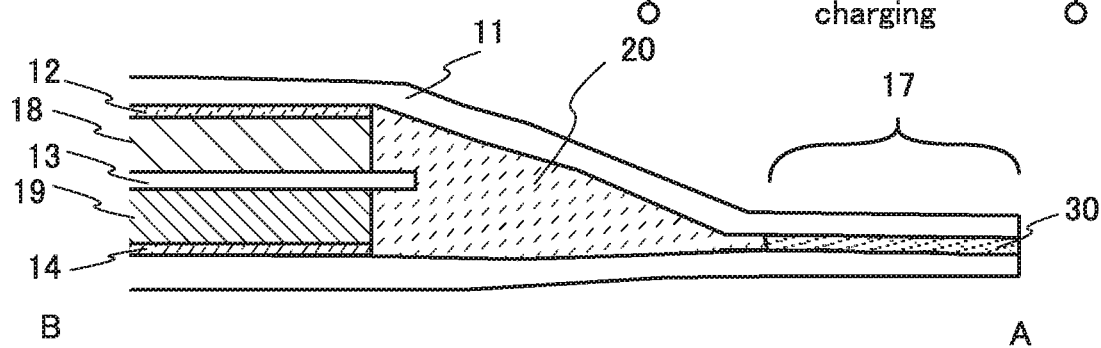

FIG. 16A
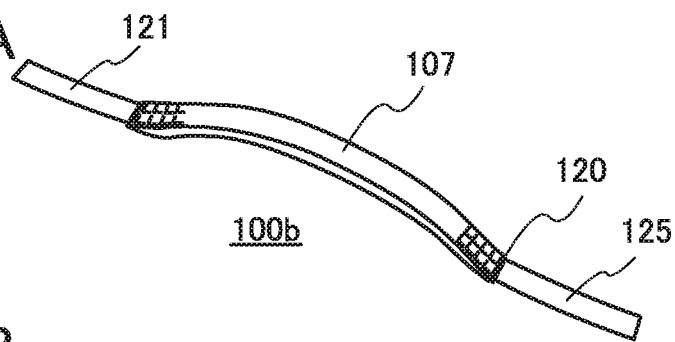
FIG. 16B
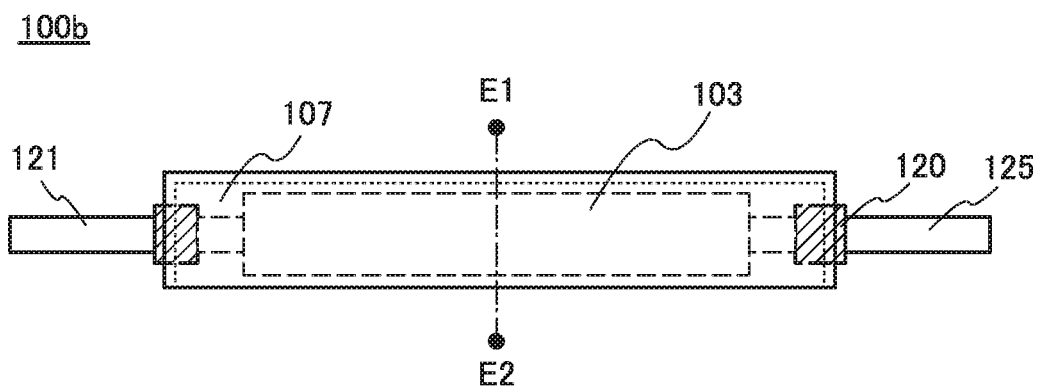
FIG. 16C1
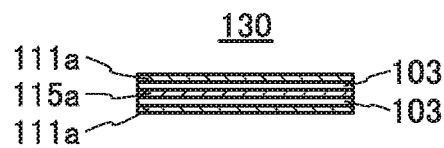
FIG. 16C2
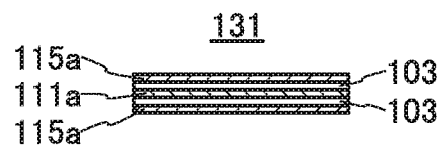
FIG. 16D
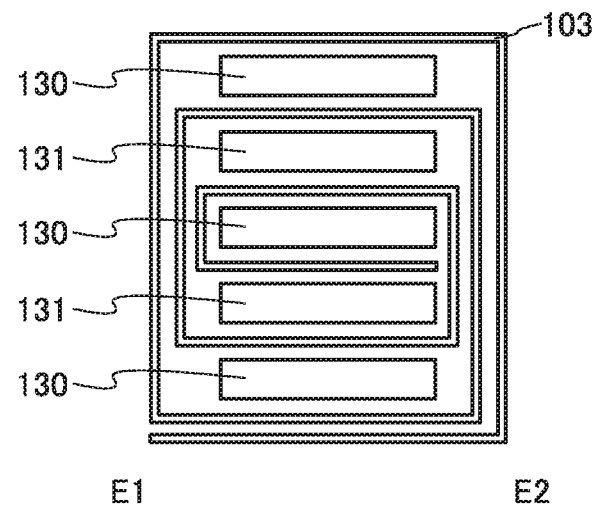

FIG. 19A1
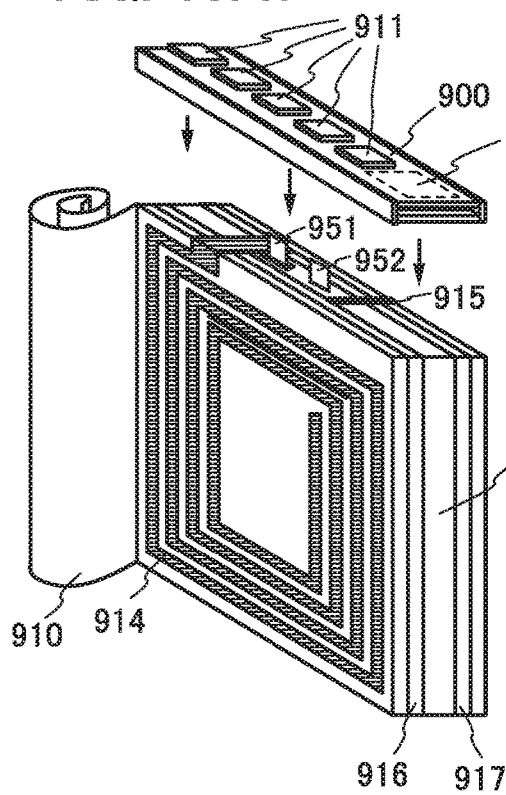
FIG. 19A2
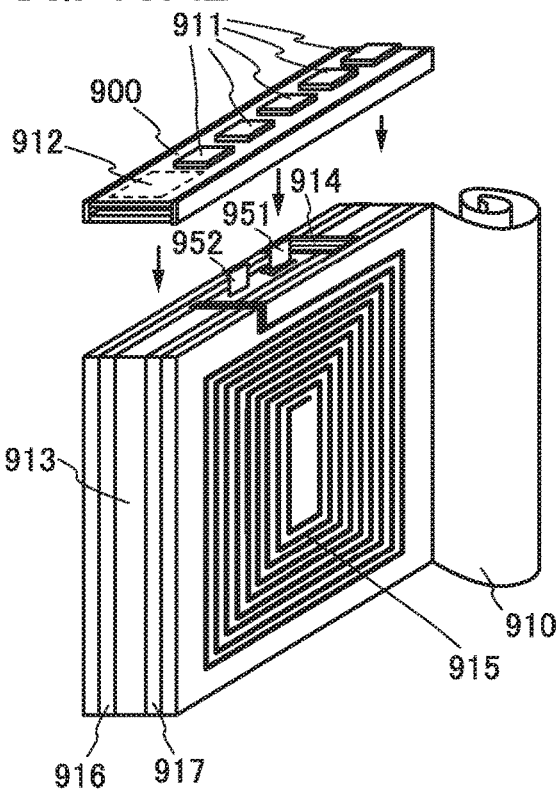
FIG. 19B1
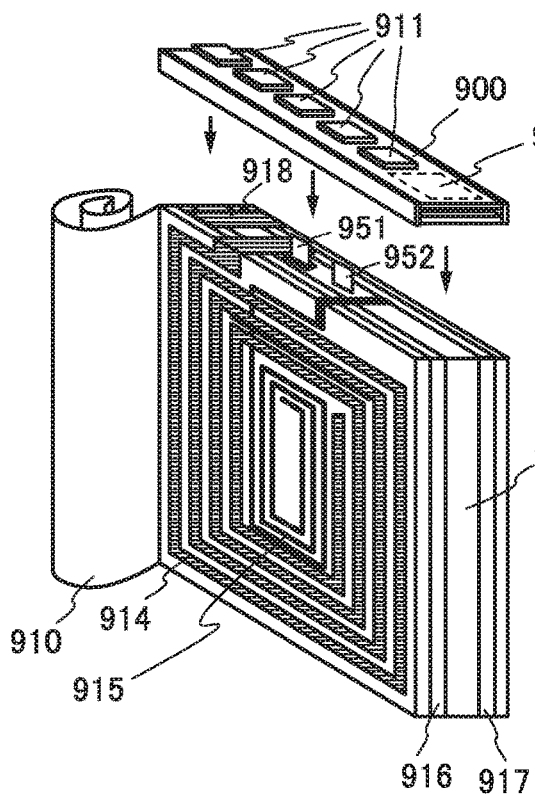
FIG. 19B2
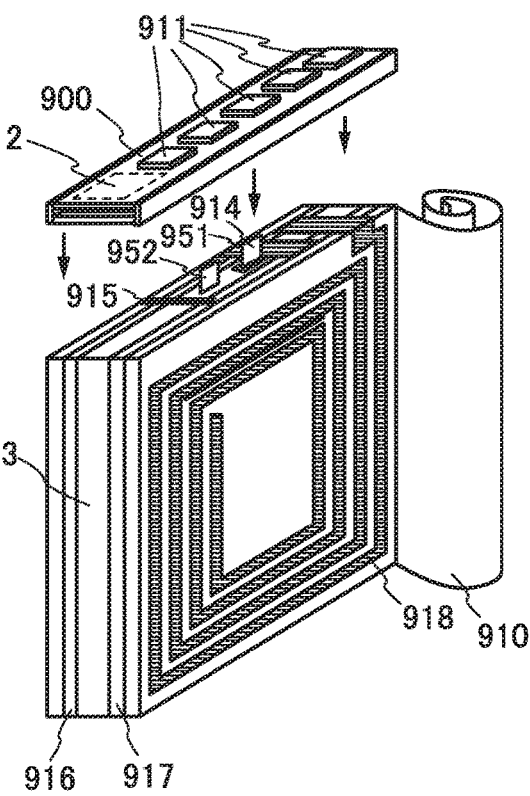

APPARATUS, SECONDARY BATTERY, MANUFACTURING METHOD, AND ELECTRONIC DEVICE

BACKGROUND OF THE INVENTION

1. Field of the Invention

One embodiment of the present invention relates to a semiconductor device, a display device, a light-emitting device, a power storage device, a driving method therefor, and a manufacturing method thereof. In particular, one embodiment of the present invention relates to a manufacturing apparatus for a storage battery.

Note that electronic devices in this specification mean all devices which operate by being supplied with electric power, and electronic devices including power sources, electronic devices and electro-optical devices including power sources such as storage batteries, information terminal devices including storage batteries, vehicles including storage batteries, and the like are all electronic devices.

2. Description of the Related Art

In recent years, portable information terminals typified by smartphones have been actively developed. Portable information terminals, which are a kind of electronic devices, are desired to be lightweight and compact for users.

Patent Document 1 discloses an example of a hands-free wearable device with which information can be visually obtained anywhere, specifically, a goggle-type display device that includes a CPU and allows data communication. The device disclosed in Patent Document 1 is also a kind of electronic device.

Most wearable devices and portable information terminals include batteries (secondary batteries) that can be repeatedly charged and discharged, and have problems in that there is a limitation on the operation time of the wearable devices and the portable information terminals because of their lightness and compactness. Secondary batteries used in wearable devices and portable information terminals should be lightweight and should be able to be used for a long time.

Examples of the secondary batteries include a nickel-metal hydride battery and a lithium-ion secondary battery. In particular, lithium-ion secondary batteries have been actively developed because the capacity thereof can be increased and the size thereof can be reduced.

Electrodes serving as positive electrodes or negative electrodes of lithium-ion secondary batteries are formed using, for example, a lithium metal, a carbon-based material, or an alloy-based material. Lithium-ion secondary batteries are divided into lithium metal batteries, lithium-ion secondary batteries, and lithium polymer secondary batteries according to the kind of an electrolyte. Furthermore, batteries are divided into thin batteries (also referred to as laminated batteries), cylindrical batteries, coin-type batteries, and rectangular batteries according to the kind of an exterior material in which electrodes and an electrolyte are packed.

REFERENCE

Patent Document

[Patent Document 1] Japanese Published Patent Application No. 2005-157317

SUMMARY OF THE INVENTION

A lithium-ion secondary battery including an electrolyte solution is manufactured in such a manner that a positive electrode (e.g., a lithium-containing oxide material), a negative electrode (e.g., carbon), or another member is surrounded by an exterior material, the electrolyte solution is put into the surrounded region, and the exterior material is sealed. The first charge is performed after the completion of the lithium-ion secondary battery or before sealing.

In the first charge, which is also called the initial charge, a chemical reaction occurs at a surface of an electrode or at an interface between the electrode and the electrolyte solution. When the electrolyte solution is decomposed near the positive electrode or the negative electrode, a gas might be generated; this often occurs especially near the negative electrode. However, a gas is likely to be generated near the positive electrode when the positive electrode contains a high-potential active material. In charge, lithium ions released from the lithium-containing oxide material are transferred to and inserted into the negative electrode. At this time, a product (product A) generated by the decomposition of the electrolyte solution might react with lithium to form an unnecessary component (product B) for the insertion of lithium ions. This product B might affect the transfer of lithium ions and the like, leading to a change in the characteristics of the battery. Furthermore, although lithium inside the battery is consumed by the formation of the product B, which is irrelevant to the battery capacity, lithium is not supplied from the outside; thus, the battery capacity is reduced as the number of effective carrier ions becomes smaller.

Not only in the initial charge, but whenever a gas is generated in the secondary battery, a sealed region expands and thus the secondary battery expands, which might deteriorate the characteristics of the battery.

An object of one embodiment of the present invention is to provide a manufacturing apparatus for a lithium-ion secondary battery having stable charge characteristics and lifetime characteristics.

Another object of one embodiment of the present invention is to provide a method for manufacturing a lithium-ion secondary battery having stable charge characteristics and lifetime characteristics.

Another object of one embodiment of the present invention is to provide a novel electrolyte solution that can be used for manufacturing a lithium-ion secondary battery having stable charge characteristics and lifetime characteristics.

Another object of one embodiment of the present invention is to provide a novel lithium-ion secondary battery, a novel manufacturing apparatus for a lithium-ion secondary battery, a novel method for manufacturing a lithium-ion secondary battery, or a novel electrolyte solution. Note that the descriptions of these objects do not preclude the existence of other objects. In one embodiment of the present invention, there is no need to achieve all the objects. Other objects can be derived from the descriptions of the specification, the drawings, and the claims.

In one embodiment of the present invention, during the manufacture of a secondary battery, a positive electrode is fully electrochemically reacted in a large amount of electrolyte solution to form a reaction product, typified by a gas, in advance. Then, the reacted positive electrode is used to manufacture the secondary battery.

Before a secondary battery is completed, a positive electrode is subjected to an electrochemical reaction in a large amount of electrolyte solution in advance, so that the positive electrode can have stability. The use of the positive electrode enables the secondary battery to be highly reliable. Note that the quality of the large amount of electrolyte solution is partly changed by the initial charge. This large amount of electrolyte solution containing a reaction product is not used to manufacture the secondary battery, but a small amount of electrolyte solution prepared separately is used. The use of the positive electrode subjected to the initial charge hardly causes generation of a reaction product by a reaction with the small amount of electrolyte solution.

Like the positive electrode, a negative electrode is subjected to an electrochemical reaction in an electrolyte solution before the secondary battery is completed, whereby the negative electrode can have stability.

In the case where the initial charge is performed before the secondary battery is completed, the initial charge in an air atmosphere is desirable from the viewpoints of workability and simplicity of facilities and the like. The use of an air atmosphere might cause deterioration of electrode characteristics if moisture or the like in the air is dissolved in the electrolyte solution and is taken into the electrode as an impurity during the initial charge. However, with a manufacturing apparatus and a manufacturing method of one embodiment of the present invention, a component that easily reacts with the impurity is mixed in the electrolyte solution, so that the component can capture the impurity by reacting with the impurity. This is a feature of the manufacturing apparatus and the manufacturing method of one embodiment of the present invention. Accordingly, an impurity can be prevented from entering the electrode during pretreatment of the electrode, leading to an improvement in electrode characteristics.

A manufacturing apparatus for a battery of one embodiment of the present invention includes a container, a means for holding first to third electrodes, a control means, and a cord. The container has a function of holding an electrolyte solution. The control means has a function of applying potentials to the first to third electrodes. An electrochemical reaction apparatus of one embodiment of the present invention includes a container, a first electrode, a second electrode, a third electrode, an electrolyte solution, and a control means. The electrolyte solution is in the container, and contains lithium and an alkali metal other than lithium. The first electrode, the second electrode, and the third electrode are positioned in the electrolyte solution so as to be separated from each other. The control means has a function of applying potentials to the first electrode, the second electrode, and the third electrode.

A manufacturing method of a battery of one embodiment of the present invention includes a first step and a second step. In the first step, an electrolyte solution is poured into a container, first to third electrodes are put in the electrolyte solution, and a potential is applied to the first electrode. In the second step, potentials are applied to the second electrode and the third electrode to cause an electrochemical reaction. The electrolyte solution contains lithium and an alkali metal other than lithium. The potential applied to the first electrode in the first step is higher than or equal to a lithium equilibrium potential and lower than an equilibrium potential of the alkali metal other than lithium. In the first step, the alkali metal other than lithium is deposited on a surface of the first electrode. In the second step, the alkali metal other than lithium deposited on the surface of the first electrode reacts with an impurity.

In the manufacturing method of a battery, the alkali metal other than lithium preferably includes at least one of Na, K, Rb, Cs, and Fr. It is particularly preferable that at least one of Na and K be included. In the manufacturing method of a battery, the first electrode preferably contains the alkali metal other than lithium. In the manufacturing method of a battery, the second electrode preferably contains a lithium metal.

In the manufacturing method of a battery of one embodiment of the present invention, processing of the electrodes is performed through the following three steps: (1) the first electrode is applied with a potential higher than or equal to a lithium equilibrium potential and lower than an equilibrium potential of the alkali metal other than lithium, so that an ion of the alkali metal other than lithium dissolved in the electrolyte solution is deposited as an alkali metal on the surface of the first electrode; (2) the alkali metal other than lithium deposited on the surface of the first electrode is made to react with an impurity; and (3) potentials are applied to the second electrode and the third electrode, so that the initial charge is performed. Note that it is preferable to change a potential of the first electrode after the alkali metal is deposited on the surface of the first electrode.

To deposit the alkali metal other than lithium on the first electrode, a control device that controls the potential of the first electrode can be electrically connected to the first electrode.

The electrolyte solution used in the manufacturing method of a secondary battery of one embodiment of the present invention contains a lithium ion serving as a carrier when the secondary battery completed through the processing of the electrodes is used, and an alkali metal ion other than the lithium ion used for the removal of an impurity.

The potential of the first electrode is adjusted, so that the alkali metal other than lithium dissolved in the electrolyte solution is deposited on the surface of the first electrode. Then, the deposited alkali metal other than lithium is made to react with an impurity such as water or oxygen in the electrolyte solution, so that the impurity is removed.

To adjust the potential of the first electrode, the control device electrically connected to the first electrode is turned on or off by a switch or the like, or a potential of the control device electrically connected to the first electrode is adjusted.

If an alkali metal itself is put in the electrolyte solution and made to react with an impurity such as water or oxygen to remove the impurity, the alkali metal needs to be transferred to the container; however, it is too difficult to transfer the alkali metal because the alkali metal reacts in the air quickly in general. Thus, instead of the alkali metal, a material that hardly reacts with the electrolyte solution is used for the first electrode. In the electrolyte solution, an alkali metal other than lithium is deposited on the first electrode, and the deposited alkali metal other than lithium is made to react with an impurity to remove the impurity. In this manner, an effect that can be produced when the alkali metal is put in the electrolyte solution can also be produced without dealing with the highly reactive alkali metal in the air. This is a feature of the manufacturing apparatus and the manufacturing method for a secondary battery of one embodiment of the present invention.

In general, an alkali metal has a foil or block shape with a flat surface. Meanwhile, the flatness of a surface of the alkali metal other than lithium deposited on the first electrode using one embodiment of the present invention depends on the deposition rate of the alkali metal other than lithium. Thus, the flatness of the surface can be changed by adjusting the deposition rate of the alkali metal other than lithium; the surface area of the alkali metal other than lithium can be increased depending on the conditions, leading to an increase in the reactivity of the alkali metal other than lithium with an impurity in the electrolyte solution.

The surface shape of the deposited alkali metal other than lithium is dependent on the surface shape of the first electrode. Forming projections and depressions on the surface of the first electrode is also effective to increase the surface area of the alkali metal other than lithium because the alkali metal other than lithium is deposited along the uneven surface. In that case, the reactivity of the alkali metal other than lithium with an impurity in the electrolyte solution can be increased.

Note that the second electrode is a counter electrode. The third electrode is a positive electrode or a negative electrode of the secondary battery subjected to the initial charge. To perform the initial charge, an electric field is applied between the second electrode and the third electrode.

One embodiment of the present invention can provide a manufacturing apparatus for a lithium-ion secondary battery having stable charge characteristics and lifetime characteristics.

One embodiment of the present invention can provide a method for manufacturing a lithium-ion secondary battery having stable charge characteristics and lifetime characteristics.

One embodiment of the present invention can provide a novel electrolyte solution that can be used for manufacturing a lithium-ion secondary battery having stable charge characteristics and lifetime characteristics.

One embodiment of the present invention can provide a novel lithium-ion secondary battery, a novel manufacturing apparatus for a lithium-ion secondary battery, a novel method for manufacturing a lithium-ion secondary battery, or a novel electrolyte solution. Note that the description of these effects does not preclude the existence of other effects. In one embodiment of the present invention, there is no need to achieve all the effects described above.

BRIEF DESCRIPTION OF THE DRAWINGS

FIGS. 4A to 4F illustrate a manufacturing method of a thin secondary battery of one embodiment of the present invention.

FIGS. 16A, 16B, 16C1, 16C2, and 16D are a perspective view, a top view, and cross-sectional views illustrating a structure example of a secondary battery.

FIGS. 19A1, 19A2, 19B1, and 19B2 illustrate examples of a power storage system.

DETAILED DESCRIPTION OF THE INVENTION

Figure 1:
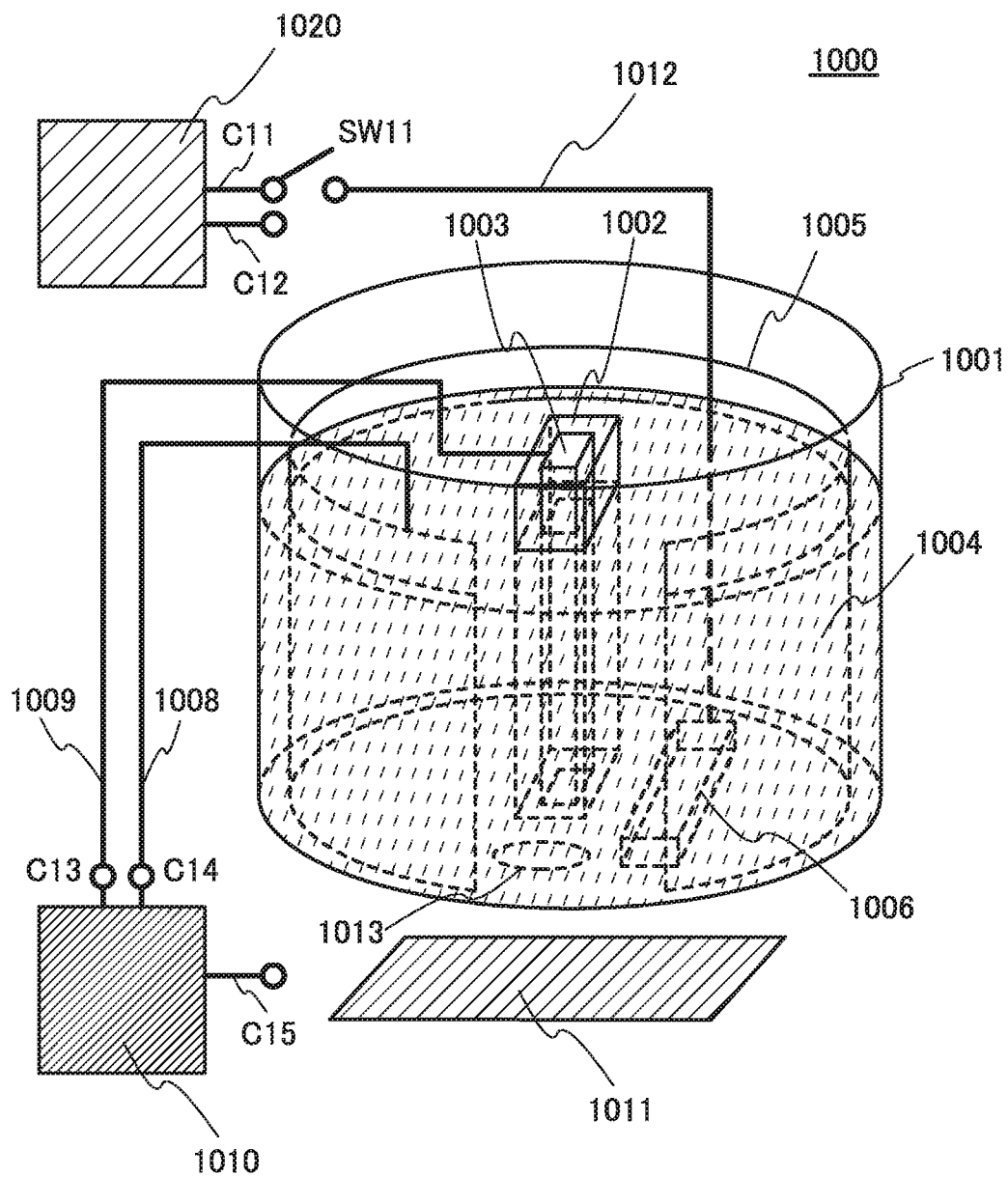
FIG. 1 is a schematic perspective view illustrating a manufacturing apparatus of one embodiment of the present invention.

Embodiments of the present invention will be described below in detail with reference to the drawings. However, the present invention is not limited to the descriptions below, and it is easily understood by those skilled in the art that modes and details disclosed herein can be modified in various ways. Furthermore, the present invention is not construed as being limited to the descriptions of the embodiments.

The term "electrically connected" includes the case where components are connected through an "object having any electric function." There is no particular limitation on the "object having any electric function" as long as electric signals can be transmitted and received between the components connected through the object. Accordingly, even when the expression "electrically connected" is used, there is a case in which no physical connection is made and a wiring is just extended in an actual circuit.

The position, size, range, or the like of each component illustrated in drawings is not accurately illustrated in some cases for simplification. Thus, the disclosed invention is not necessarily limited to the position, size, range, or the like disclosed in the drawings. In addition, some components might not be illustrated for easy understanding.

Ordinal numbers such as "first," "second," and "third" in this specification and the like are used in order to avoid confusion among components and do not denote the priority or the order such as the order of steps or the stacking order. A term without an ordinal number in this specification and the like might be provided with an ordinal number in a claim in order to avoid confusion among components. A term with an ordinal number in this specification and the like might be provided with a different ordinal number in a claim. Moreover, a term with an ordinal number in this specification and the like might not be provided with any ordinal number in a claim.

Note that in all drawings used to illustrate the embodiments, portions that are identical or portion having similar functions are denoted by the same reference numerals, and their repetitive description may be omitted.

Embodiment 1

In this embodiment, a manufacturing method and a manufacturing apparatus for an electrode for a secondary battery of one embodiment of the present invention will be described with reference to FIG. 1, FIGS. 2A and 2B, FIG. 3, and FIGS. 4A to 4F.

[Structure of Secondary Battery]

FIG. 4A is a perspective view of an exterior body 11 of a secondary battery 40. FIG. 4B is a perspective view in which a positive electrode, a separator, and a negative electrode are stacked. FIG. 4C illustrates lead electrodes 16 for leading the positive electrode and the negative electrode to the outside of the exterior body, and each lead electrode includes a sealing layer 15. FIG. 4D is a perspective view of the secondary battery 40. FIG. 4E illustrates an example of a cross section of the secondary battery 40 taken along dashed-dotted line A-B in FIG. 4D. FIG. 4F illustrates a current flow in charging the secondary battery 40.

<<Exterior Body>>

A sheet made of a flexible base material is used as the exterior body 11. As the sheet, a stack, a metal film provided with an adhesive layer (also referred to as a heat-seal layer) or sandwiched between adhesive layers, is used. As the adhesive layer, a heat-seal resin film containing polypropylene, polyethylene, or the like is used. In this embodiment, a metal sheet, specifically, aluminum foil one surface of which is provided with a nylon resin and the other surface of which is provided with a stack including an acid-resistant polypropylene film and a polypropylene film is used as the sheet. In FIG. 4A, the sheet is cut and folded in half.

<<Electrode>>

The positive electrode includes at least a positive electrode current collector 12 and a positive electrode active material layer 18. The negative electrode includes at least a negative electrode current collector 14 and a negative electrode active material layer 19. Although the storage battery electrodes (the positive electrode and the negative electrode) in the shape of rectangular sheets are shown in FIG. 4B, the shape of the storage battery electrodes is not limited thereto and can be any appropriate shape. The active material layer is formed only on one surface of the current collector; however, active material layers may be formed on both surfaces of the current collector. The active material layer is not necessarily formed on an entire surface of the current collector, and an uncoated region such as a region for connection to an electrode tab is provided as appropriate.

<<Current Collector>>

For each of the positive electrode current collector and the negative electrode current collector, materials having high conductivity can be used.

<<Positive Electrode Current Collector>>

The current collector in the positive electrode can be formed using, for example, a metal such as iron, nickel, copper, aluminum, titanium, tantalum, or manganese, or an alloy thereof (e.g., stainless steel). It is preferable to use aluminum, which improves the reversibility of the charge and discharge characteristics of the positive electrode when used as the positive electrode current collector.

<<Negative Electrode Current Collector>>

The current collector in the negative electrode can be formed using, for example, a metal such as iron, nickel, copper, aluminum, titanium, tantalum, or manganese, or an alloy thereof (e.g., stainless steel). It is preferable to use a metal that does not form an alloy with lithium, such as copper or nickel.

<<Surface Processing, Shape, and the Like of Current Collector>>

The positive electrode current collector and the negative electrode current collector may each be coated with carbon, nickel, titanium, or the like. Furthermore, silicon, neodymium, scandium, molybdenum, or the like may be added to improve heat resistance. The positive electrode current collector and the negative electrode current collector can have any of various shapes including a foil-like shape, a sheet-like shape, a plate-like shape, a net-like shape, a cylindrical shape, a coil shape, a punching-metal shape, an expanded-metal shape, a porous shape, and a shape of non-woven fabric as appropriate. The positive electrode current collector and the negative electrode current collector may be formed to have micro irregularities on their surfaces in order to enhance adhesion to active materials. Each of the positive electrode current collector and the negative electrode current collector preferably has a thickness of greater than or equal to 5 µm and less than or equal to 30 µm.

<<Active Material>>

As the active material used in the positive electrode or the negative electrode, a material into and from which carrier ions such as lithium ions can be inserted and extracted is used. The average diameter or diameter distribution of the active material particles can be controlled by crushing, granulation, and classification by an appropriate means.

<<Positive Electrode Active Material>>

Examples of positive electrode active materials that can be used for the positive electrode active material layer 18 include complex oxides and other materials which may have an olivine structure, a complex oxide with a layered rock-salt structure, and a complex oxide with a spinel structure. For example, a compound such as $LiFeO_2$, $LiCoO_2$, $LiNiO_2$, $LiMn_2O_4$, $V_2O_5$, $Cr_2O_5$, or $MnO_2$ can be used.

Alternatively, a complex material ($LiMPO_4$ (general formula, where M is one or more of Fe(II), Mn(II), Co(II), and Ni(II)) can be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Further alternatively, a complex material such as $Li_{(2-j)}MSiO_4$ (general formula, where M is one or more of Fe(II), Mn(II), Co(II), and Ni(II); 0≤j≤2) may be used. Typical examples of the general formula $Li_{(2-j)}MSiO_4$ which can be used as a material are lithium compounds such as $Li_{(2-j)}FeSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a nasicon compound expressed by a general formula $A_xM_2(XO_4)_3$ (A=Li, Na, or Mg, M=Fe, Mn, Ti, V, Nb, or Al, and X=S, P, Mo, W, As, or Si) can be used as the positive electrode active material. Examples of the nasicon compound are $Fe_2(MnO_4)_3$, $Fe_2(SO_4)_3$, and $Li_3Fe_2(PO_4)_3$. Further alternatively, a compound expressed by a general formula $Li_2MPO_4F$, $Li_2MP_2O_7$, or $Li_5MO_4$ (M=Fe or Mn), a perovskite fluoride such as $FeF_3$, a metal chalcogenide (a sulfide, a selenide, or a telluride) such as $TiS_2$ or $MoS_2$, an oxide with an inverse spinel structure such as $LiMVO_4$, a vanadium oxide (such as $V_2O_5$, $V_6O_{13}$, or $LiV_3O_8$), a manganese oxide, an organic sulfur compound, or the like can be used as the positive electrode active material.

As the positive electrode active material, a lithium-manganese complex oxide that can be represented by a composition formula $Li_aMn_bM_cO_d$ can be used. Here, the element M is preferably silicon, phosphorus, or a metal element other than lithium and manganese, and further preferably nickel. In the case where the whole lithium-manganese complex oxide particle is measured, it is preferable to satisfy $0<a/(b+c)<2$, $c>0$, and $0.26\le(b+c)/d<0.5$ at the time of discharging. Note that the ratio of a metal, silicon, phosphorus, or the like to the total composition in the whole lithium-manganese complex oxide particle can be measured with, for example, an inductively coupled plasma mass spectrometer (ICP-MS). The ratio of oxygen to the total composition in the whole lithium-manganese complex oxide particle can be measured by, for example, energy dispersive X-ray spectroscopy (EDX). Alternatively, the ratio of oxygen to the total composition in the whole lithium-manganese complex oxide particle can be measured by an inert gas fusion method and valence evaluation of an X-ray absorption fine structure (XAFS) analysis combined with an ICP-MS analysis. Note that the lithium-manganese complex oxide is an oxide containing at least lithium and manganese, and may contain at least one selected from chromium, cobalt, aluminum, nickel, iron, magnesium, molybdenum, zinc, indium, gallium, copper, titanium, niobium, silicon, phosphorus, and the like.

To achieve high capacity, a surface portion and a center portion of the lithium-manganese complex oxide are preferably different in crystal structure, crystal orientation, or oxygen content. In order that such a lithium-manganese complex oxide can be obtained, the composition formula is preferably $Li_aMn_bNi_cO_d$ where $1.6\le a\le 1.848$, $0.19\le c/b\le 0.935$, and $2.5\le d\le 3$. It is particularly preferable to use a lithium-manganese complex oxide represented by a composition formula $Li_{1.68}Mn_{0.8062}Ni_{0.318}O_3$. In this specification and the like, a lithium-manganese complex oxide represented by a composition formula $Li_{1.68}Mn_{0.8062}Ni_{0.318}O_3$ refers to a lithium-manganese complex oxide formed at a ratio (molar ratio) between the amounts of raw materials of $Li_2CO_3:MnCO_3:NiO=0.84:0.8062:0.318$. Accordingly, the actual composition of the lithium-manganese complex oxide might be different from the composition $Li_{1.68}Mn_{0.8062}Ni_{0.318}O_3$.

Figure 5A:
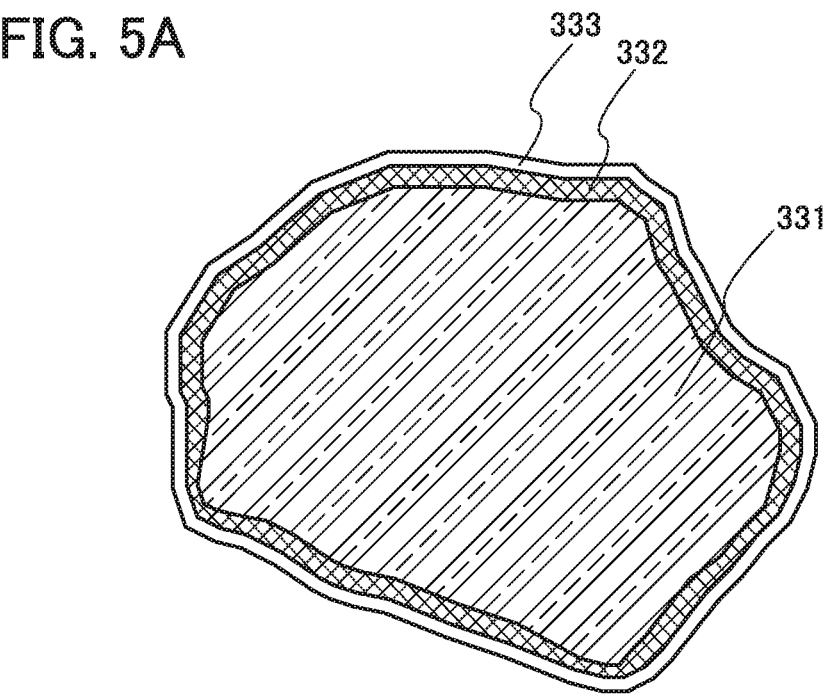
FIGS. 5A and 5B are cross-sectional views each illustrating a positive electrode active material that can be used in a secondary battery.
Figure 5B:
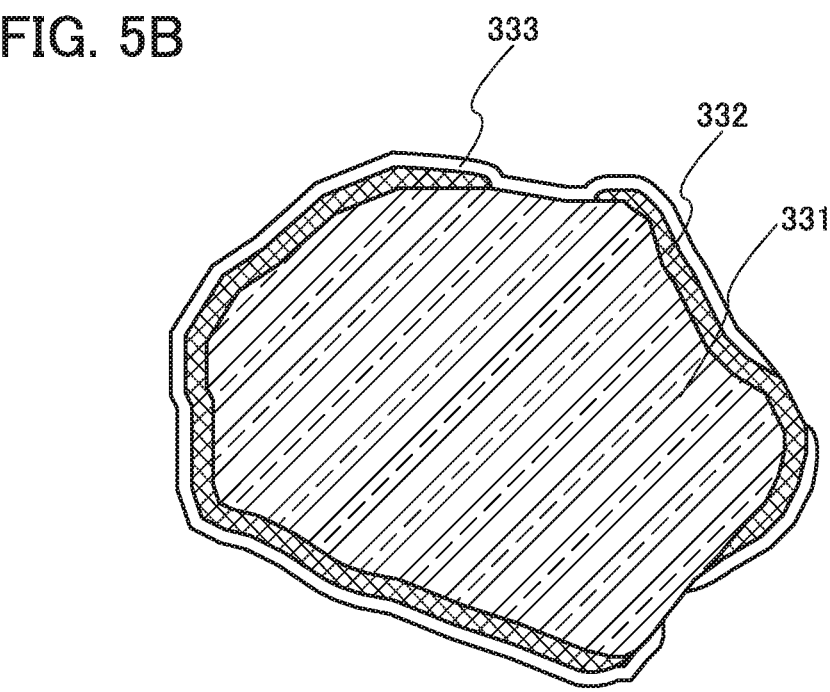

FIGS. 5A and 5B each illustrate an example of a cross-sectional view of a lithium-manganese complex oxide particle having regions with different crystal structures, crystal orientations, or oxygen contents.

As illustrated in FIG. 5A, the lithium-manganese complex oxide having regions with different crystal structures, crystal orientations, or oxygen contents preferably includes a first region 331, a second region 332, and a third region 333. At least part of the second region 332 is in contact with the first region 331. The second region 332 is positioned outside the first region 331. At least part of the third region 333 is in contact with the second region 332. The third region 333 is positioned outside the second region 332. Here, the term "outside" refers to the side closer to a surface of the particle. The third region 333 preferably has a region including the surface of the lithium-manganese complex oxide particle.

As illustrated in FIG. 5B, the first region 331 may include a region not covered with the second region 332. The second region 332 may include a region not covered with the third region 333. The first region 331 may include a region in contact with the third region 333, for example. The first region 331 may include a region covered with neither the second region 332 nor the third region 333.

The second region 332 preferably has composition different from that of the first region 331.

For example, the case is described where the composition of the first region 331 and that of the second region 332 are separately measured; the first region 331 and the second region 332 each contain lithium, manganese, the element M, and oxygen; the atomic ratio of lithium to manganese, the element M, and oxygen in the first region 331 is represented by a1:b1:c1:d1; and the atomic ratio of lithium to manganese, the element M, and oxygen in the second region 332 is represented by a2:b2:c2:d2. Note that the composition of each of the first region 331 and the second region 332 can be measured by, for example, energy dispersive X-ray spectroscopy (EDX) using a transmission electron microscope (TEM). In the measurement by EDX, the composition of lithium is sometimes difficult to measure. Thus, a difference between the first region 331 and the second region 332 in composition except for lithium is described below. Here, $d1/(b1+c1)$ is preferably greater than or equal to 2.2, further preferably greater than or equal to 2.3, and still further preferably greater than or equal to 2.35 and less than or equal to 3. Furthermore, $d2/(b2+c2)$ is preferably less than 2.2, further preferably less than 2.1, and still further preferably greater than or equal to 1.1 and less than or equal to 1.9. Also in this case, the composition of the whole lithium-manganese complex oxide particle including the first region 331 and the second region 332 preferably satisfies $0.26\le(b+c)/d<0.5$ as described above.

The valence of manganese in the second region 332 may be different from that of manganese in the first region 331. The valence of the element M in the second region 332 may be different from that of the element M in the first region 331.

Specifically, the first region 331 is preferably a lithium-manganese complex oxide with a layered rock-salt crystal structure. The second region 332 is preferably a lithium-manganese complex oxide with a spinel crystal structure.

In the case where the composition of the regions or valences of elements in the regions are spatially distributed, the composition or valences in a plurality of portions are obtained, the average values thereof are calculated, and the average values are regarded as the composition or valences of the regions, for example.

A transition layer may be provided between the second region 332 and the first region 331. The transition layer is a region where the composition, crystal structure, or crystal lattice constant changes continuously or gradually. Alternatively, a mixed layer may be provided between the second region 332 and the first region 331. The mixed layer is a region in which, for example, two or more crystals having different crystal orientations, crystal structures, or compositions are mixed.

The third region 333 preferably contains carbon or a metal compound. Examples of the metal include cobalt, aluminum, nickel, iron, manganese, titanium, zinc, and lithium.

As an example of the metal compound, an oxide of the metal, a fluoride of the metal, or the like can be given.

It is particularly preferable that the third region 333 contain carbon. Since carbon has high conductivity, a particle coated with carbon in an electrode of a storage battery can reduce the resistance of the electrode, for example. Furthermore, when the third region 333 contains carbon, the second region 332 in contact with the third region 333 can be oxidized. The third region 333 may contain graphene, graphene oxide, or reduced graphene oxide. Graphene and reduced graphene oxide have excellent electrical characteristics of high conductivity, and excellent physical properties of high flexibility and high mechanical strength. Moreover, the lithium-manganese complex oxide particle can be coated efficiently.

When the third region 333 contains a carbon material such as graphene, a secondary battery using the lithium-manganese complex oxide as a positive electrode material can have improved cycle characteristics.

The thickness of the layer containing carbon is preferably greater than or equal to 0.4 nm and less than or equal to 40 nm.

The average size of primary particles of the lithium-manganese complex oxide is preferably greater than or equal to 5 nm and less than or equal to 50 μm, and further preferably greater than or equal to 100 nm and less than or equal to 500 nm, for example. Furthermore, the specific surface area is preferably greater than or equal to 5 $m^2/g$ and less than or equal to 15 $m^2/g$. In addition, the average size of secondary particles is preferably greater than or equal to 5 μm and less than or equal to 50 μm. Note that the average particle sizes can be measured with a particle size distribution analyzer or the like using a laser diffraction and scattering method or by observation with a scanning electron microscope (SEM) or a TEM. The specific surface area can be measured by a gas adsorption method.

In the case where carrier ions are alkali metal ions other than lithium ions or alkaline-earth metal ions, a material containing an alkali metal (e.g., sodium or potassium) or an alkaline-earth metal (e.g., calcium, strontium, barium, beryllium, or magnesium) instead of lithium may be used as the positive electrode active material.

The positive electrode active material layer may include a binder for increasing adhesion of active materials, a conductive additive for increasing the conductivity of the positive electrode active material layer, and the like in addition to the above-described positive electrode active materials.

<<Negative Electrode Active Material>>

A material with which lithium can be dissolved and deposited or a material into and from which lithium ions can be inserted and extracted can be used as a negative electrode active material of the negative electrode active material layer 19; for example, a lithium metal, a carbon-based material, an alloy-based material, or the like can be used.

The lithium metal is preferable because of its low redox potential (3.045 V lower than that of a standard hydrogen electrode) and its high specific capacity per unit weight and per unit volume (3860 mAh/g and 2062 mAh/$cm^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/$Li^+$) when lithium ions are intercalated into the graphite (while a lithium-graphite intercalation compound is formed). For this reason, a lithium-ion secondary battery can have a high operating voltage. In addition, graphite is preferable because of its advantages such as a relatively high capacity per unit volume, small volume expansion, low cost, and safety greater than that of a lithium metal.

For the negative electrode active material, an alloy-based material which enables charge-discharge reactions by alloying and dealloying reactions with lithium can be used. In the case where carrier ions are lithium ions, a material containing at least one of Al, Si, Ge, Sn, Pb, Sb, Bi, Ag, Au, Zn, Cd, In, Ga, and the like can be used as such an alloy-based material, for example. Such elements have a higher capacity than carbon. In particular, silicon has a significantly high theoretical capacity of 4200 mAh/g. For this reason, silicon is preferably used for the negative electrode active material. Examples of an alloy-based material containing any of the above elements are SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn. Note that SiO refers to powder of a silicon oxide including a silicon-rich portion and can also be referred to as $SiO_y$ (2>y>0). Examples of SiO include a material containing one or more of $Si_2O_3$, $Si_3O_4$, and $Si_2O$ and a mixture of Si powder and silicon dioxide ($SiO_2$). Furthermore, SiO may contain another element (e.g., carbon, nitrogen, iron, aluminum, copper, titanium, calcium, and manganese). In other words, SiO refers to a colored material containing two or more of single crystal silicon, amorphous silicon, polycrystalline silicon, $Si_2O_3$, $Si_3O_4$, $Si_2O$, and $SiO_2$. Thus, SiO can be distinguished from $SiO_x$ (x is 2 or more), which is clear and colorless or white. Note that in the case where a secondary battery is manufactured using SiO as a material thereof and SiO is oxidized because of repeated charge and discharge cycles, SiO is changed into $SiO_2$ in some cases.

For the negative electrode active material, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten dioxide ($WO_2$), or molybdenum dioxide ($MoO_2$) can also be used.

For the negative electrode active material, $Li_{3-x}M_xN$ (M=Co, Ni, or Cu) with a $Li_3N$ structure, which is a nitride containing lithium and a transition metal, can also be used. For example, $Li_{2.6}Co_{0.4}N_3$ is preferable because of its high charge and discharge capacity (900 mAh/g and 1890 mAh/$cm^3$).

A nitride containing lithium and a transition metal is preferably used, in which case lithium ions are contained in the negative electrode active material and thus the negative electrode active material can be used in combination with a material for a positive electrode active material that does not contain lithium ions, such as $V_2O_5$ or $Cr_3O_8$. Even in the case of using a material containing lithium ions as the positive electrode active material, the nitride containing lithium and a transition metal can be used for the negative electrode active material as long as the lithium ions contained in the positive electrode active material are extracted in advance.

A material that causes a conversion reaction can also be used as the negative electrode active material; for example, a transition metal oxide that does not cause an alloy reaction with lithium, such as cobalt oxide (CoO), nickel oxide (NiO), or iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as the positive electrode active material because of its high potential.

The negative electrode active material layer 19 may include a binder for increasing adhesion of active materials, a conductive additive for increasing the conductivity of the negative electrode active material layer 19, and the like in addition to the above-described negative electrode active materials.

<<Separator>>

As a separator 13, an insulator can be used. For example, cellulose (paper), polypropylene with pores, or polyethylene with pores can be used.

<<Electrolyte Solution>>

An electrolyte solution 20 is formed of an electrolyte and a solvent, and a material having the carrier ion mobility is used.

<<Electrolyte>>

For the electrolyte, a material containing a lithium ion is preferably used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone, or two or more of them may be used in an appropriate combination and in an appropriate ratio.

<<Solvent>>

As the solvent of the electrolyte solution, an aprotic organic solvent is preferably used. Typical examples of the aprotic organic solvent include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used.

When a gelled high-molecular material is used as the solvent of the electrolyte solution, safety against liquid leakage and the like is improved. Furthermore, the storage battery can be thinner and more lightweight. Typical examples of the gelled high-molecular material are a polyacrylate gel, a polymethacrylate gel, a polyacrylonitrile gel, a polyethylene oxide-based gel, a polypropylene oxide-based gel, a fluorine-based polymer gel, and the like.

Alternatively, the use of one or more of ionic liquids (room temperature molten salts) which have features of non-flammability and non-volatility as the solvent of the electrolyte solution can prevent the storage battery from exploding or catching fire even when the storage battery internally shorts out or the internal temperature increases owing to overcharging or the like. An ionic liquid is a salt in the fluid state and has high ion mobility (conductivity). An ionic liquid contains a cation and an anion. Examples of ionic liquids include an ionic liquid containing an ethylmethylimidazolium (EMI) cation and an ionic liquid containing an N-methyl-N-propyltuberidinium ($PP_{13}$) cation.

Instead of the electrolyte solution, a solid electrolyte including an inorganic material such as a sulfide-based inorganic material or an oxide-based inorganic material, or a solid electrolyte including a high-molecular material such as a polyethylene oxide (PEO)-based high-molecular material may be used. When the solid electrolyte is used, a separator and a spacer are not necessary. Furthermore, the battery can be entirely solidified; therefore, there is no possibility of liquid leakage and thus the safety of the battery is dramatically increased.

<<Component Examples of Secondary Battery>>

In the secondary battery, for example, the separator 13 has a thickness of approximately 25 µm, the positive electrode current collector 12 has a thickness of approximately 20 µm to 40 µm, the positive electrode active material layer 18 has a thickness of approximately 100 µm, the negative electrode active material layer 19 has a thickness of approximately 100 µm, and the negative electrode current collector 14 has a thickness of approximately 20 µm to 40 µm.

[Electrode Processing Apparatus and Electrode Processing Method for Secondary Battery]

Figure 2A:
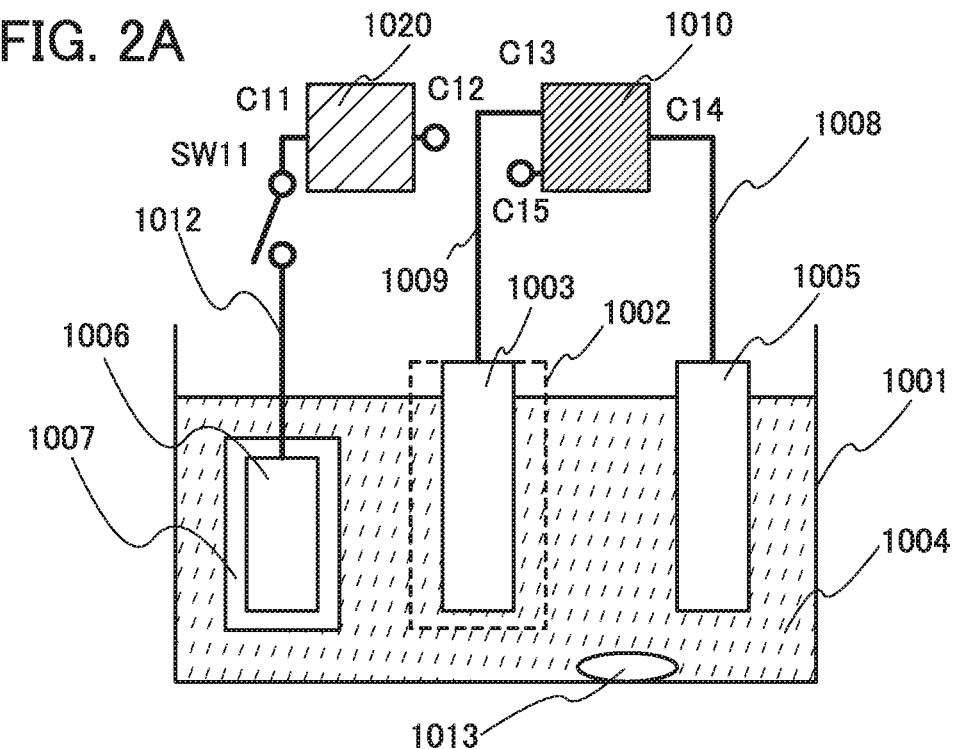
FIGS. 2A and 2B are schematic views each illustrating a manufacturing apparatus of one embodiment of the present invention.
Figure 2B:
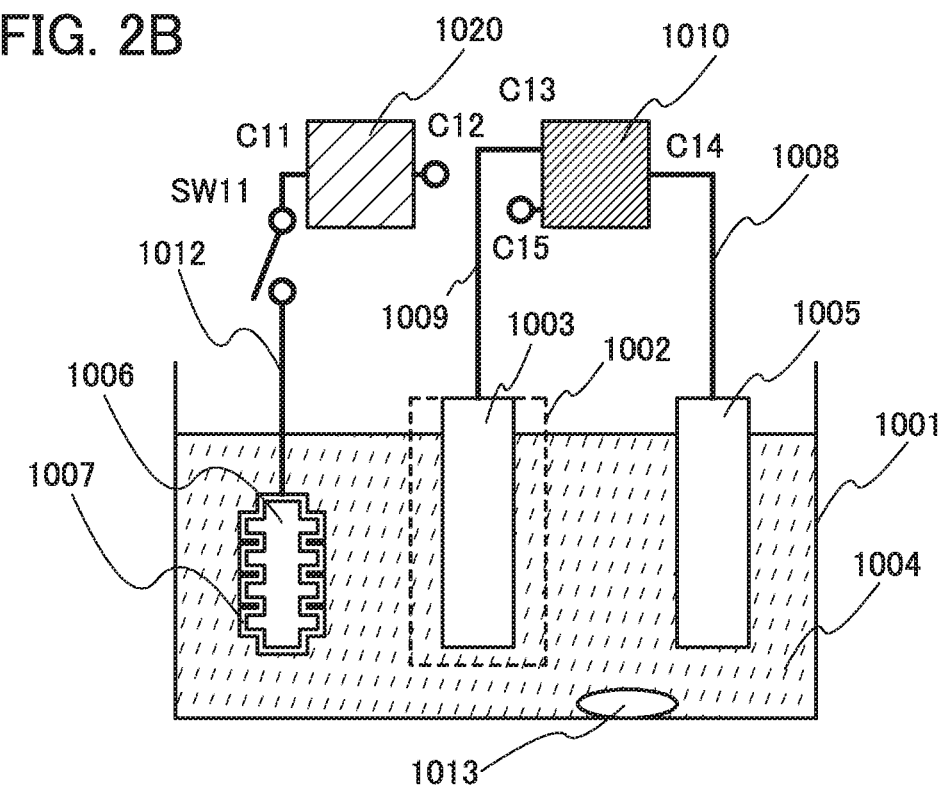

FIG. 1 and FIGS. 2A and 2B are each a schematic diagram of a manufacturing apparatus 1000.

The manufacturing apparatus 1000 is provided with a container 1001, a separator 1002, a counter electrode 1003, an electrolyte solution 1004, a processing electrode 1005, a sacrificial electrode 1006, a first cord 1008, a second cord 1009, a control device 1010, a heating means 1011, a control device 1020, a third cord 1012, and a stirring means 1013.

As described in this embodiment, first to third electrodes illustrated in FIG. 1 and FIGS. 2A and 2B are used, which is a feature of one embodiment of the present invention. In FIG. 1 and FIGS. 2A and 2B, the sacrificial electrode 1006, the counter electrode 1003, and the processing electrode 1005 correspond to the first electrode, the second electrode, and the third electrode, respectively.

An electrolyte solution used in a secondary battery is preferably different from the electrolyte solution 1004 put in the container 1001. As the electrolyte solution used in the secondary battery, a material which forms a highly stable covering film of negative electrode is used.

<<Electrolyte Solution>>

The electrolyte solution used in the secondary battery and the electrolyte solution 1004 are each formed of an electrolyte and a solvent, and a material having the carrier ion mobility is used.

<<Electrolyte>>

A material containing a lithium ion is preferable for the electrolyte. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone, or two or more of them may be used in an appropriate combination and in an appropriate ratio.

In addition to the material containing a lithium ion, an alkali metal salt other than a lithium salt is preferably used for the electrolyte. For example, it is preferable to use an alkali metal salt formed with a base such as $PF_6^-$, $ClO_4^-$, $AsF_6^-$, $BF_4^-$, $CF_3SO_3^-$, $(CF_3SO_2)_2N^-$, and $(C_2F_5SO_2)_2N^-$. An alkali metal salt containing Na, K, Rb, Cs, or Fr can be used as an alkali metal salt other than a lithium salt; it is preferable to use an alkali metal salt containing Na, which is an alkali metal whose equilibrium potential is largely different from that of lithium and is easily deposited on an electrode selectively.

<<Solvent>>

As the solvent of the electrolyte solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, and tetrahydrofuran, and one or more of these materials can be used.

<<Counter Electrode>>

For the counter electrode 1003 (second electrode), a lithium metal or platinum can be used.

<<Sacrificial Electrode>>

For the sacrificial electrode 1006 (first electrode), copper can be used. For the sacrificial electrode 1006, a material that can be used for the current collector (e.g., titanium or stainless steel) can be used.

<<Electrode Connection>>

The processing electrode 1005 (third electrode) is put in the electrolyte solution 1004 in the container 1001. The processing electrode 1005 is a current collector (sheet-like electrode) whose one or both surfaces are provided with an active material layer. The processing electrode 1005 put in the electrolyte solution 1004 is electrically connected to a holding means (e.g., a conductive fastener). The holding means is electrically connected to the control device 1010 via the first cord 1008.

The processing electrode 1005 is put along an inner wall of the container 1001 in FIG. 1. Note that the shape of the sheet-like electrode might depend on the uses, and a method for putting the sheet-like electrode in the container depends on the length of the electrode. Since the processing electrode 1005 is held by the holding means, the processing electrode 1005 and the counter electrode 1003 are separated from and not electrically connected to each other. Although it may be enough to spatially separate the processing electrode 1005 and the counter electrode 1003, they can be separated by the separator 1002, which is placed in the periphery of the counter electrode 1003, so that the processing electrode 1005 and the counter electrode 1003 are not in contact with each other unintentionally.

As the separator 1002, an insulator can be used. For example, cellulose (paper), polyethylene with pores, or polypropylene with pores can be used.

The control device 1010 has at least two wirings. One of the wirings (first cord 1008) is electrically connected to the current collector via the holding means, and the other wiring (second cord 1009) is electrically connected to the counter electrode. In this embodiment, lithium which is used for the counter electrode 1003 and is electrically connected to the other wiring is put in the electrolyte solution in the container.

The electrolyte solution 1004 is provided between the two wirings of the control device 1010. The control device 1010 adjusts the amount of current and voltage that are supplied to the electrolyte solution 1004 or the like between the two wirings to perform oxidation or reduction of the processing electrode 1005 placed in the electrolyte solution.

The sacrificial electrode 1006 is partly or entirely put in the electrolyte solution 1004. Furthermore, the sacrificial electrode 1006 is electrically connected to the control device 1020 via the third cord 1012. The third cord 1012 includes a switch SW11 with which application or non-application of a potential to the sacrificial electrode 1006 is selected.

<<Electrode Processing Method>>

Figure 3:
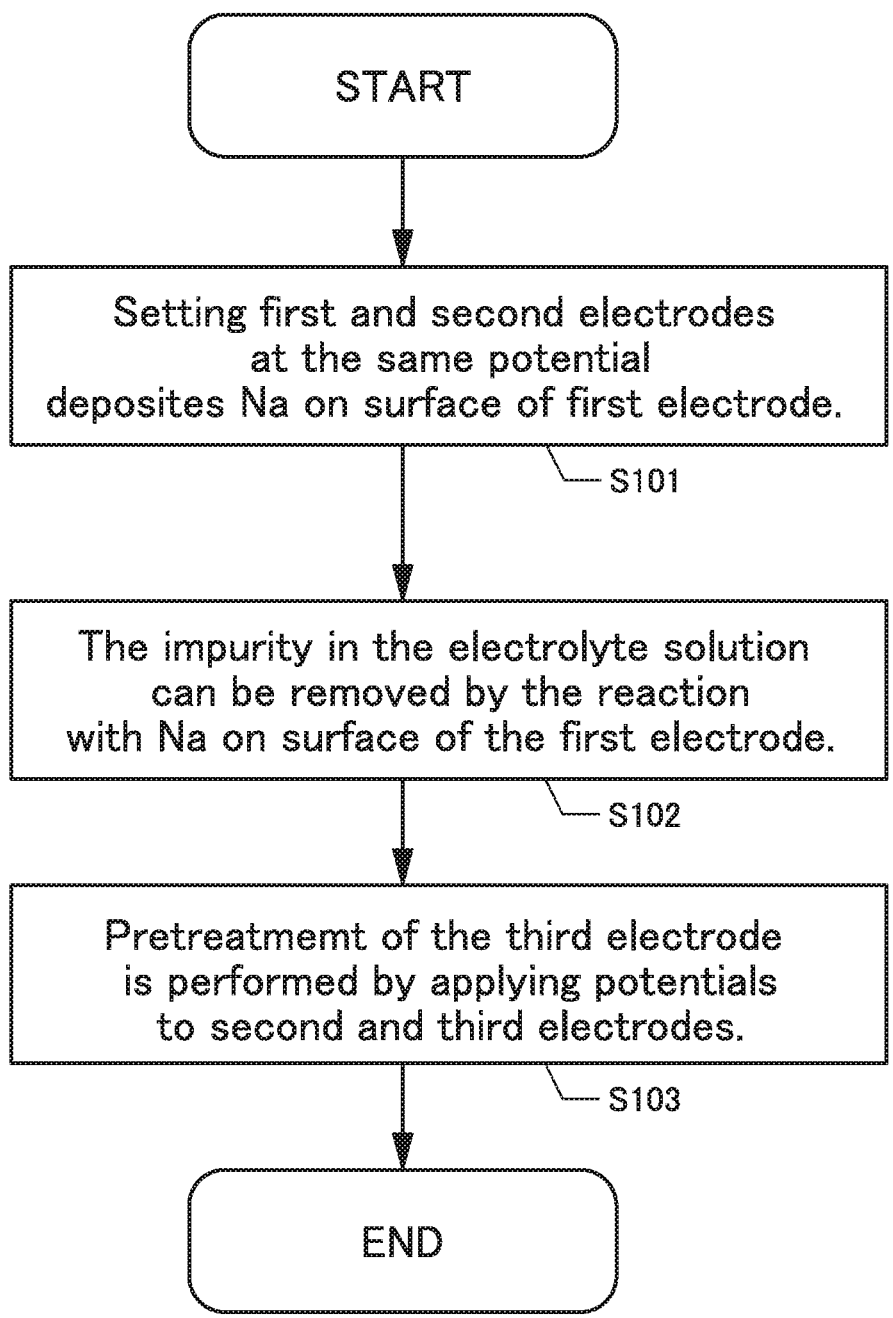
FIG. 3 is a flow chart showing a manufacturing process of a secondary battery of one embodiment of the present invention.

An electrode processing method for a secondary battery will be described with reference to FIGS. 2A and 2B and FIG. 3. In this embodiment, an equilibrium potential of a lithium metal electrode (V vs. Li/Li$^+$) is assumed to be 0, and a potential of each terminal represents a difference from the equilibrium potential of the lithium metal electrode.

Described here is an example where lithium is used for the counter electrode 1003. As illustrated in FIGS. 2A and 2B, the counter electrode 1003 is connected to a terminal C13 of the control device 1010. The processing electrode 1005 is connected to a terminal C14 of the control device 1010. A terminal C11 of the control device 1020 is connected to the sacrificial electrode 1006 via the switch SW11.

Then, a method for depositing an ion of the alkali metal other than lithium contained in the electrolyte solution 1004 on a surface of the sacrificial electrode 1006 is described. Described here is an example where the alkali metal is Na. The switch SW11 is turned on, and the control devices 1010 and 1020 are controlled so that the terminals C11 and C13 have the same potential that is lower than a Na equilibrium potential (Step S101). Since the Na equilibrium potential is 0.331 V vs. Li/Li$^+$, the potentials of the terminals C11 and C13 are preferably set to be 0.2 V vs. Li/Li$^+$, for example. As a result, a Na ion contained in the electrolyte solution 1004 is deposited on surfaces of the counter electrode 1003 and the sacrificial electrode 1006, and a Na film 1007 is formed. Note that since the potentials of the terminals C11 and C13 are higher than the equilibrium potential of a lithium metal, lithium is not deposited. A reference potential can be applied to a terminal C12. A reference potential (e.g., a ground potential) can be applied to a terminal C15. Described here is an example where the terminal C11 and the terminal C13 are set to have the same potential, so that a lithium electrode, which is the counter electrode 1003, and the sacrificial electrode 1006 have the same potential. Alternatively, the counter electrode 1003 and the sacrificial electrode 1006 may be electrically short-circuited. The counter electrode 1003 and the sacrificial electrode 1006 can be set to have the same potential without any special apparatus.

The film 1007 may be deposited so as to cover the surface of the sacrificial electrode 1006 as in FIGS. 2A and 2B, or may be deposited so that the surface of the sacrificial electrode 1006 is partly covered by the film 1007 and partly exposed to the electrolyte solution 1004. The surface of the sacrificial electrode 1006 may be flat as illustrated in FIG. 2A or uneven as illustrated in FIG. 2B.

Next, a method for reacting Na deposited on the surface of the sacrificial electrode 1006 with an impurity in the electrolyte solution 1004 (Step S102) is described. The switch SW11 is preferably turned off. A sodium metal deposited electrochemically on the surface of the sacrificial electrode 1006 has higher reactivity and a larger surface area than a lithium metal; thus, an impurity such as oxygen, moisture, or nitrogen contained in the electrolyte solution 1004 reacts mainly at the surface of the sacrificial electrode 1006. After sufficient time has elapsed, the amount of the impurity can be reduced to such an extent that an effect on the processing electrode 1005 can be ignored.

Then, processing is performed on the processing electrode 1005 (Step S103). A potential is applied to the processing electrode 1005 while the potentials of the counter electrode 1003 and the sacrificial electrode 1006 at Step S102 are maintained, whereby an oxidation or reduction reaction occurs.

During the oxidation or reduction of the processing electrode 1005, the electrolyte solution 1004 may be heated by the heating means 1011. This can promote the electrochemical reaction and enable the oxidation or reduction treatment to be performed in a short time. The heating means 1011 may be placed in the container.

To promote the electrochemical reaction, the stirring means 1013 may be provided in the electrolyte solution 1004.

After the electrochemical reaction (oxidation or reduction), the processing electrode 1005 is taken out of the electrolyte solution 1004 in the container. Then, the processing electrode 1005 is dried and processed into a desired shape. A stack including the positive electrode, the separator, and the negative electrode is packed and an electrolyte solution is introduced in a region surrounded by the exterior body having an opening. The opening of the exterior body is closed by thermocompression. A thermocompression-bonded region 17 is illustrated in FIGS. 4D and 4E. In this manner, the secondary battery illustrated in FIG. 4E can be manufactured.

Here, a current flow in charging a secondary battery is described with reference to FIG. 4F. When a secondary battery using lithium is regarded as a closed circuit, lithium ions transfer and a current flows in the same direction. Note that in the secondary battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" or a "plus electrode" and the negative electrode is referred to as a "negative electrode" or a "minus electrode" in all the cases where charge is performed, discharge performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, it should be mentioned that the anode or the cathode is which of the one at the time of charging or the one at the time of discharging and corresponds to which of a positive (plus) electrode or a negative (minus) electrode.

Two terminals in FIG. 4F are connected to a charger, and the secondary battery 40 is charged. As the charge of the secondary battery 40 proceeds, a potential difference between electrodes increases. In FIG. 4F, electrons flow from a terminal outside the secondary battery 40 to the positive electrode current collector 12, and a current flows from the positive electrode current collector 12 to the negative electrode current collector 14 in the secondary battery 40. In FIG. 4F, a direction of the current flow from the negative electrode current collector 14 to the terminal outside the secondary battery 40 is regarded as a positive direction. In other words, a direction in which a charging current flows is regarded as a direction of a current.

Although an example of a small battery used in a portable information terminal or the like is described in this embodiment, one embodiment of the present invention is not limited to this example. Application to a large battery provided in a vehicle or the like is also possible.

According to one embodiment of the present invention, the initial irreversible capacity of the positive electrode and the negative electrode can be reduced, and a secondary battery having a high electrode capacity, high-speed charge and discharge characteristics, and improved cycle performance can be provided.

Although an example of application to a lithium-ion secondary battery is described as one embodiment of the present invention, one embodiment of the present invention is not limited to this example. Depending on circumstances or conditions, one embodiment of the present invention can be used for a variety of secondary batteries, a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, an air battery, a primary battery, a capacitor, a lithium ion capacitor, or the like. Furthermore, depending on circumstances or conditions, for example, one embodiment of the present invention is not necessarily used for a lithium-ion secondary battery.

This embodiment can be implemented in an appropriate combination with any of the structures described in the other embodiments.

Embodiment 2

In this embodiment, a variety of modes of power storage devices manufactured according to one embodiment of the present invention will be described.

[Coin-Type Storage Battery]

Figure 6A:
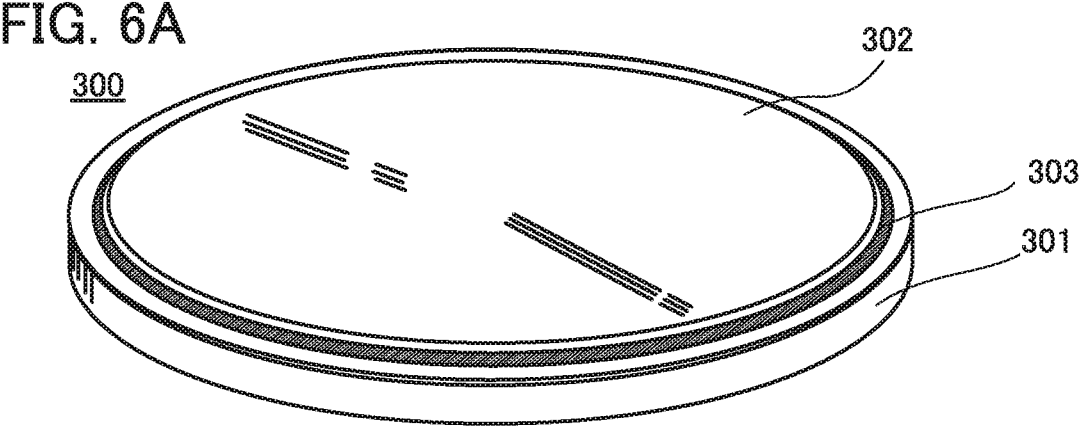
FIGS. 6A to 6C illustrate a coin-type secondary battery and a cylindrical secondary battery.
Figure 6B:
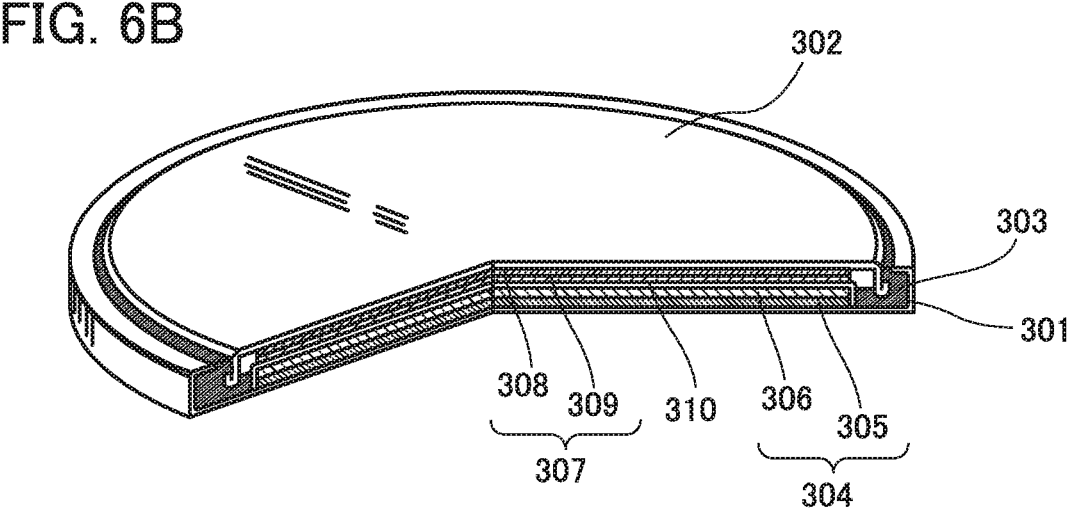

FIG. 6A is an external view of a coin-type (single-layer flat type) storage battery, and FIG. 6B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. The positive electrode active material layer 306 may further include a binder for increasing adhesion of positive electrode active materials, a conductive additive for increasing the conductivity of the positive electrode active material layer, and the like in addition to the active materials. As the conductive additive, a material that has a large specific surface area is preferably used; for example, acetylene black (AB) can be used. Alternatively, a carbon material such as a carbon nanotube, graphene, or fullerene can be used.

A negative electrode 307 includes a negative electrode current collector 308 and a negative electrode active material layer 309 provided in contact with the negative electrode current collector 308. The negative electrode active material layer 309 may further include a binder for increasing adhesion of negative electrode active materials, a conductive additive for increasing the conductivity of the negative electrode active material layer, and the like in addition to the negative electrode active materials. A separator 310 and an electrolyte (not illustrated) are provided between the positive electrode active material layer 306 and the negative electrode active material layer 309.

Any of the materials described in Embodiment 1 is used as a negative electrode active material in the negative electrode active material layer 309. Before a battery is assembled, oxidation treatment and reduction treatment are performed on the negative electrode 307 in an electrolyte solution with the use of the apparatus described in Embodiment 1.

Any of the materials for the current collectors that are described in Embodiment 1 is used for the current collectors such as the positive electrode current collector 305 and the negative electrode current collector 308.

For the positive electrode active material layer 306, a material into and from which lithium ions can be inserted and extracted can be used. For example, any of the materials for the positive electrode active material layer that are described in Embodiment 1 is used. Before a battery is assembled, oxidation treatment and reduction treatment are performed on the positive electrode 304 in an electrolyte solution with the use of the apparatus described in Embodiment 1.

As the separator 310, an insulator can be used. For example, cellulose (paper), polyethylene with pores, or polypropylene with pores can be used.

For an electrolyte in the electrolyte solution, a material containing carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone, or two or more of them may be used in an appropriate combination and in an appropriate ratio.

Note that when carrier ions are alkali metal ions other than lithium ions, or alkaline-earth metal ions, instead of lithium in the above lithium salts, an alkali metal (e.g., sodium and potassium), an alkaline-earth metal (e.g., calcium, strontium, barium, beryllium, and magnesium) may be used for the electrolyte.

For a solvent of the electrolyte solution, a material having the carrier ion mobility is used. As the solvent of the electrolyte solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, and tetrahydrofuran, and one or more of these materials can be used. When a gelled polymeric material is used for the solvent of the electrolyte solution, safety against liquid leakage and the like is improved. Furthermore, a thin and light storage battery can be fabricated. Typical examples of gelled polymeric materials include a polyacrylate gel, a polymethacrylate gel, a polyacrylonitrile gel, a polyethylene oxide-based gel, a polypropylene oxide-based gel, and a gel of a fluorine-based polymer. Alternatively, the use of one or more kinds of ionic liquids (room temperature molten salts) which have features of non-flammability and non-volatility for the solvent of the electrolyte solution can prevent the storage battery from exploding or catching fire even when the storage battery internally shorts out or the internal temperature increases because of overcharging and the like.

For the positive electrode can 301 and the negative electrode can 302, a metal having a corrosion-resistant property to an electrolyte solution, such as nickel, aluminum, or titanium, an alloy of such a metal, or an alloy of such a metal and another metal (e.g., stainless steel or the like) can be used. Alternatively, the positive electrode can 301 and the negative electrode can 302 are preferably covered with nickel, aluminum, or the like in order to prevent corrosion due to the electrolyte solution. The positive electrode can 301 and the negative electrode can 302 are electrically connected to the positive electrode 304 and the negative electrode 307, respectively.

The negative electrode 307, the positive electrode 304, and the separator 310 are immersed in the electrolyte solution. Then, as illustrated in FIG. 6B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

Figure 6C:
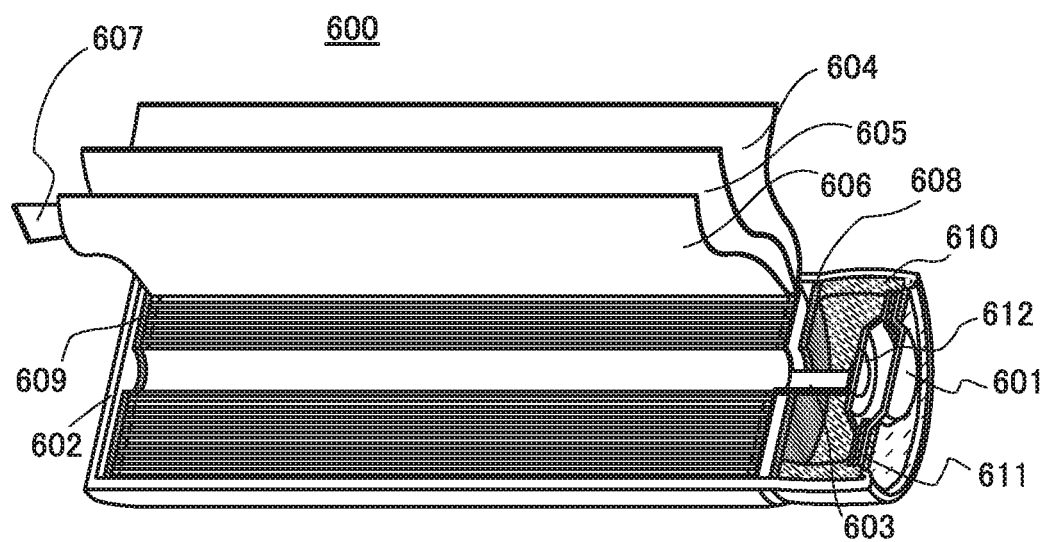

FIG. 6C illustrates an example of a cylindrical storage battery. FIG. 6C is a schematic cross-sectional view of the cylindrical storage battery.

A cylindrical storage battery 600 includes a positive electrode cap (battery lid) 601 and a battery can (outer can) 602. The positive electrode cap 601 and the battery can 602 are insulated from each other by a gasket (insulating gasket) 610.

FIG. 6C is a schematic cross-sectional view of the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. One end of the battery can 602 is close and the other end thereof is open. For the battery can 602, a metal having a corrosion-resistant property to an electrolyte solution, such as nickel, aluminum, or titanium, an alloy of such a metal, or an alloy of such a metal and another metal (e.g., stainless steel or the like) can be used. Alternatively, the battery can 602 is preferably covered with nickel, aluminum, or the like in order to prevent corrosion due to the electrolyte solution. Inside the battery can 602, the battery element in which the positive electrode, the negative electrode, and the separator are wound is provided between a pair of insulating plates 608 and 609 that face each other. Furthermore, a nonaqueous electrolyte solution (not illustrated) is injected inside the battery can 602 provided with the battery element. As the nonaqueous electrolyte solution, a nonaqueous electrolyte solution that is similar to those of the coin-type storage battery and a laminate storage battery can be used.

Although the positive electrode 604 and the negative electrode 606 can be formed in a manner similar to that of the positive electrode and the negative electrode of the coin-type storage battery described above, the difference lies in that, since the positive electrode and the negative electrode of the cylindrical storage battery are wound, active materials are formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic can be used for the PTC element 611.

Note that in this embodiment, the coin-type storage battery and the cylindrical storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or wound may be employed.

[Thin Storage Battery 1]

Figure 7:
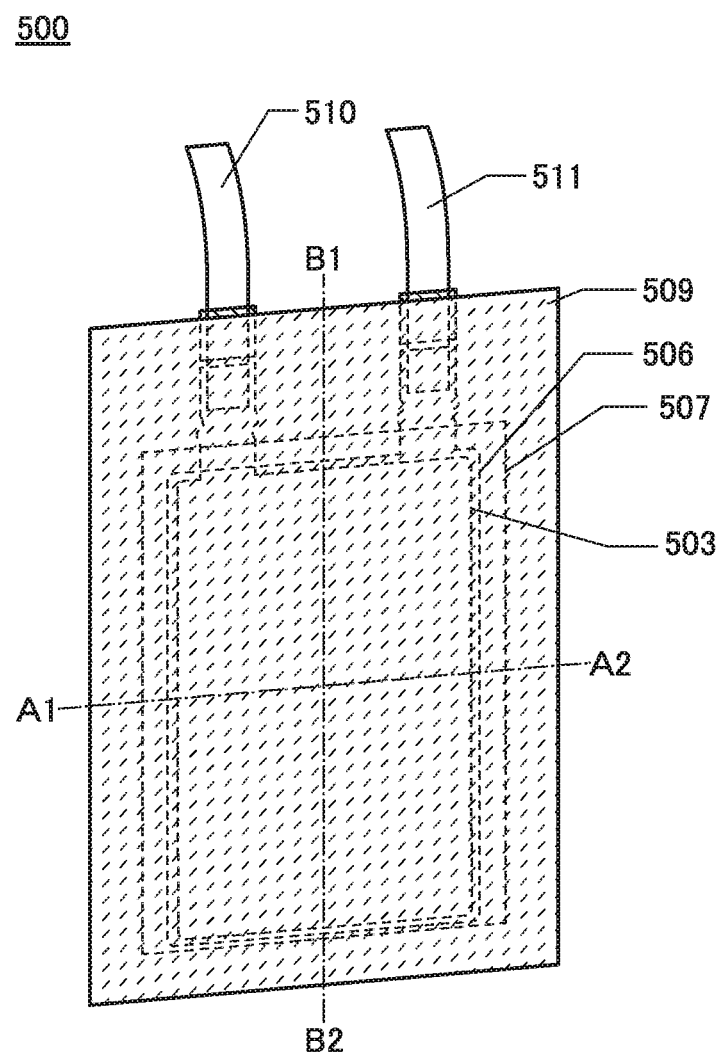
FIG. 7 illustrates a thin storage battery.

FIG. 7 illustrates a thin storage battery as an example of a storage device. FIG. 7 illustrates an example of a thin storage battery. When the thin storage battery has flexibility and is used in an electronic device at least part of which is flexible, the storage battery can be bent as the electronic device is bent.

Figure 8A:
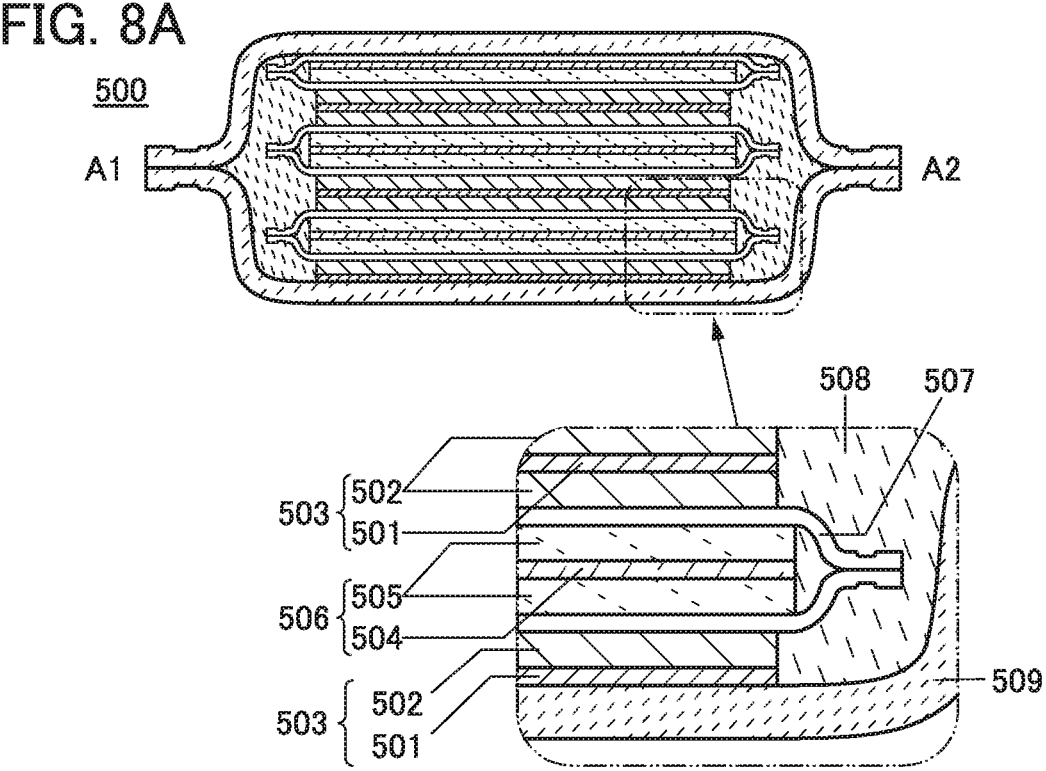
FIGS. 8A and 8B are cross-sectional views illustrating thin storage batteries.
Figure 8B:
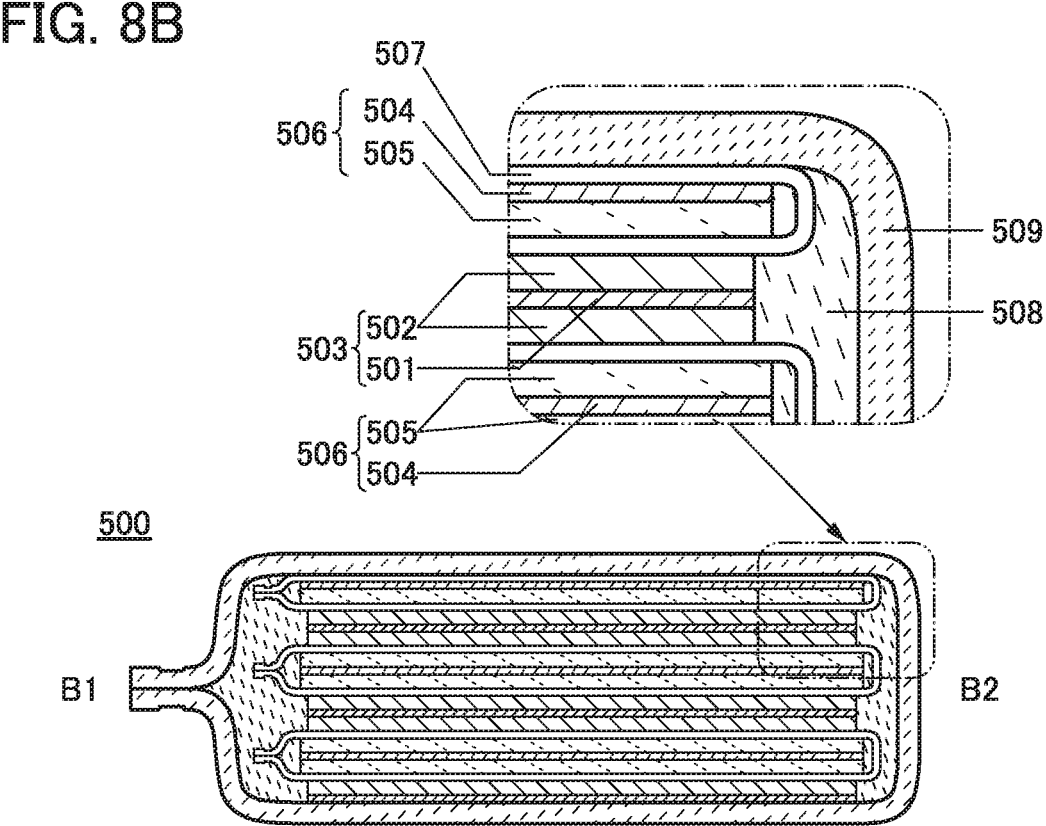

FIG. 7 is an external view of a thin storage battery 500. FIGS. 8A and 8B are cross-sectional views taken along dashed-dotted lines A1-A2 and B1-B2 in FIG. 7. The thin storage battery 500 includes a positive electrode 503 including a positive electrode current collector 501 and a positive electrode active material layer 502, a negative electrode 506 including a negative electrode current collector 504 and a negative electrode active material layer 505, a separator 507, an electrolyte solution 508, and an exterior body 509. The separator 507 is placed between the positive electrode 503 and the negative electrode 506, which are provided in a region surrounded by the exterior body 509. The region surrounded by the exterior body 509 is filled with the electrolyte solution 508.

An electrode manufactured using one embodiment of the present invention is used for at least one of the positive electrode 503 and the negative electrode 506. An electrode manufactured using one embodiment of the present invention may be used for both the positive electrode 503 and the negative electrode 506. For example, an electrode processed by the apparatus described in Embodiment 1 is used as at least one of the positive electrode 503 and the negative electrode 506.

For the electrolyte solution 508 and the separator 507, the materials described in Embodiment 1 can be used.

Figure 9A:
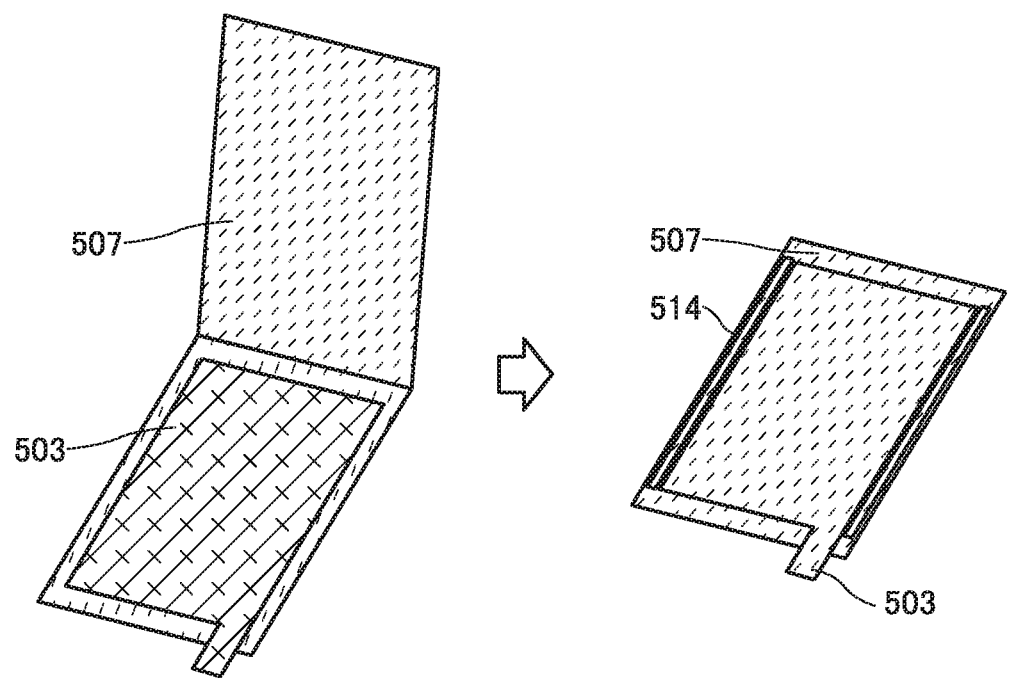
FIGS. 9A and 9B each illustrate a thin storage battery.
Figure 9B:
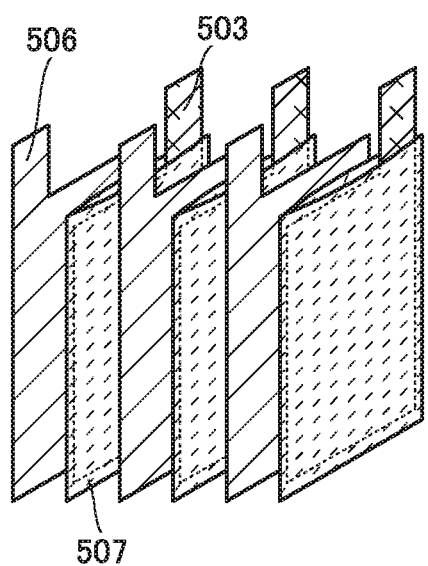

The separator 507 is preferably formed to have a bag-like shape to surround one of the positive electrode 503 and the negative electrode 506. For example, as illustrated in FIG. 9A, the separator 507 is folded in two so that the positive electrode 503 is sandwiched, and sealed with a sealing portion 514 in a region outside the region overlapping with the positive electrode 503; thus, the positive electrode 503 can be reliably supported inside the separator 507. Then, as illustrated in FIG. 9B, the positive electrodes 503 surrounded by the separators 507 and the negative electrodes 506 are alternately stacked and provided in the exterior body 509, whereby the thin storage battery 500 can be formed.

Described here is an example in which a particle containing the lithium-manganese complex oxide described in Embodiment 1 is used as the positive electrode active material, the electrode described in Embodiment 1 is used as the positive electrode 503, and an active material containing silicon is used as the negative electrode active material.

The capacity of the active material containing silicon, such as silicon or SiO, per weight and volume of the active material is high, and accordingly, capacity per weight and volume of the storage battery can be increased.

Figure 10A:
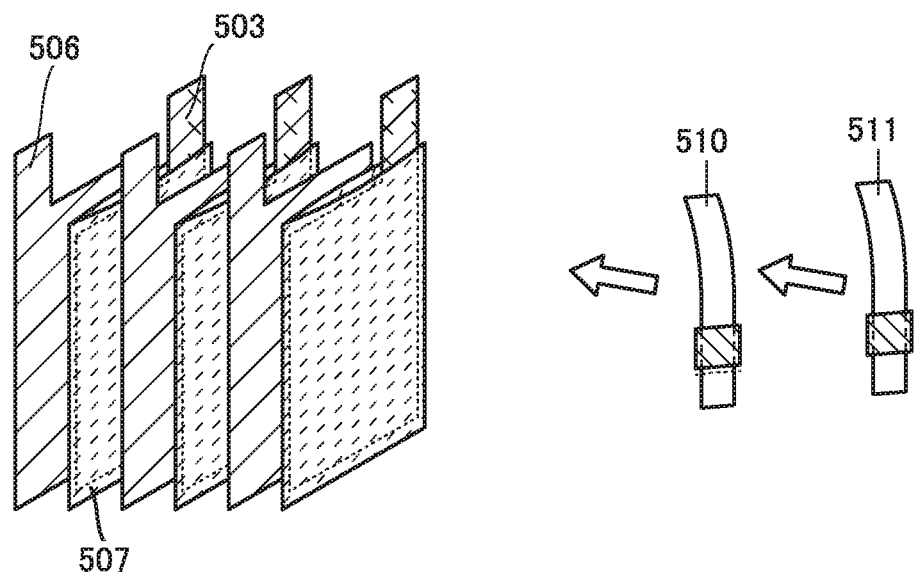
FIGS. 10A and 10B each illustrate a thin storage battery.
Figure 10B:
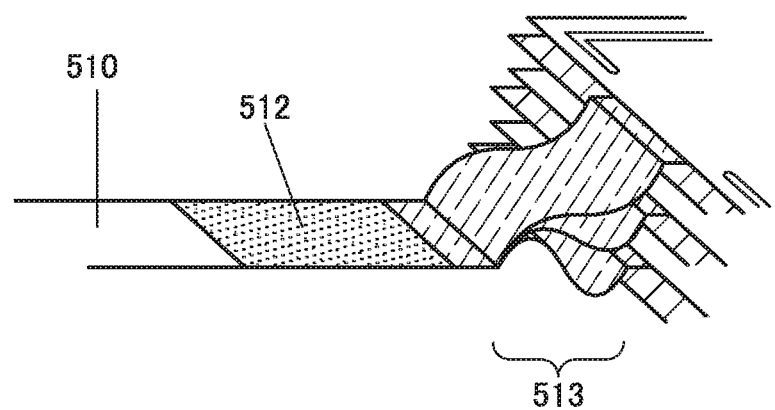

FIGS. 10A and 10B each illustrate an example in which a current collector is welded to a lead electrode, specifically, the positive electrode current collector 501 is welded to a positive electrode lead electrode 510. The positive electrode current collector 501 is welded to the positive electrode lead electrode 510 in a welding region 512 by ultrasonic welding or the like. The positive electrode current collector 501 includes a bent portion 513 illustrated in FIG. 10B, and it is therefore possible to relieve stress due to external force applied after formation of the storage battery 500. Thus, the storage battery 500 can have high reliability.

In the thin storage battery 500 illustrated in FIG. 7 and FIGS. 8A and 8B, the positive electrode lead electrode 510 and a negative electrode lead electrode 511 are welded to the positive electrode current collectors 501 in the positive electrode 503 and the negative electrode current collectors 504 in the negative electrode 506, respectively, by ultrasonic welding. The positive electrode current collector 501 and the negative electrode current collector 504 can double as terminals for electrical contact with the outside. In that case, the positive electrode current collector 501 and the negative electrode current collector 504 may be arranged so that part of the positive electrode current collector 501 and part of the negative electrode current collector 504 are exposed to the outside the exterior body 509 without using lead electrodes.

Figure 11:
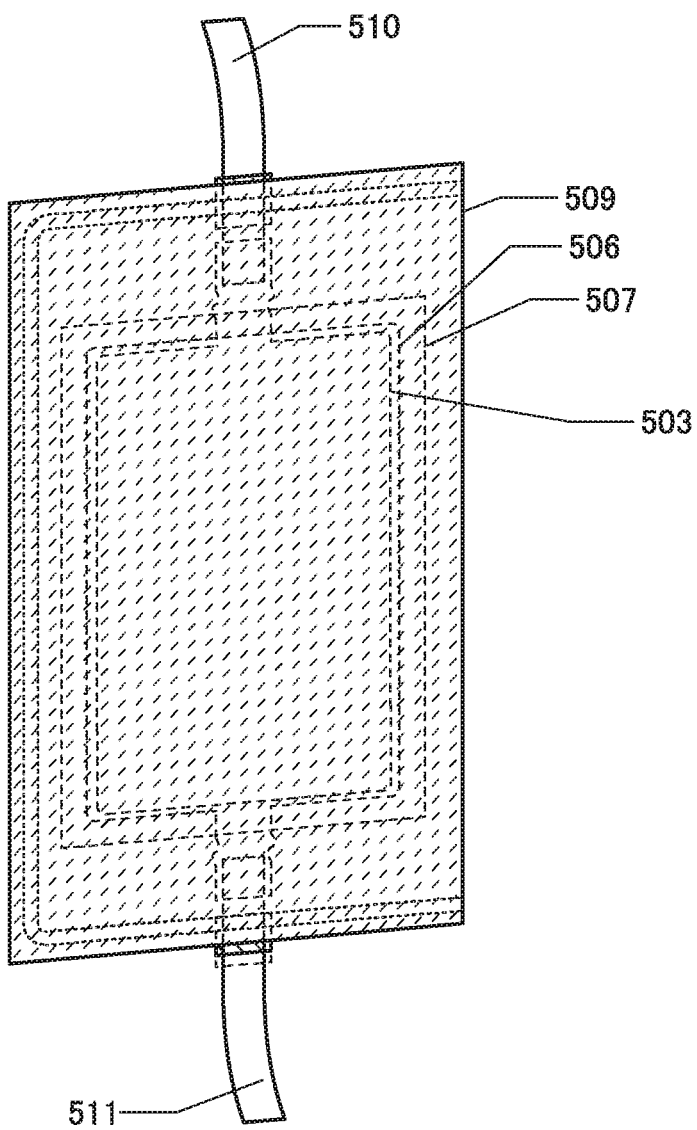
FIG. 11 illustrates a thin storage battery.

Although the positive electrode lead electrode 510 and the negative electrode lead electrode 511 are provided on the same side in FIG. 7, the positive electrode lead electrode 510 and the negative electrode lead electrode 511 may be provided on different sides as illustrated in FIG. 11. The lead electrodes of a storage battery of one embodiment of the present invention can be freely positioned as described above; therefore, the degree of freedom in design is high. Accordingly, a product including a storage battery of one embodiment of the present invention can have a high degree of freedom in design. Furthermore, a yield of products each including a storage battery of one embodiment of the present invention can be increased.

As the exterior body 509 in the thin storage battery 500, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

The example in FIGS. 8A and 8B includes five positive electrode-negative electrode pairs (the positive and negative electrodes face each other). It is needless to say that the number of pairs of electrodes is not limited to five, and may be more than or less than five. In the case of using a large number of electrode layers, the storage battery can have high capacity. In contrast, in the case of using a small number of electrode layers, the storage battery can have a small thickness and high flexibility.

In the above structure, the exterior body 509 of the storage battery can change its form with a radius of greater than or equal to 10 mm, preferably greater than or equal to 30 mm. One or two films are used as the exterior body of the storage battery. In the case where the storage battery has a layered structure, the storage battery has a cross section sandwiched by two curved surfaces of the films when it is bent.

Figure 12A:
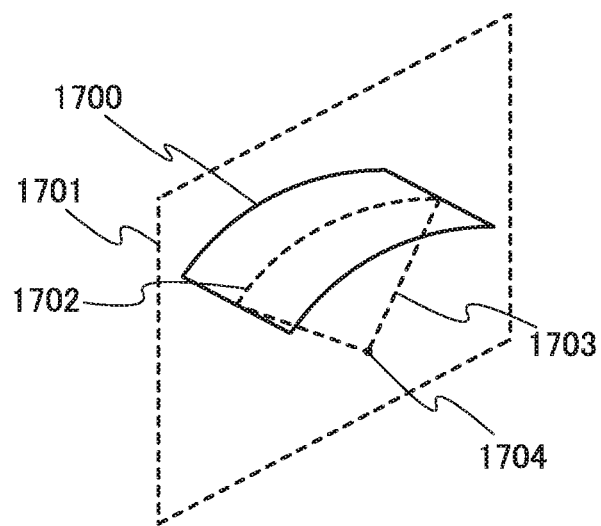
FIGS. 12A to 12C illustrate a radius of curvature of a surface.
Figure 12B:
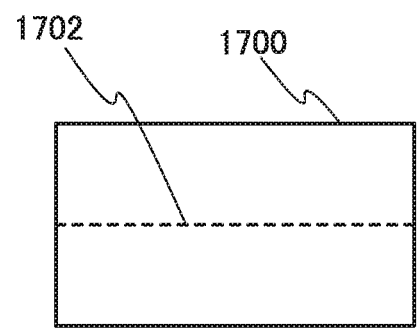
Figure 12C:
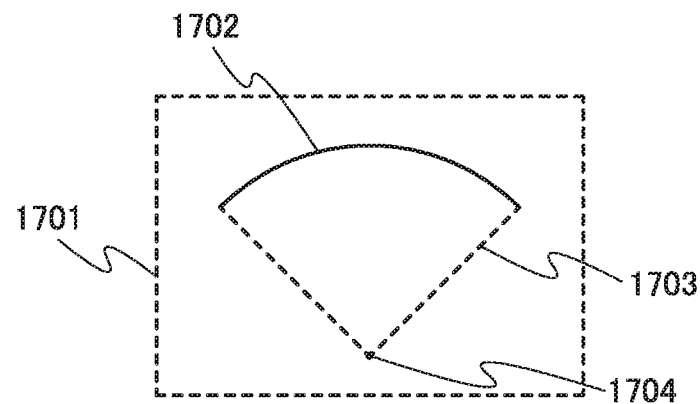

Description is given of the radius of curvature of a surface with reference to FIGS. 12A to 12C. In FIG. 12A, on a plane 1701 along which a curved surface 1700 is cut, part of a curve 1702 of the curved surface 1700 is approximate to an arc of a circle, and the radius of the circle is referred to as a radius of curvature 1703 and the center of the circle is referred to as a center 1704 of curvature. FIG. 12B is a top view of the curved surface 1700. FIG. 12C is a cross-sectional view of the curved surface 1700 taken along the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

Figure 13A:
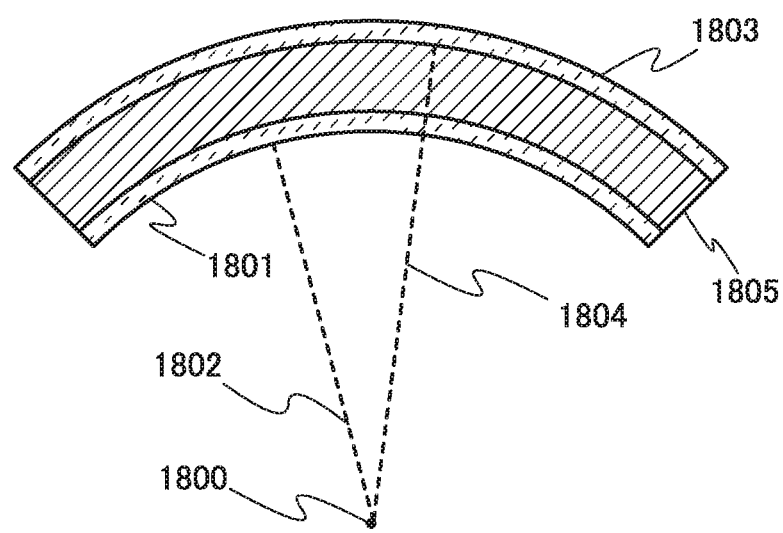
FIGS. 13A to 13D illustrate a radius of curvature of a film.
Figure 13B:
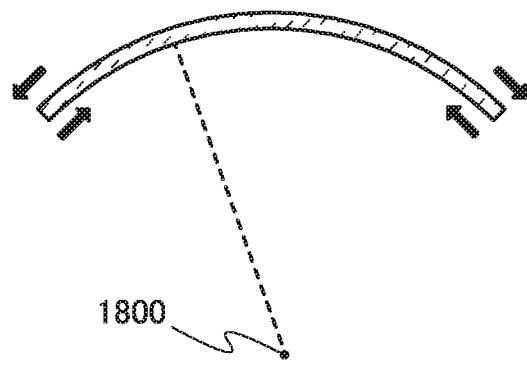

In the case of bending a secondary battery in which electrodes, an electrolyte solution, and the like which are denoted by reference numeral 1805 are sandwiched between two films as exterior bodies, a radius of curvature 1802 of a film 1801 close to a center of curvature 1800 of the secondary battery is smaller than a radius of curvature 1804 of a film 1803 far from the center of curvature 1800 (FIG. 13A). When the secondary battery is curved and has an arc-shaped cross section, compressive stress is applied to a surface of the film on the side closer to the center of curvature 1800 and tensile stress is applied to a surface of the film on the side farther from the center of curvature 1800 (FIG. 13B). However, by forming a pattern including convex portions or concave portions on surfaces of the exterior bodies, the influence of a strain can be reduced to be acceptable even when compressive stress and tensile stress are applied. For this reason, the secondary battery can change its form such that the exterior body on the side closer to the center of curvature has a curvature radius greater than or equal to 30 mm, preferably greater than or equal to 10 mm.

Figure 13C:
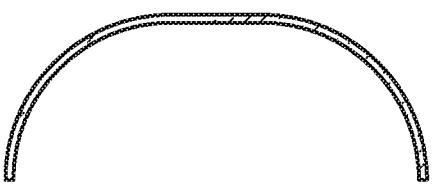
Figure 13D:
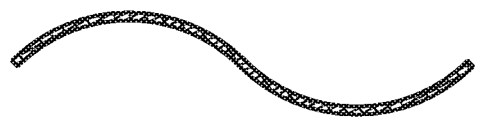

Note that the cross-sectional shape of the secondary battery is not limited to a simple arc shape, and the cross section can be partly arc-shaped; for example, a shape illustrated in FIG. 13C, a wavy shape illustrated in FIG. 13D, or an S shape can be used. When the curved surface of the secondary battery has a shape with a plurality of centers of curvature, the secondary battery can change its form such that a curved surface with the smallest radius of curvature among radii of curvature with respect to the plurality of centers of curvature, which is a surface of the exterior body on the side closer to the center of curvature, has a curvature radius greater than or equal to 30 mm, preferably greater than or equal to 10 mm.

[Thin Storage Battery 2]

Figure 14A:
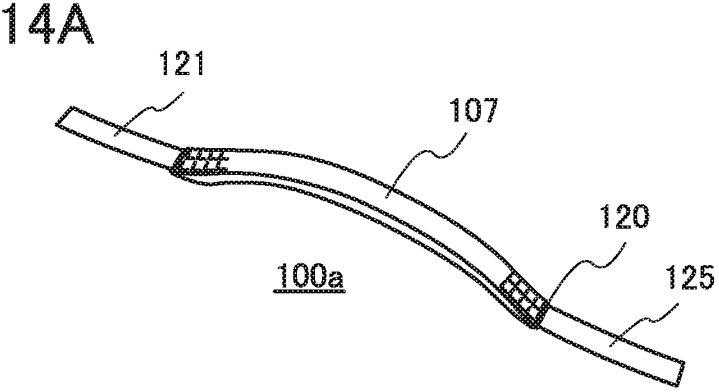
FIGS. 14A to 14C are a perspective view, a top view, and a cross-sectional view illustrating a structure example of a secondary battery.
Figure 14B:
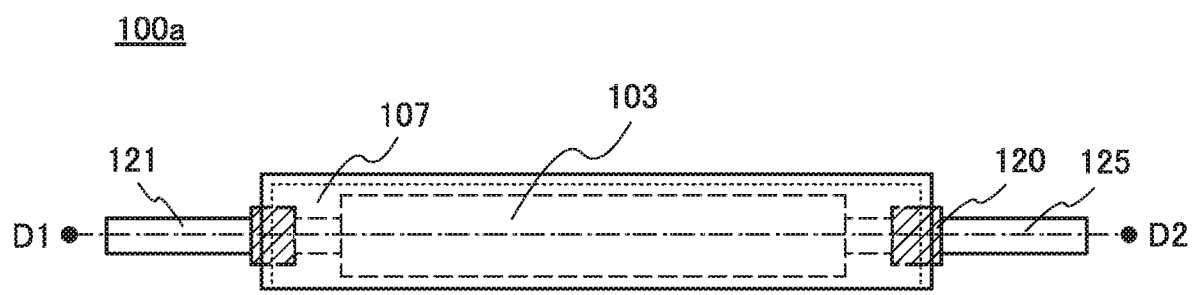
Figure 14C:
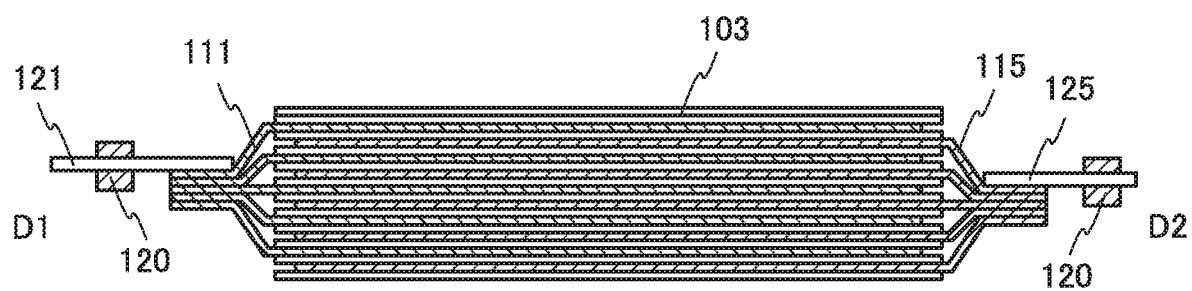

FIGS. 14A to 14C illustrate a secondary battery 100a, which is an example of a thin storage battery different from that illustrated in FIG. 7. FIG. 14A is a perspective view of the secondary battery 100a, and FIG. 14B is a top view thereof. FIG. 14C is a cross-sectional view taken along dashed-dotted line D1-D2 in FIG. 14B. In FIG. 14C, a positive electrode 111, a negative electrode 115, a separator 103, a positive electrode lead electrode 121, a negative electrode lead electrode 125, and a sealing layer 120 are selectively illustrated for the sake of clarity.

Here, some steps in the method for manufacturing the secondary battery 100a illustrated in FIGS. 14A to 14C will be described with reference to FIGS. 15A to 15D.

First, the negative electrode 115 is positioned over the separator 103 (FIG. 15A) such that a negative electrode active material layer in the negative electrode 115 overlaps with the separator 103.

Then, the separator 103 is folded such that part of the separator 103 is positioned over the negative electrode 115. Next, the positive electrode 111 is positioned over the separator 103 (FIG. 15B) such that a positive electrode active material layer included in the positive electrode 111 overlaps with the separator 103 and the negative electrode active material layer. In the case where an electrode in which an active material layer is formed on one surface of a current collector is used, the positive electrode active material layer of the positive electrode 111 and the negative electrode active material layer of the negative electrode 115 are positioned so as to face each other with the separator 103 therebetween.

Figure 15A:
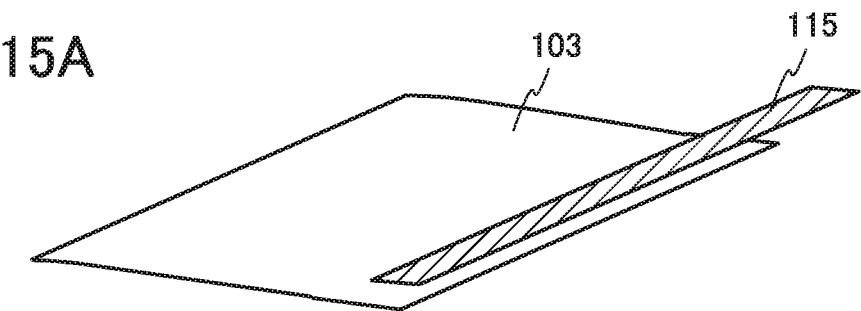
FIGS. 15A to 15D illustrate an example of a manufacturing method of a secondary battery.
Figure 15B:
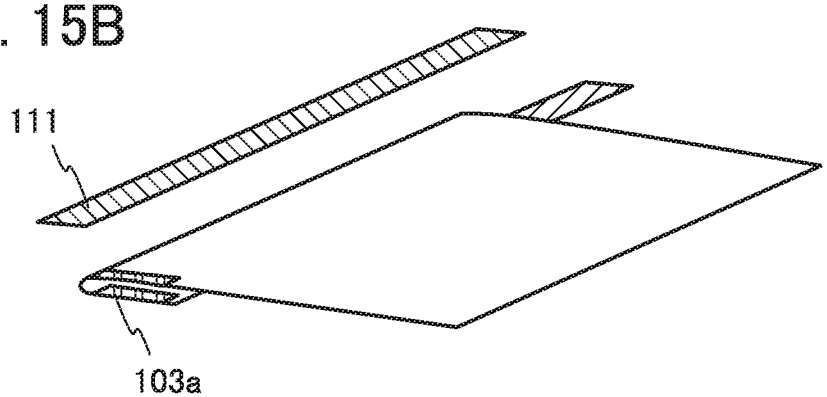

In the case where the separator 103 is formed using a material that can be thermally welded, such as polypropylene, a region where the separator 103 overlap with itself is thermally welded and then another electrode is positioned so as to overlap with the separator 103, whereby the slippage of the electrode in the manufacturing process can be minimized. Specifically, a region which does not overlap with the negative electrode 115 or the positive electrode 111 and in which the separator 103 overlaps with itself, e.g., a region 103a in FIG. 15B, is preferably thermally welded.

Figure 15C:
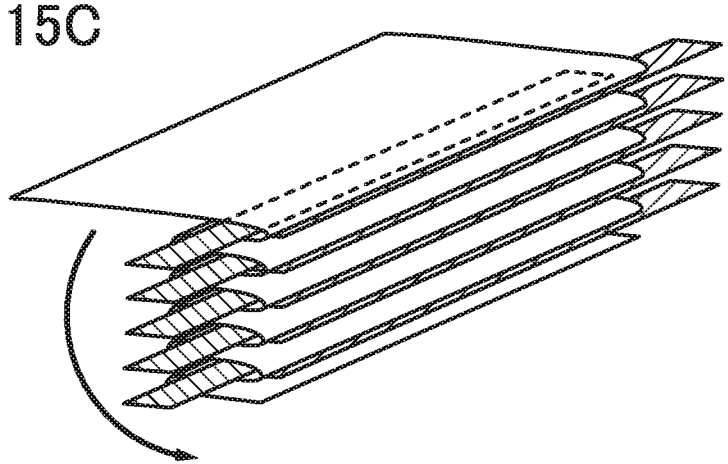

By repeating the above steps, the positive electrode 111 and the negative electrode 115 can overlap with each other with the separator 103 therebetween as illustrated in FIG. 15C.

Note that a plurality of positive electrodes 111 and a plurality of negative electrodes 115 may be placed to be alternately sandwiched by the separator 103 that is repeatedly folded in advance.

Next, as illustrated in FIG. 15C, the positive electrodes 111 and the negative electrodes 115 are covered with the separator 103.

Figure 15D:
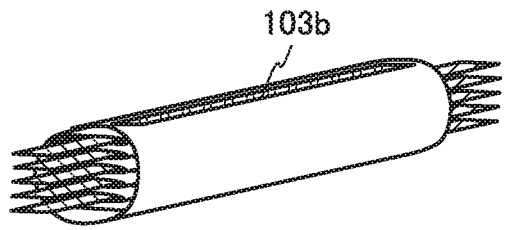

Then, as illustrated in FIG. 15D, a region where the separator 103 overlaps with itself, e.g., a region 103b in FIG. 15D, is thermally welded, and the positive electrodes 111 and the negative electrodes 115 are covered with the separator 103 to be bound.

Note that the positive electrodes 111, the negative electrodes 115, and the separator 103 may be bound with a binding material.

Since the positive electrodes 111 and the negative electrodes 115 are stacked through the above steps, one separator 103 has a region sandwiched between the positive electrode 111 and the negative electrode 115 and a region positioned so as to cover the positive electrodes 111 and the negative electrodes 115.

In other words, the separator 103 included in the secondary battery 100a in FIGS. 14A to 14C is a single separator which is partly folded. In the folded parts of the separator 103, the positive electrodes 111 and the negative electrodes 115 are interposed.

The description in Embodiment 1 can be referred to for, in the secondary battery 100a, bonding regions of an exterior body 107, the shapes of the positive electrodes 111, the negative electrodes 115, the separator 103, and the exterior body 107, and for the structures, except the positions, of the positive electrode lead electrode 121 and the negative electrode lead electrode 125. The manufacturing method described in Embodiment 1 can be referred to for the steps other than the steps of stacking the positive electrodes 111 and the negative electrodes 115 in the manufacturing method of the secondary battery 100a.

[Thin Storage Battery 3]

FIGS. 16A, 16B, 16C1, 16C2, and 16D illustrate a secondary battery 100b, which is an example of a thin storage battery different from that illustrated in FIGS. 14A to 14C. FIG. 16A is a perspective view of a secondary battery 100b, and FIG. 16B is a top view thereof. FIG. 16C1 is a cross-sectional view of a first electrode assembly 130, and FIG. 16C2 is a cross-sectional view of a second electrode assembly 131. FIG. 16D is a cross-sectional view taken along dashed-dotted line E1-E2 in FIG. 16B. In FIG. 16D, the first electrode assembly 130, the second electrode assembly 131, and the separator 103 are selectively illustrated for the sake of clarity.

The secondary battery 100b illustrated in FIGS. 16A, 16B, 16C1, 16C2, and 16D is different from the secondary battery 100a illustrated in FIGS. 14A to 14C in the positions of the positive electrodes 111, the negative electrodes 115, and the separator 103.

As illustrated in FIG. 16D, the secondary battery 100b includes a plurality of first electrode assemblies 130 and a plurality of second electrode assemblies 131.

As illustrated in FIG. 16C1, in each of the first electrode assemblies 130, a positive electrode 111a including the positive electrode active material layers on both surfaces of a positive electrode current collector, the separator 103, a negative electrode 115a including the negative electrode active material layers on both surfaces of a negative electrode current collector, the separator 103, and the positive electrode 111a including the positive electrode active material layers on both surfaces of the positive electrode current collector are stacked in this order. As illustrated in FIG. 16C2, in each of the second electrode assemblies 131, the negative electrode 115a including the negative electrode active material layers on both surfaces of the negative electrode current collector, the separator 103, the positive electrode 111a including the positive electrode active material layers on both surfaces of the positive electrode current collector, the separator 103, and the negative electrode 115a including the negative electrode active material layers on both surfaces of the negative electrode current collector are stacked in this order.

As illustrated in FIG. 16D, the first electrode assemblies 130 and the second electrode assemblies 131 are covered with the wound separator 103.

Here, some steps in the method for manufacturing the secondary battery 100b illustrated in FIGS. 16A, 16B, 16C1, 16C2, and 16D will be described with reference to FIGS. 17A to 17D.

Figure 17A:
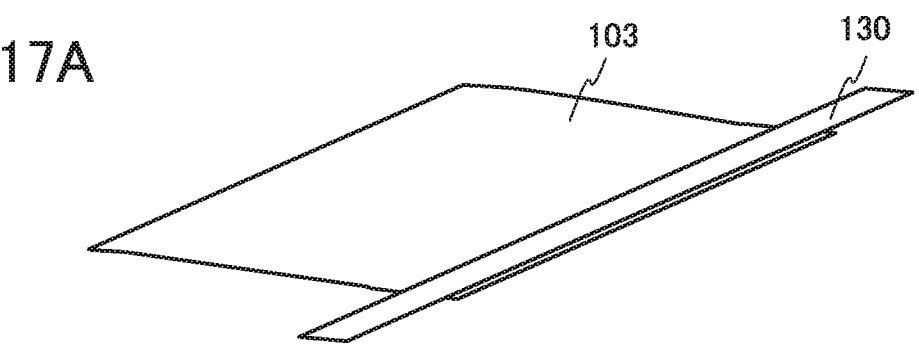
FIGS. 17A to 17D illustrate an example of a manufacturing method of a secondary battery.

First, the first electrode assembly 130 is positioned over the separator 103 (FIG. 17A).

Figure 17B:
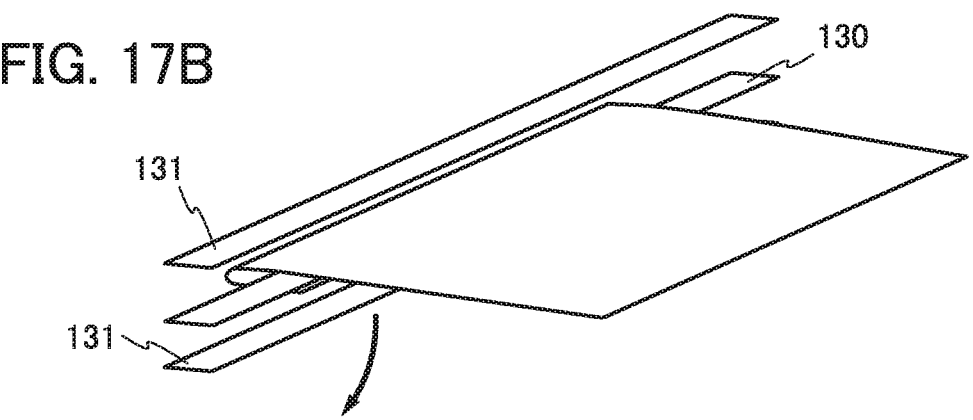

Then, the separator 103 is folded such that part of the separator 103 is positioned over the first electrode assembly 130. Next, two second electrode assemblies 131 are positioned over and under the first electrode assembly 130 with the separator 103 therebetween (FIG. 17B).

Figure 17C:
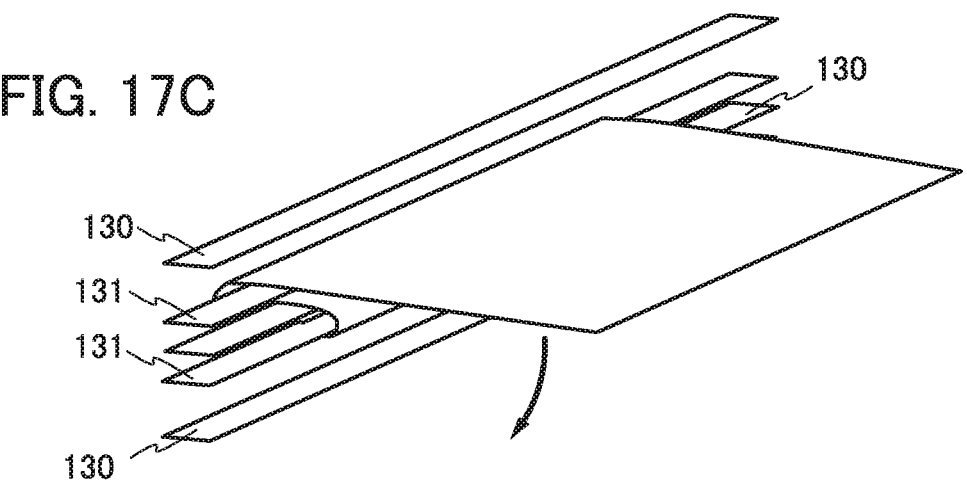

Then, the separator 103 is wound so as to cover the two second electrode assemblies 131. Next, two first electrode assemblies 130 are positioned over and under the two second electrode assemblies 131 with the separator 103 therebetween (FIG. 17C).

Figure 17D:
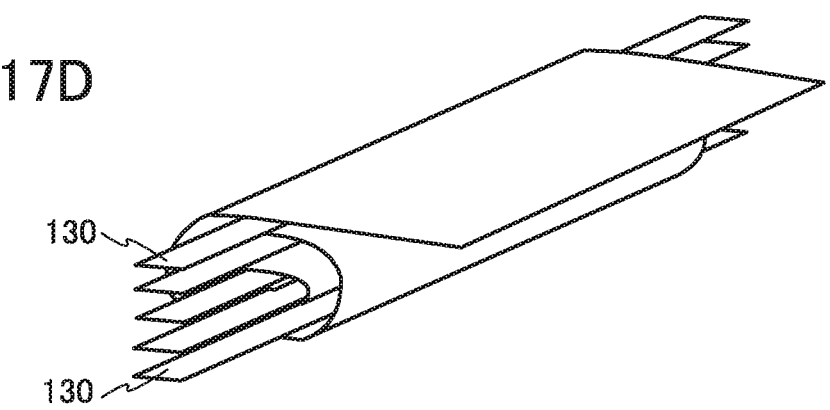

Then, the separator 103 is wound so as to cover the two first electrode assemblies 130 (FIG. 17D).

Since the first electrode assemblies 130 and the second electrode assemblies 131 are stacked through the above steps, the electrode assemblies are positioned between the separator 103 that is spirally wound.

It is preferable that the positive electrode 111a of the first electrode assembly 130 that is positioned on the outermost side not include the positive electrode active material layer on the outer side.

In the example illustrated in FIGS. 16C1 and 16C2, the electrode assembly includes three electrodes and two separators; however, one embodiment of the present invention is not limited to this example. The electrode assembly may include four or more electrodes and three or more separators. As the number of electrodes is increased, the capacity of the secondary battery 100b can be further improved. Note that the electrode assembly may include two electrodes and one separator. In the case where the number of electrodes is small, the secondary battery 100b can have higher resistance to bending. In the example illustrated in FIG. 16D, the secondary battery 100b includes three first electrode assemblies 130 and two second electrode assemblies 131; however, one embodiment of the present invention is not limited to this example. The secondary battery 100b may include more electrode assemblies. As the number of electrode assemblies is increased, the capacity of the secondary battery 100b can be further improved. Note that the secondary battery 100b may include a smaller number of electrode assemblies. In the case where the number of electrode assemblies is small, the secondary battery 100b can have higher resistance to bending.

The description of FIGS. 14A to 14C can be referred to for structures other than the positions of the positive electrodes 111a, the negative electrodes 115a, and the separator 103 of the secondary battery 100b.

[Structure Example of Power Storage System]

Structure examples of power storage systems will be described with reference to FIGS. 18A and 18B, FIGS. 19A1, 19A2, 19B1, and 19B2, and FIGS. 20A and 20B. Here, a power storage system refers to, for example, a device including a power storage device. The power storage system described in this embodiment includes the storage battery manufactured according to one embodiment of the present invention.

Figure 18A:
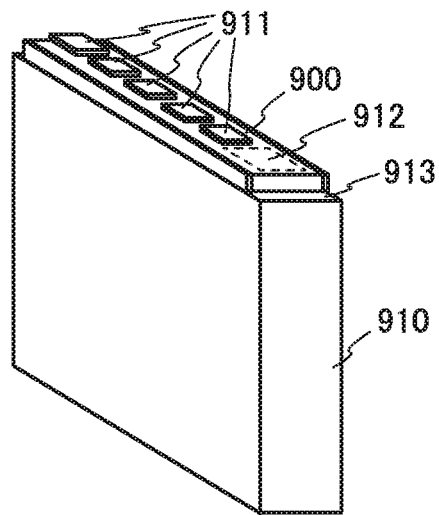
FIGS. 18A and 18B illustrate an example of a power storage system.
Figure 18B:
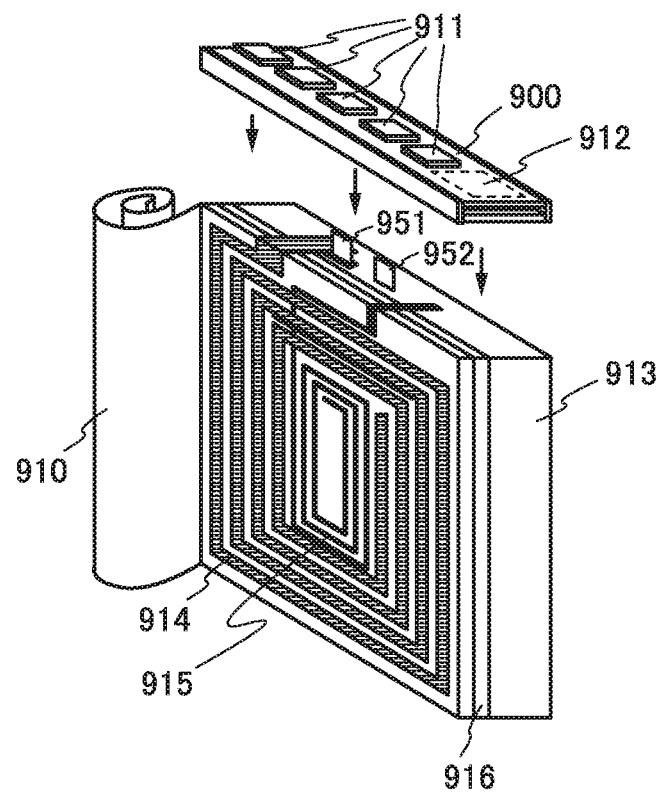

FIGS. 18A and 18B are external views of a power storage system. The power storage system includes a circuit board 900 and a storage battery 913. A label 910 is attached to the storage battery 913. As shown in FIG. 18B, the power storage system includes a terminal 951, a terminal 952, an antenna 914, and an antenna 915.

The circuit board 900 includes terminals 911 and a circuit 912. The terminals 911 are connected to the terminal 951, the terminal 952, the antenna 914, the antenna 915, and the circuit 912. Note that a plurality of terminals 911 serving as a control signal input terminal, a power supply terminal, and the like may be further provided.

The circuit 912 may be provided on the rear surface of the circuit board 900. The shape of each of the antennas 914 and 915 is not limited to a coil shape and may be a linear shape or a plate shape. Furthermore, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage system includes a layer 916 between the storage battery 913 and the antennas 914 and 915. The layer 916 has a function of blocking an electromagnetic field by the storage battery 913. As the layer 916, for example, a magnetic body can be used.

Note that the structure of the power storage system is not limited to that illustrated in FIGS. 18A and 18B.

For example, as shown in FIGS. 19A1 and 19A2, two opposite surfaces of the storage battery 913 in FIGS. 18A and 18B may be provided with respective antennas. FIG. 19A1 is an external view showing one side of the opposite surfaces, and FIG. 19A2 is an external view showing the other side of the opposite surfaces. For portions similar to those in FIGS. 18A and 18B, the description of the power storage system illustrated in FIGS. 18A and 18B can be referred to as appropriate.

As illustrated in FIG. 19A1, the antenna 914 is provided on one of the opposite surfaces of the storage battery 913 with the layer 916 interposed therebetween, and as illustrated in FIG. 19A2, the antenna 915 is provided on the other of the opposite surfaces of the storage battery 913 with a layer 917 interposed therebetween. The layer 917 may have a function of preventing an adverse effect on an electromagnetic field by the storage battery 913. As the layer 917, for example, a magnetic body can be used.

With the above structure, both of the antennas 914 and 915 can be increased in size.

Alternatively, as illustrated in FIGS. 19B1 and 19B2, two opposite surfaces of the storage battery 913 in FIGS. 18A and 18B may be provided with different types of antennas. FIG. 19B1 is an external view showing one side of the opposite surfaces, and FIG. 19B2 is an external view showing the other side of the opposite surfaces. For portions similar to those in FIGS. 18A and 18B, the description of the power storage system illustrated in FIGS. 18A and 18B can be referred to as appropriate.

As illustrated in FIG. 19B1, the antennas 914 and 915 are provided on one of the opposite surfaces of the storage battery 913 with the layer 916 provided between the storage battery 913 and the antennas 914 and 915, and as illustrated in FIG. 19B2, an antenna 918 is provided on the other of the opposite surfaces of the storage battery 913 with the layer 917 provided therebetween. The antenna 918 has a function of communicating data with an external device, for example. An antenna with a shape that can be used for the antennas 914 and 915, for example, can be used as the antenna 918. As a system for communication using the antenna 918 between the power storage system and another device, a response method that can be used between the power storage system and another device, such as NFC, can be employed.

Figure 20A:
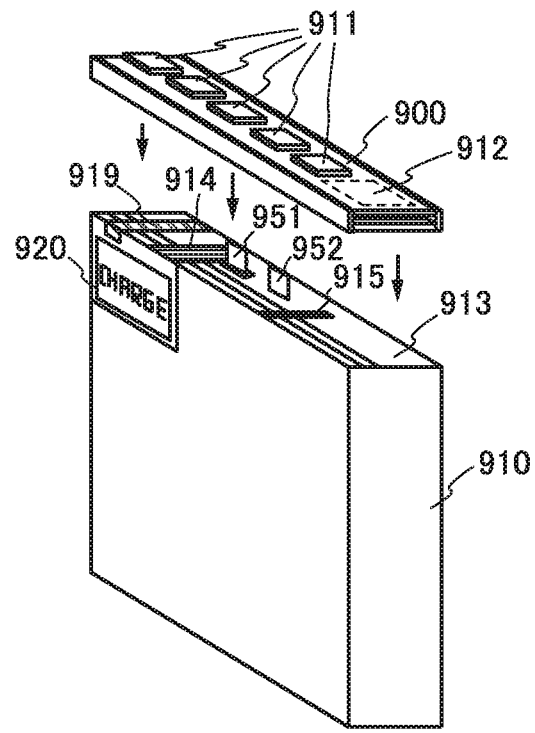
FIGS. 20A and 20B illustrate examples of a power storage system.

Alternatively, as illustrated in FIG. 20A, the storage battery 913 in FIGS. 18A and 18B may be provided with a display device 920. The display device 920 is electrically connected to the terminal 911 via a terminal 919. It is possible that the label 910 is not provided in a portion where the display device 920 is provided. For portions similar to those in FIGS. 18A and 18B, the description of the power storage system illustrated in FIGS. 18A and 18B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 20B:
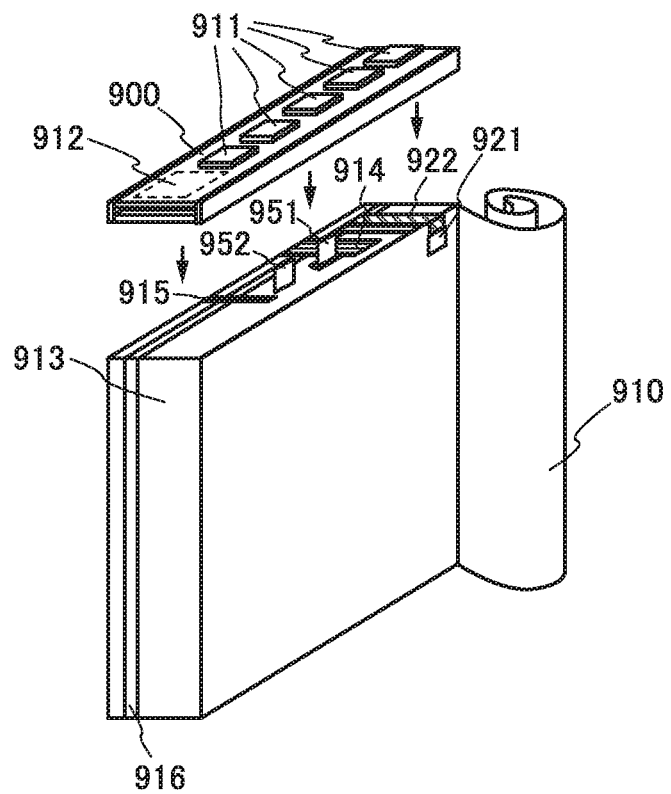

Alternatively, as illustrated in FIG. 20B, the storage battery 913 illustrated in FIGS. 18A and 18B may be provided with a sensor 921. The sensor 921 is electrically connected to the terminal 911 via a terminal 922. For portions similar to those in FIGS. 18A and 18B, the description of the power storage system illustrated in FIGS. 18A and 18B can be referred to as appropriate.

As the sensor 921, a sensor that has a function of measuring, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on an environment (e.g., temperature) where the power storage system is placed can be determined and stored in a memory inside the circuit 912.

The electrode of one embodiment of the present invention is used in the storage battery and the power storage system that are described in this embodiment. The capacity of the storage battery and the power storage system can thus be high. Furthermore, energy density can be high. Moreover, reliability can be high, and life can be long.

This embodiment can be implemented in appropriate combination with any of the other embodiments.

Embodiment 3

In this embodiment, an example of an electronic device including a flexible storage battery which is a power storage device manufactured according to one embodiment of the present invention will be described.

FIGS. 21A to 21G illustrate examples of electronic devices including the flexible power storage device described in the above embodiment. Examples of electronic devices each including the flexible power storage device include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, a flexible power storage device can be incorporated along a curved inside/outside wall surface of a house or a building or a curved interior/exterior surface of an automobile.

Figure 21A:
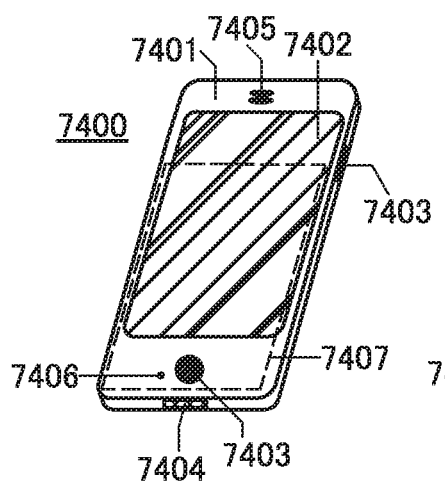
FIGS. 21A to 21G illustrate examples of electronic devices.

FIG. 21A illustrates an example of a mobile phone. A mobile phone 7400 includes a display portion 7402 incorporated in a housing 7401, an operation button 7403, an external connection port 7404, a speaker 7405, a microphone 7406, and the like. Note that the mobile phone 7400 includes a power storage device 7407.

Figure 21B:
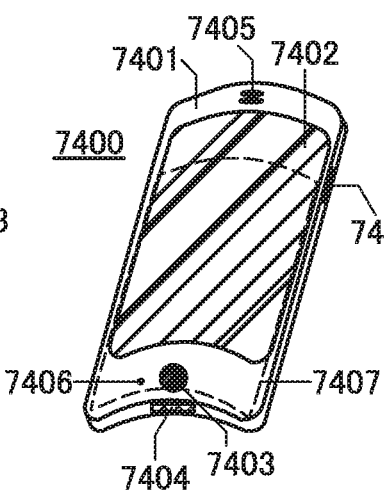
Figure 21C:
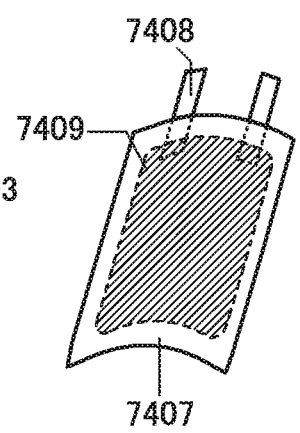

FIG. 21B illustrates the mobile phone 7400 that is curved. When the whole mobile phone 7400 is curved by external force, the power storage device 7407 included in the mobile phone 7400 is also curved. FIG. 21C illustrates the curved power storage device 7407. The power storage device 7407 is a laminated storage battery (also referred to as a layered battery or a film-covered battery). The power storage device 7407 is curved and fixed. Note that the power storage device 7407 includes a lead electrode 7408 electrically connected to a current collector 7409.

Figure 21D:
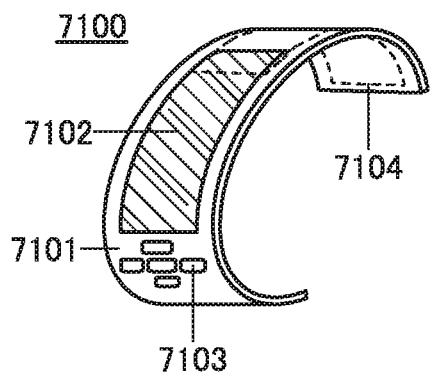
Figure 21E:
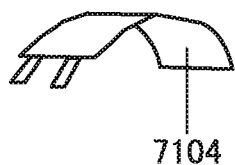

FIG. 21D illustrates an example of a bangle display device. A portable display device 7100 includes a housing 7101, a display portion 7102, an operation button 7103, and a power storage device 7104. FIG. 21E illustrates the bent power storage device 7104. When the display device is worn on a user's arm while the power storage device 7104 is bent, the housing changes its form and the curvature of a part or the whole of the power storage device 7104 is changed. Note that the radius of curvature of a curve at a point refers to the radius of the circular arc that best approximates the curve at that point. The reciprocal of the radius of curvature is curvature. Specifically, a part or the whole of the housing or the main surface of the power storage device 7104 is changed in the range of radius of curvature from 40 mm to 150 mm. When the radius of curvature at the main surface of the power storage device 7104 is greater than or equal to 40 mm and less than or equal to 150 mm, the reliability can be kept high.

Figure 21F:
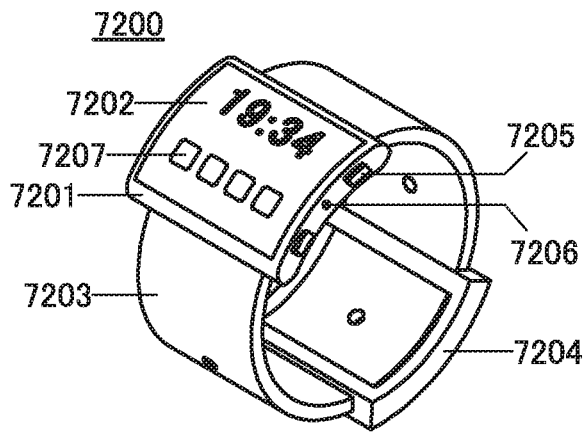

FIG. 21F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, on/off of the power, on/off of wireless communication, setting and cancellation of a silent mode, and setting and cancellation of a power saving mode can be performed. For example, the functions of the operation button 7205 can be set freely by setting the operating system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 is provided with the power storage device of one embodiment of the present invention. For example, the power storage device 7104 illustrated in FIG. 21E that is in the state of being curved can be provided in the housing 7201. Alternatively, the power storage device 7104 illustrated in FIG. 21E can be provided in the band 7203 such that it can be curved.

Figure 21G:
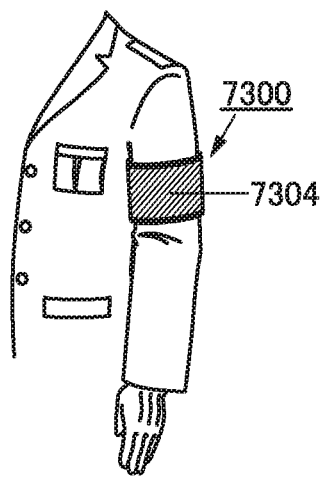

FIG. 21G illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication, which is a communication method based on an existing communication standard.

The display device 7300 includes an input output terminal, and data can be directly transmitted to and received from another information terminal via a connector. In addition, charging via the input output terminal is possible. Note that the charging operation may be performed by wireless power feeding without using the input output terminal.

This embodiment can be implemented in appropriate combination with any of the other embodiments.

Embodiment 4

In this embodiment, examples of electronic devices that can include power storage devices will be described.

Figure 22A:
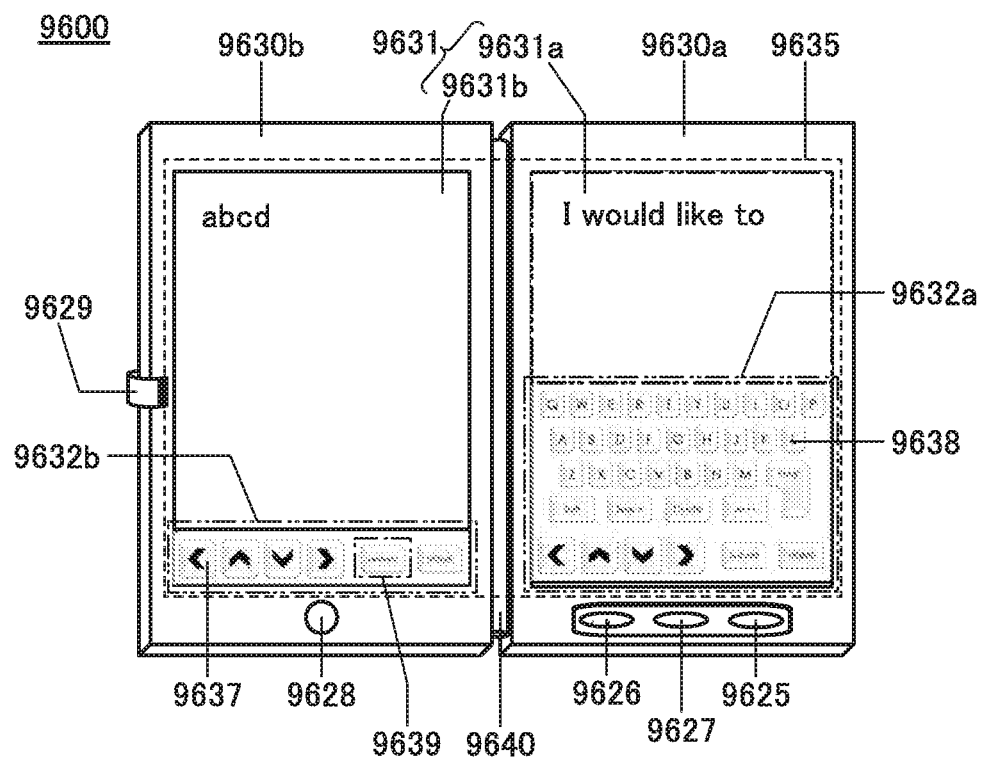
FIGS. 22A to 22C illustrate an example of an electronic device.
Figure 22B:
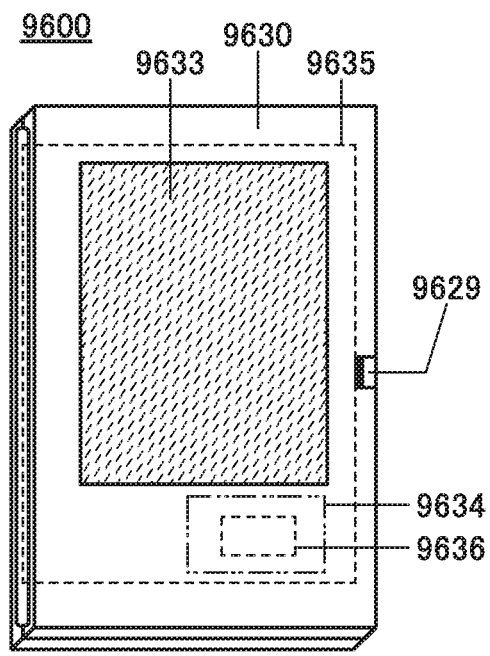

FIGS. 22A and 22B illustrate an example of a tablet terminal that can be folded in half. A tablet terminal 9600 illustrated in FIGS. 22A and 22B includes a housing 9630a, a housing 9630b, a movable portion 9640 connecting the housings 9630a and 9630b, a display portion 9631 including a display portion 9631a and a display portion 9631b, a display mode changing switch 9626, a power switch 9627, a power saving mode changing switch 9625, a fastener 9629, and an operation switch 9628. FIG. 22A illustrates the tablet terminal 9600 that is opened, and FIG. 22B illustrates the tablet terminal 9600 that is closed.

The tablet terminal 9600 includes a power storage unit 9635 inside the housings 9630a and 9630b. The power storage unit 9635 is provided across the housings 9630a and 9630b, passing through the movable portion 9640.

Part of the display portion 9631a can be a touch panel region 9632a, and data can be input by touching operation keys 9638 that are displayed. Note that the figure shows, as an example, that half of the area of the display portion 9631a has only a display function and the other half of the area has a touch panel function. However, the structure of the display portion 9631a is not limited to this, and all the area of the display portion 9631a may have a touch panel function. For example, all the area of the display portion 9631a can display a keyboard and serve as a touch panel while the display portion 9631b can be used as a display screen.

As in the display portion 9631a, part of the display portion 9631b can be a touch panel region 9632b. When a keyboard display switching button 9639 displayed on the touch panel is touched with a finger, a stylus, or the like, a keyboard can be displayed on the display portion 9631b.

Touch input can be performed in the touch panel region 9632a and the touch panel region 9632b at the same time.

The display mode changing switch 9626 allows switching between a landscape mode and a portrait mode, color display and black-and-white display, and the like. The power saving mode changing switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Although the display portion 9631a and the display portion 9631b have the same area in FIG. 22A, one embodiment of the present invention is not limited to this example. The display portion 9631a and the display portion 9631b may have different areas or different display quality. For example, one of the display portions 9631a and 9631b may display higher definition images than the other.

The tablet terminal is closed in FIG. 22B. The tablet terminal includes the housing 9630, a solar cell 9633, and a charge and discharge control circuit 9634 including a DCDC converter 9636. The power storage unit of one embodiment of the present invention is used as the power storage unit 9635.

The tablet terminal 9600 can be folded such that the housings 9630a and 9630b overlap with each other when not in use. Thus, the display portions 9631a and 9631b can be protected, which increases the durability of the tablet terminal 9600. In addition, the power storage unit 9635 of one embodiment of the present invention has flexibility and can be repeatedly bent without a significant decrease in charge and discharge capacity. Thus, a highly reliable tablet terminal can be provided.

The tablet terminal illustrated in FIGS. 22A and 22B can also have a function of displaying various kinds of data (e.g., a still image, a moving image, and a text image) on the display portion, a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processing portion, and the like. Note that the solar cell 9633 is preferable because the solar cell 9633 can be provided on one or both surfaces of the housing 9630 and the power storage unit 9635 can be charged efficiently. The use of a lithium-ion battery as the power storage unit 9635 brings an advantage such as reduction in size.

Figure 22C:
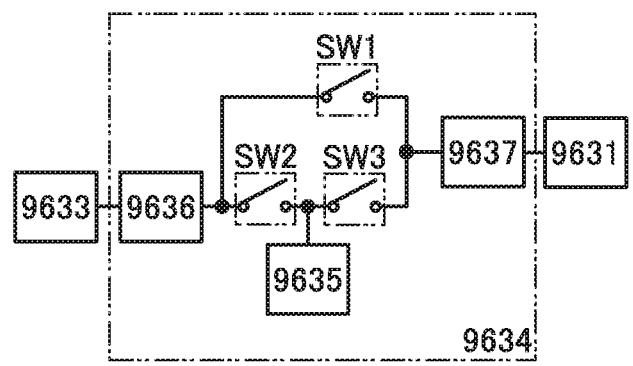

The structure and operation of the charge and discharge control circuit 9634 illustrated in FIG. 22B will be described with reference to a block diagram in FIG. 22C. The solar cell 9633, the power storage unit 9635, the DCDC converter 9636, a converter 9637, switches SW1 to SW3, and the display portion 9631 are illustrated in FIG. 22C, and the power storage unit 9635, the DCDC converter 9636, the converter 9637, and the switches SW1 to SW3 correspond to the charge and discharge control circuit 9634 in FIG. 22B.

First, an example of operation when electric power is generated by the solar cell 9633 using external light will be described. The voltage of electric power generated by the solar cell is raised or lowered by the DCDC converter 9636 to a voltage for charging the power storage unit 9635. When the display portion 9631 operates with the electric power from the solar cell 9633, the switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module capable of performing charging by transmitting and receiving electric power wirelessly (without contact), or any of the other charge means used in combination.

Figure 23:
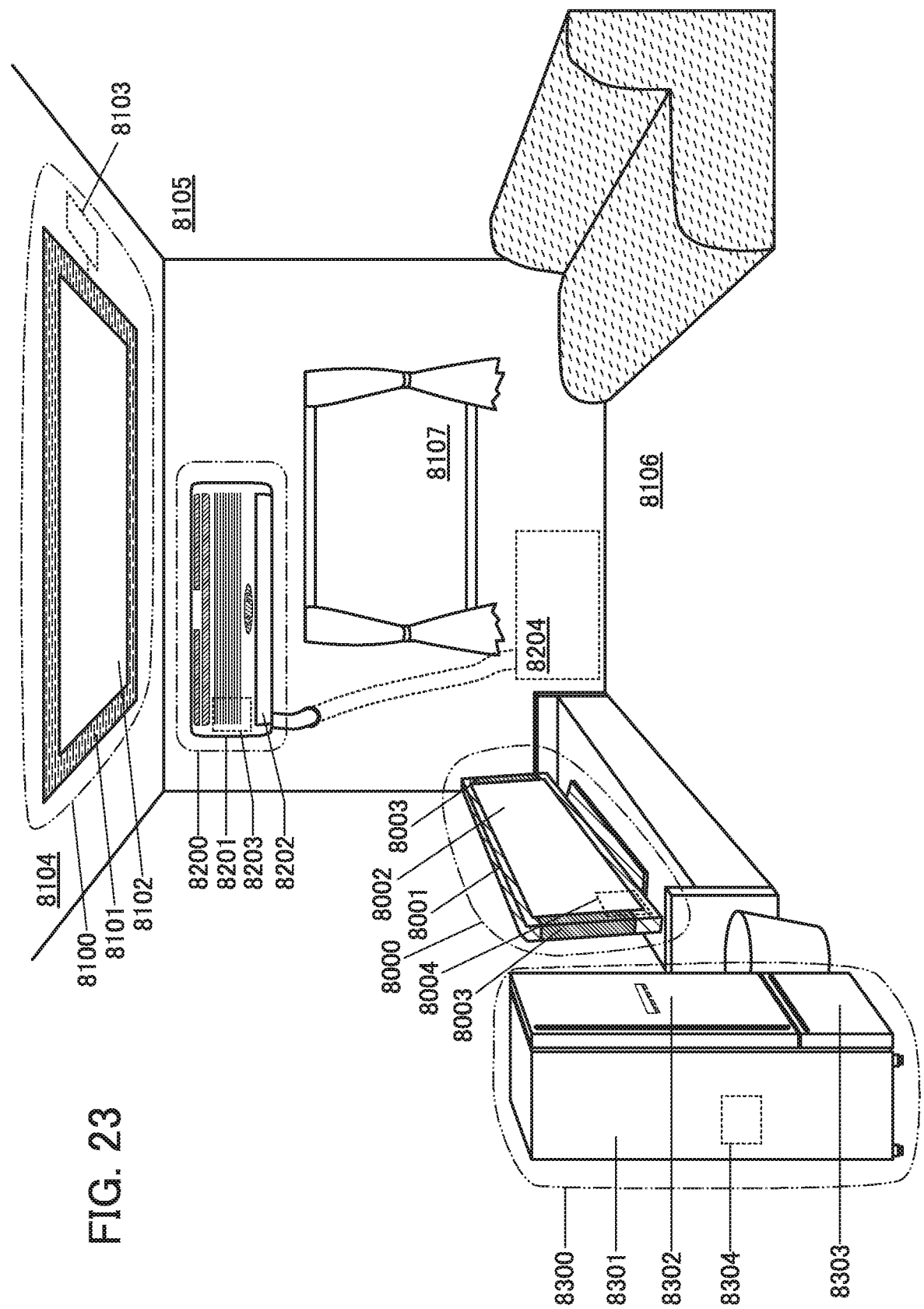
FIG. 23 illustrates examples of electronic devices.

FIG. 23 illustrates other examples of electronic devices. In FIG. 23, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, and the power storage device 8004. The power storage device 8004 of one embodiment of the present invention is provided in the housing 8001. The display device 8000 can receive electric power from a commercial power supply. Alternatively, the display device 8000 can use electric power stored in the power storage device 8004. Thus, the display device 8000 can operate with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 23, an installation lighting device 8100 is an example of an electronic device including a power storage device 8103 of one embodiment of the present invention. Specifically, the lighting device 8100 includes a housing 8101, a light source 8102, and the power storage device 8103. Although FIG. 23 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can operate with the use of power storage device 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 23 as an example, the power storage device of one embodiment of the present invention can be used in an installation lighting device provided in, for example, a wall 8105, a floor 8106, a window 8107, or the like other than the ceiling 8104. Alternatively, the power storage device of one embodiment of the present invention can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 23, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, and the power storage device 8203. Although FIG. 23 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where the power storage devices 8203 are provided in both the indoor unit 8200 and the outdoor unit 8204, the air conditioner can operate with the use of the power storage device 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 23 as an example, the power storage device of one embodiment of the present invention can be used in an air conditioner in which the functions of an indoor unit and an outdoor unit are integrated in one housing.

In FIG. 23, an electric refrigerator-freezer 8300 is an example of an electronic device including a power storage device 8304 of one embodiment of the present invention. Specifically, the electric refrigerator-freezer 8300 includes a housing 8301, a refrigerator door 8302, a freezer door 8303, and the power storage device 8304. The power storage device 8304 is provided in the housing 8301 in FIG. 23. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can operate with the use of the power storage device 8304 of one embodiment of the present invention as an uninterruptible power supply even when electric power cannot be supplied from a commercial power supply due to power failure or the like.

Note that a high-frequency heating apparatus such as a microwave oven and an electronic device such as an electric rice cooker require high power in a short time. The tripping of a breaker of a commercial power supply in use of an electronic device can be prevented by using the power storage device of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electronic devices are used. For example, in the case of the electric refrigerator-freezer 8300, electric power can be stored in the power storage device 8304 in nighttime when the temperature is low and the refrigerator door 8302 and the freezer door 8303 are not often opened or closed. On the other hand, in daytime when the temperature is high and the refrigerator door 8302 and the freezer door 8303 are frequently opened and closed, the power storage device 8304 is used as an auxiliary power supply; thus, the usage rate of electric power in daytime can be reduced.

This embodiment can be implemented in combination with any of the other embodiments as appropriate.

Embodiment 5

In this embodiment, examples of vehicles using power storage devices will be described.

The use of power storage devices in vehicles enables production of next-generation clean energy vehicles such as hybrid electric vehicles (HEVs), electric vehicles (EVs), and plug-in hybrid electric vehicles (PHEVs).

Figure 24A:
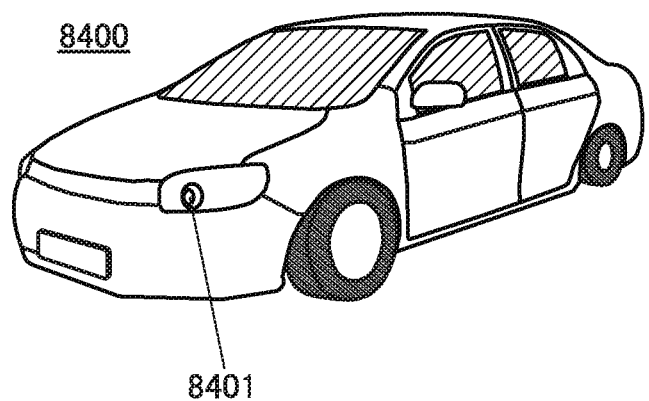
FIGS. 24A and 24B each illustrate an example of an electronic device.
Figure 24B:
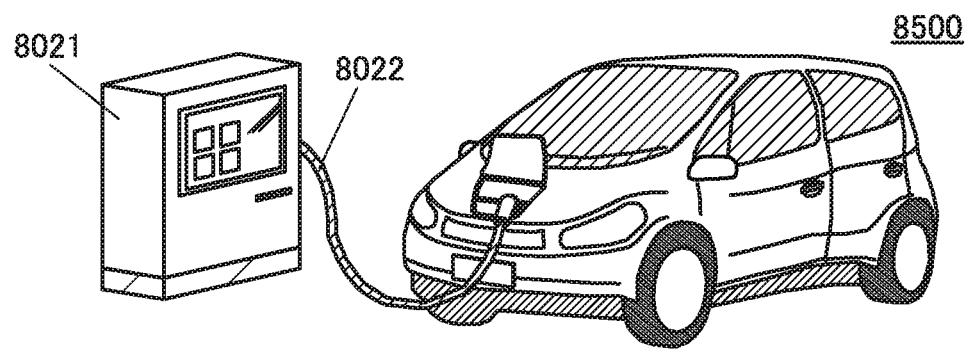

FIGS. 24A and 24B each illustrate an example of a vehicle fabricated using one embodiment of the present invention. An automobile 8400 illustrated in FIG. 24A is an electric vehicle that runs on the power of an electric motor. Alternatively, the automobile 8400 is a hybrid electric vehicle capable of driving using either an electric motor or an engine as appropriate. One embodiment of the present invention can provide a high-mileage vehicle. The automobile 8400 includes the power storage device. The power storage device is used not only to drive the electric motor, but also to supply electric power to a light-emitting device such as a headlight 8401 or a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

FIG. 24B illustrates an automobile 8500 including the power storage device (not illustrated). The automobile 8500 can be charged when the power storage device is supplied with electric power through external charging equipment by a plug-in system, a contactless power feeding system, or the like. In FIG. 24B, the power storage device included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. With the use of a plug-in technique, the power storage device included in the automobile 8500 can be charged by being supplied with electric power from outside, for example. The charging can be performed by converting AC electric power into DC electric power through a converter such as an ACDC converter.

Although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle stops but also when moves. In addition, the contactless power feeding system may be utilized to perform transmission and reception of electric power between vehicles. A solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Furthermore, the power storage device included in the vehicle can be used as a power source for supplying electric power to products other than the vehicle. In such a case, the use of a commercial power source can be avoided at peak time of electric power demand.

This embodiment can be implemented in appropriate combination with any of the other embodiments.

Embodiment 6

In this embodiment, a battery management unit (BMU) which can be combined with a battery cell containing the material described in the above embodiment, and a transistor suitable for a circuit included in the battery management unit will be described with reference to FIG. 25, FIGS. 26A to 26C, FIG. 27, FIG. 28, FIGS. 29A to 29C, FIG. 30, and FIG. 31. In this embodiment, a battery management unit of a power storage device that includes battery cells connected in series will be particularly described.

When a plurality of battery cells connected in series are charged and discharged repeatedly, each battery cell has different capacity (output voltage) from one another due to the variation in characteristics among the battery cells. Discharge capacities of all of the battery cells connected in series depend on a battery cell with small capacity. Capacity variation among the battery cells reduces the entire discharge capacity. Charging based on a battery cell with small capacity may cause insufficient charging. Charging based on a battery cell with high capacity may cause overcharge.

Thus, the battery management unit of the power storage device that includes the battery cells connected in series has a function of reducing capacity variation among the battery cells which causes insufficient charging or overcharge. Examples of circuit structures for reducing capacity variation among the battery cells include a resistive type, a capacitor type, and an inductor type; here, a circuit structure which can reduce capacity variation using a transistor with a low off-state current is explained as an example.

A transistor including an oxide semiconductor in its channel formation region (an OS transistor) is preferably used as the transistor with a low off-state current. When an OS transistor with a low off-state current is used in the circuit structure of the battery management unit of the power storage device, the amount of electric charge leaking from a battery cell can be reduced, and reduction in capacity over time can be suppressed.

As the oxide semiconductor used in the channel formation region, an In-M-Zn oxide (M is Ga, Sn, Y, Zr, La, Ce, or Nd) is used. In the case where a target having the atomic ratio of the metal elements of In:M:Zn=$x_1$:$y_1$:$z_1$ is used for forming an oxide semiconductor film, $x_1/y_1$ is preferably greater than or equal to ⅓ and less than or equal to 6 and further preferably greater than or equal to 1 and less than or equal to 6, and $z_1/y_1$ is preferably greater than or equal to ⅓ and less than or equal to 6 and further preferably greater than or equal to 1 and less than or equal to 6. Note that when $z_1/y_1$ is greater than or equal to 1 and less than or equal to 6, a CAAC-OS film as the oxide semiconductor film is easily formed.

Here, a CAAC-OS film is described.

The CAAC-OS film is one of oxide semiconductor films having a plurality of c-axis aligned crystal parts.

With a transmission electron microscope (TEM), a combined analysis image (also referred to as a high-resolution TEM image) of a bright-field image and a diffraction pattern of the CAAC-OS film is observed. Consequently, a plurality of crystal parts are observed clearly. However, in the high-resolution TEM image, a boundary between crystal parts, i.e., a grain boundary is not observed clearly. Thus, in the CAAC-OS film, a reduction in electron mobility due to the grain boundary is less likely to occur.

According to the high-resolution cross-sectional TEM image of the CAAC-OS film observed in a direction substantially parallel to a sample surface, metal atoms are arranged in a layered manner in the crystal parts. Each metal atom layer has a morphology that reflects a surface over which the CAAC-OS film is formed (also referred to as a formation surface) or a top surface of the CAAC-OS film, and is provided parallel to the formation surface or the top surface of the CAAC-OS film.

On the other hand, according to the high-resolution planar TEM image of the CAAC-OS film observed in a direction substantially perpendicular to the sample surface, metal atoms are arranged in a triangular or hexagonal configuration in the crystal parts. However, there is no regularity of arrangement of metal atoms between different crystal parts.

The CAAC-OS film is subjected to structural analysis with an X-ray diffraction (XRD) apparatus. For example, when the CAAC-OS film including an $InGaZnO_4$ crystal is analyzed by an out-of-plane method, a peak appears frequently when the diffraction angle (2θ) is around 31°. This peak is assigned to the (009) plane of the $InGaZnO_4$ crystal, which indicates that crystals in the CAAC-OS film have c-axis alignment, and that the c-axes are aligned in a direction substantially perpendicular to the formation surface or the top surface of the CAAC-OS film.

Note that when the CAAC-OS film with an $InGaZnO_4$ crystal is analyzed by an out-of-plane method, a peak of 2θ may also be observed at around 36°, in addition to the peak of 2θ at around 31°. The peak of 2θ at around 36° indicates that a crystal having no c-axis alignment is included in part of the CAAC-OS film. It is preferable that in the CAAC-OS film, a peak of 2θ appear at around 31° and a peak of 2θ not appear at around 36°.

The CAAC-OS film is an oxide semiconductor film having low impurity concentration. The impurity is an element other than the main components of the oxide semiconductor film, such as hydrogen, carbon, silicon, or a transition metal element. In particular, an element that has higher bonding strength to oxygen than a metal element included in the oxide semiconductor film, such as silicon, disturbs the atomic order of the oxide semiconductor film by depriving the oxide semiconductor film of oxygen and causes a decrease in crystallinity. Furthermore, a heavy metal such as iron or nickel, argon, carbon dioxide, or the like has a large atomic radius (molecular radius), and thus disturbs the atomic order of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having low density of defect states. In some cases, oxygen vacancies in the oxide semiconductor film serve as carrier traps or serve as carrier generation sources when hydrogen is captured therein.

The state in which impurity concentration is low and density of defect states is low (the number of oxygen vacancies is small) is referred to as "highly purified intrinsic" or "substantially highly purified intrinsic." A highly purified intrinsic or substantially highly purified intrinsic oxide semiconductor film has few carrier generation sources, and thus can have low carrier density. Thus, a transistor including the oxide semiconductor film rarely has negative threshold voltage (is rarely normally on). The highly purified intrinsic or substantially highly purified intrinsic oxide semiconductor film has few carrier traps. Accordingly, the transistor including the oxide semiconductor film has few variations in electrical characteristics and high reliability. Charge trapped by the carrier traps in the oxide semiconductor film takes a long time to be released and may behave like fixed charge. Thus, the transistor that includes the oxide semiconductor film having high impurity concentration and high density of defect states has unstable electrical characteristics in some cases.

In a transistor including the CAAC-OS film, changes in electrical characteristics of the transistor due to irradiation with visible light or ultraviolet light are small.

Since the OS transistor has a wider band gap than a transistor including silicon in its channel formation region (a Si transistor), dielectric breakdown at the time when a high voltage is applied is unlikely to occur. Although a voltage of several hundreds of volts is generated when battery cells are connected in series, the above-described OS transistor is suitable for the circuit of the battery management unit, which is used for such battery cells, in the power storage device.

Figure 25:
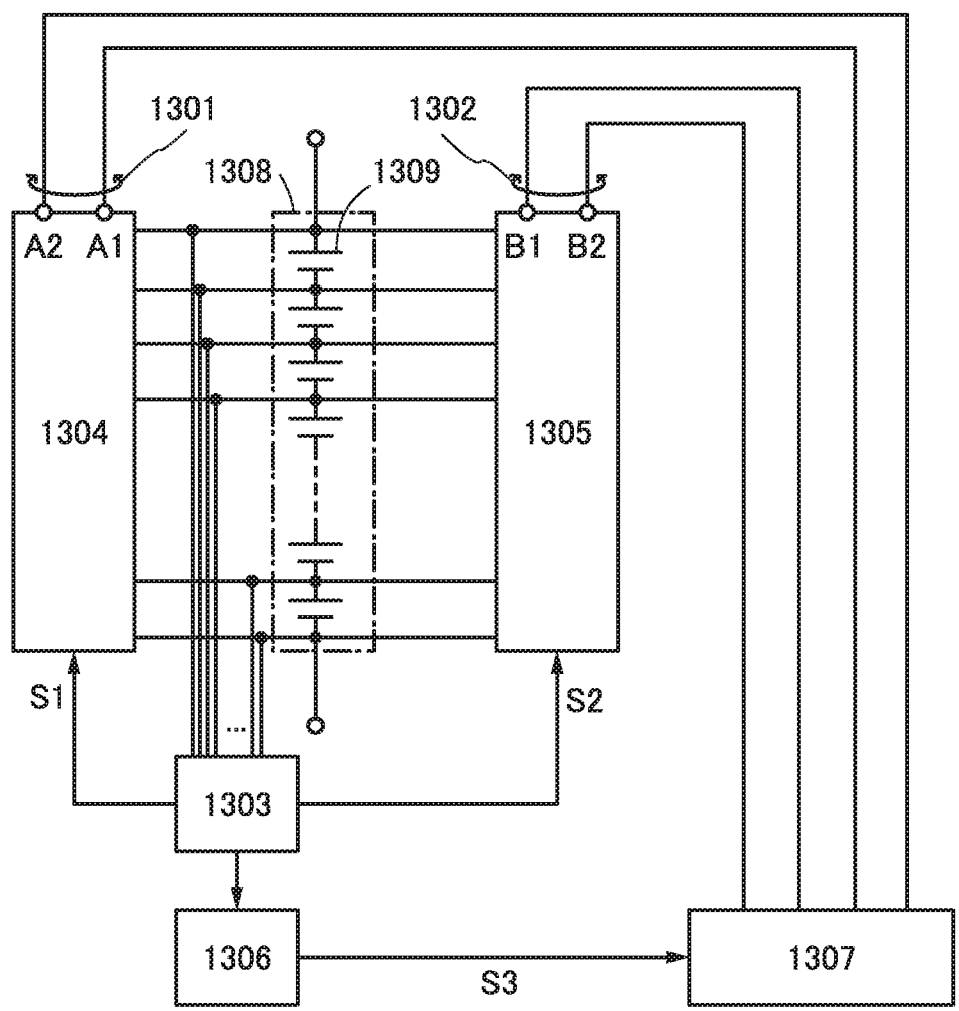
FIG. 25 is a block diagram illustrating one embodiment of the present invention.

FIG. 25 is an example of a block diagram of the power storage device. A power storage device 1300 illustrated in FIG. 25 includes a terminal pair 1301, a terminal pair 1302, a switching control circuit 1303, a switching circuit 1304, a switching circuit 1305, a voltage transformation control circuit 1306, a voltage transformer circuit 1307, and a battery portion 1308 including a plurality of battery cells 1309 connected in series.

In the power storage device 1300 illustrated in FIG. 25, a portion including the terminal pair 1301, the terminal pair 1302, the switching control circuit 1303, the switching circuit 1304, the switching circuit 1305, the voltage transformation control circuit 1306, and the voltage transformer circuit 1307 can be referred to as a battery management unit.

The switching control circuit 1303 controls operations of the switching circuits 1304 and 1305. Specifically, the switching control circuit 1303 determines battery cells to be discharged (a discharge battery cell group) and battery cells to be charged (a charge battery cell group) in accordance with voltage measured for every battery cell 1309.

Furthermore, the switching control circuit 1303 outputs a control signal S1 and a control signal S2 on the basis of the determined discharge battery cell group and the determined charge battery cell group. The control signal S1 is output to the switching circuit 1304. The control signal S1 controls the switching circuit 1304 so that the terminal pair 1301 and the discharge battery cell group are connected to each other. The control signal S2 is output to the switching circuit 1305. The control signal S2 controls the switching circuit 1305 so that the terminal pair 1302 and the charge battery cell group are connected to each other.

The switching control circuit 1303 generates the control signal S1 and the control signal S2 on the basis of connection relation of the switching circuit 1304, the switching circuit 1305, and the voltage transformer circuit 1307 so that terminals having the same polarity are connected to each other in the terminal pair 1302 and the charge battery cell group.

An operation of the switching control circuit 1303 is described in detail.

First, the switching control circuit 1303 measures the voltage of each of the battery cells 1309. Then, the switching control circuit 1303 determines the battery cell 1309 having a voltage higher than a predetermined threshold value as a high-voltage battery cell (high-voltage cell) and the battery cell 1309 having a voltage lower than the predetermined threshold value as a low-voltage battery cell (low-voltage cell), for example.

As a method to determine whether a battery cell is a high-voltage cell or a low-voltage cell, any of various methods can be employed. For example, the switching control circuit 1303 may determine whether each battery cell 1309 is a high-voltage cell or a low-voltage cell on the basis of the voltage of the battery cell 1309 having a highest voltage or a lowest voltage among the battery cells 1309. In this case, the switching control circuit 1303 can determine whether each battery cell 1309 is a high-voltage cell or a low-voltage cell by determining whether or not a ratio of a voltage of each battery cell 1309 to the reference voltage is the predetermined value or more. Then, the switching control circuit 1303 determines a charge battery cell group and a discharge battery cell group on the basis of the determination result.

Note that high-voltage cells and low-voltage cells are possibly mixed in various states in the battery cells 1309. The switching control circuit 1303 determines a portion having the largest number of consecutive high-voltage cells connected in series as the discharge battery cell group of mixed high-voltage cells and low-voltage cells, for example. Furthermore, the switching control circuit 1303 determines, for example, a portion having the largest number of consecutive low-voltage cells connected in series as the charge battery cell group. In addition, the switching control circuit 1303 may preferentially select the battery cells 1309 which are nearly overcharged or overdischarged as the discharge battery cell group or the charge battery cell group.

Figure 26A:
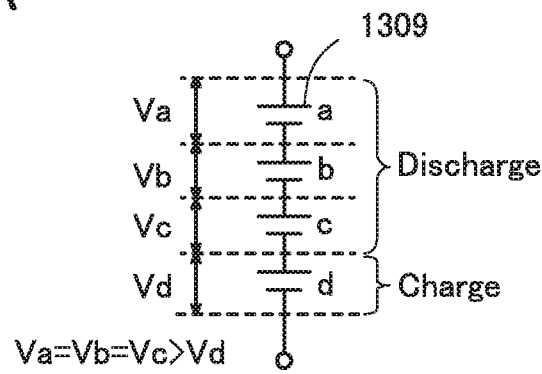
FIGS. 26A to 26C are conceptual diagrams each illustrating one embodiment of the present invention.
Figure 26B:
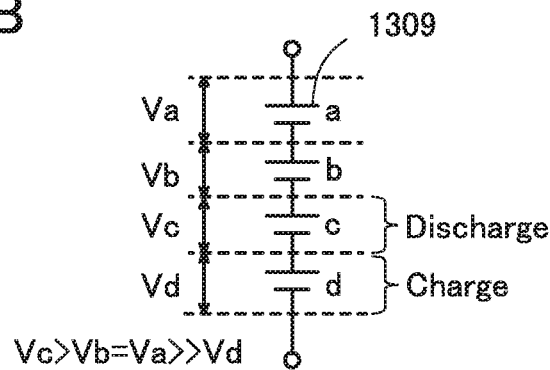
Figure 26C:
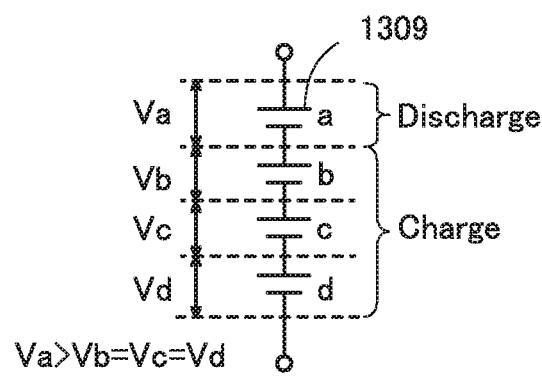

Here, operation examples of the switching control circuit 1303 in this embodiment are described with reference to FIGS. 26A to 26C. FIGS. 26A to 26C illustrate operation examples of the switching control circuit 1303. Note that FIGS. 26A to 26C each illustrate the case where four battery cells 1309 are connected in series as an example for convenience of explanation.

FIG. 26A shows the case where the relation $Va=Vb=Vc>Vd$ is satisfied where Va, Vb, Vc, and Vd are voltages of a battery cell 1309a, a battery cell 1309b, a battery cell 1309c, and a battery cell 1309d, respectively. That is, three consecutive high-voltage cells a to c and one low-voltage cell d are connected in series. In that case, the switching control circuit 1303 determines the series of three high-voltage cells a to c as the discharge battery cell group and the low-voltage cell d as the charge battery cell group.

FIG. 26B shows the case where the relation $Vc>Vb=Va \gg Vd$ is satisfied. That is, two consecutive low-voltage cells a and b, one high-voltage cell c, and one low-voltage cell d which is nearly overdischarged are connected in series. In that case, the switching control circuit 1303 determines the high-voltage cell c as the discharge battery cell group. Since the low-voltage cell d is nearly overdischarged, the switching control circuit 1303 preferentially determines the low-voltage cell d as the charge battery cell group instead of the two consecutive low-voltage cells a and b.

FIG. 26C shows the case where the relation $Va>Vb=Vc=Vd$ is satisfied. That is, one high-voltage cell a and three consecutive low-voltage cells b to d are connected in series. In that case, the switching control circuit 1303 determines the high-voltage cell a as the discharge battery cell group and the three consecutive low-voltage cells b to d as the charge battery cell group.

On the basis of the determination result shown in the examples of FIGS. 26A to 26C, the switching control circuit 1303 outputs the control signal S1 and the control signal S2 to the switching circuit 1304 and the switching circuit 1305, respectively. The control signal S1 contains information indicating the discharge battery cell group being the connection destination of the switching circuit 1304. The control signal S2 contains information indicating the charge battery cell group being a connection destination of the switching circuit 1305.

The above is the detailed description of the operation of the switching control circuit 1303.

The switching circuit 1304 sets the discharge battery cell group, which is determined by the switching control circuit 1303, as the connection destination of the terminal pair 1301 in response to the control signal S1 output from the switching control circuit 1303.

The terminal pair 1301 includes a pair of terminals A1 and A2. The switching circuit 1304 sets the connection destination of the terminal pair 1301 by connecting one of the pair of terminals A1 and A2 to a positive electrode terminal of the battery cell 1309 positioned on the most upstream side (on the high potential side) of the discharge battery cell group, and the other to a negative electrode terminal of the battery cell 1309 positioned on the most downstream side (on the low potential side) of the discharge battery cell group. Note that the switching circuit 1304 can recognize the position of the discharge battery cell group on the basis of the information contained in the control signal S1.

The switching circuit 1305 sets the charge battery cell group, which is determined by the switching control circuit 1303, as the connection destination of the terminal pair 1302 in response to the control signal S2 output from the switching control circuit 1303.

The terminal pair 1302 includes a pair of terminals B1 and B2. The switching circuit 1305 sets the connection destination of the terminal pair 1302 by connecting one of the pair of terminals B1 and B2 to a positive electrode terminal of the battery cell 1309 positioned on the most upstream side (on the high potential side) of the charge battery cell group, and the other to a negative electrode terminal of the battery cell 1309 positioned on the most downstream side (on the low potential side) of the charge battery cell group. Note that the switching circuit 1305 can recognize the position of the charge battery cell group on the basis of the information contained in the control signal S2.

Figure 27:
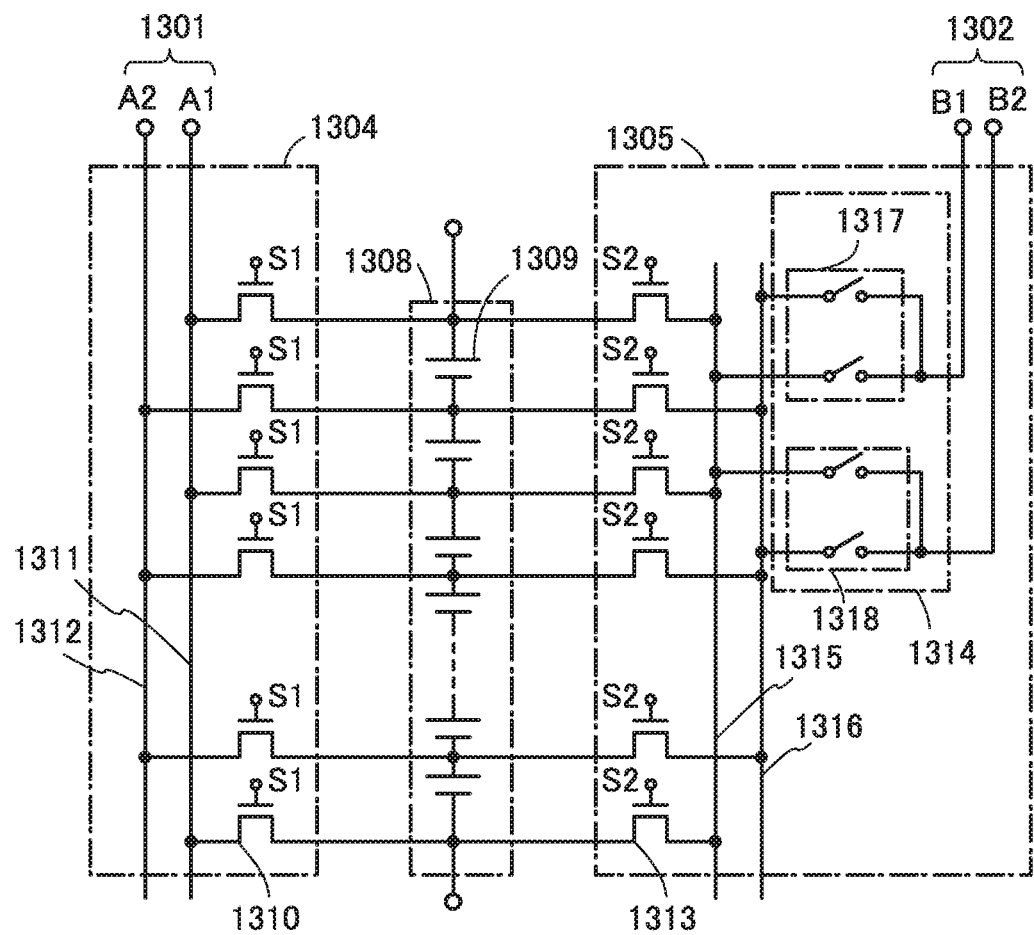
FIG. 27 is a circuit diagram illustrating one embodiment of the present invention.
Figure 28:
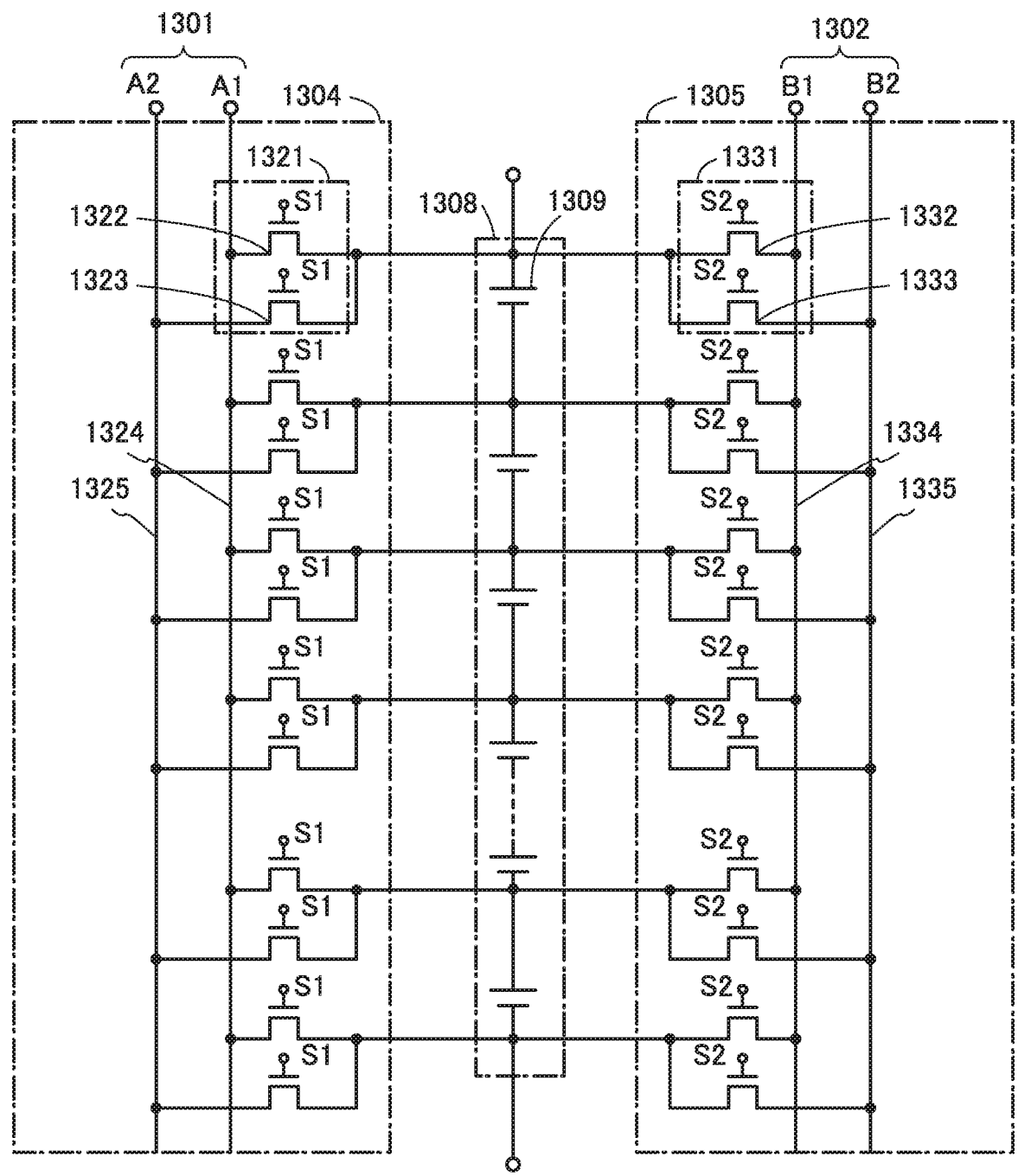
FIG. 28 is a circuit diagram illustrating one embodiment of the present invention.

FIG. 27 and FIG. 28 are circuit diagrams showing configuration examples of the switching circuits 1304 and 1305.

In FIG. 27, the switching circuit 1304 includes a plurality of transistors 1310, a bus 1311, and a bus 1312. The bus 1311 is connected to the terminal A1. The bus 1312 is connected to the terminal A2. Sources or drains of the transistors 1310 are connected alternately to the bus 1311 and the bus 1312. The drains or the sources of the transistors 1310 are each connected between two adjacent battery cells 1309.

The drain or the source of the transistor 1310 on the most upstream side is connected to a positive electrode terminal of the battery cell 1309 on the most upstream side of the battery portion 1308. The drain or the source the transistor 1310 on the most downstream side is connected to a negative electrode terminal of the battery cell 1309 on the most downstream side of the battery portion 1308.

The switching circuit 1304 connects the discharge battery cell group to the terminal pair 1301 by bringing one of a plurality of transistors 1310 which are connected to the bus 1311 and one of a plurality of transistors 1310 which are connected to the bus 1312 into an on state in response to the control signal S1 supplied to gates of the transistors 1310. Accordingly, the positive electrode terminal of the battery cell 1309 on the most upstream side of the discharge battery cell group is connected to one of the pair of terminals A1 and A2. In addition, the negative electrode terminal of the battery cell 1309 on the most downstream side of the discharge battery cell group is connected to the other of the pair of terminals A1 and A2 (i.e., a terminal which is not connected to the positive electrode terminal).

An OS transistor is preferably used as the transistor 1310. Since the off-state current of the OS transistor is low, the amount of electric charge leaking from a battery cell which does not belong to the discharge battery cell group can be reduced, and reduction in capacity over time can be suppressed. In addition, dielectric breakdown in the OS transistor at the time when a high voltage is applied is unlikely to occur. Therefore, the battery cell 1309 and the terminal pair 1301, which are connected to the transistor 1310 in an off state, can be insulated from each other even when an output voltage of the discharge battery cell group is high.

In FIG. 27, the switching circuit 1305 includes a plurality of transistors 1313, a current control switch 1314, a bus 1315, and a bus 1316. The bus 1315 and the bus 1316 are provided between the transistors 1313 and the current control switch 1314. Sources or drains of the transistors 1313 are connected alternately to the bus 1315 and the bus 1316. The drains or the sources of the transistors 1313 are each connected between two adjacent battery cells 1309.

The drain or the source of the transistor 1313 on the most upstream side is connected to the positive electrode terminal of the battery cell 1309 on the most upstream side of the battery portion 1308. The drain or the source of the transistor 1313 on the most downstream side is connected to the negative electrode terminal of the battery cell 1309 on the most downstream side of the battery portion 1308.

An OS transistor is preferably used as the transistor 1313 like the transistor 1310. Since the off-state current of the OS transistor is low, the amount of electric charge leaking from the battery cell which does not belong to the charge battery cell group can be reduced, and reduction in capacity over time can be suppressed. In addition, dielectric breakdown in the OS transistor at the time when a high voltage is applied is unlikely to occur. Therefore, the battery cell 1309 and the terminal pair 1302, which are connected to the transistor 1313 in an off state, can be insulated from each other even when charging voltage of the charge battery cell group is high.

The current control switch 1314 includes a switch pair 1317 and a switch pair 1318. Each of the switch pair 1317 and the switch pair 1318 is composed of a pair of switches. One end of the switch pair 1317 is connected to the terminal B1. The other end of the switch pair 1317 is divided into two switches. One switch is connected to the bus 1315, and the other switch is connected to the bus 1316. One end of the switch pair 1318 is connected to the terminal B2. The other end of the switch pair 1318 is divided into two switches. One switch is connected to the bus 1315, and the other switch is connected to the bus 1316.

OS transistors are preferably used for the switches included in the switch pair 1317 and the switch pair 1318 like the transistors 1310 and 1313.

The switching circuit 1305 controls the combination of on and off states of the transistors 1313 and the current control switch 1314 in response to the control signal S2 to connect the charge battery cell group and the terminal pair 1302.

The switching circuit 1305 connects the charge battery cell group and the terminal pair 1302 in the following manner, for example.

The switching circuit 1305 brings the transistor 1313 connected to the positive electrode terminal of the battery cell 1309 on the most upstream side of the charge battery cell group into an on state in response to the control signal S2 supplied to gates of the transistors 1313. In addition, the switching circuit 1305 brings the transistor 1313 connected to the negative electrode terminal of the battery cell 1309 on the most downstream side of the charge battery cell group into an on state in response to the control signal S2 supplied to the gates of the transistors 1313.

The polarities of voltages applied to the terminal pair 1302 might vary depending on the structures of the discharge battery cell group and the voltage transformer circuit 1307 connected to the terminal pair 1301. In order to supply current in a direction for charging the charge battery cell group, terminals with the same polarity need to be connected to each other in the terminal pair 1302 and the charge battery cell group. Thus, the current control switch 1314 is controlled by the control signal S2 so that the connection destination of the switch pair 1317 and that of the switch pair 1318 are changed depending on the polarities of the voltages applied to the terminal pair 1302.

The state where voltages are applied to the terminal pair 1302 so as to make the terminal B1 a positive electrode and the terminal B2 a negative electrode is described as an example. In the case where the battery cell 1309 on the most downstream side of the battery portion 1308 is in the charge battery cell group, the switch pair 1317 is controlled in response to the control signal S2 to be connected to the positive electrode terminal of the battery cell 1309. That is, the switch connected to the bus 1316 in the switch pair 1317 is turned on, and the switch connected to the bus 1315 in the switch pair 1317 is turned off. In contrast, the switch pair 1318 is controlled in response to the control signal S2 to be connected to the negative electrode terminal of the battery cell 1309 on the most downstream side of the battery portion 1308. That is, the switch connected to the bus 1315 in the switch pair 1318 is turned on, and the switch connected to the bus 1316 in the switch pair 1318 is turned off. In this manner, terminals with the same polarity are connected to each other in the terminal pair 1302 and the charge battery cell group. Accordingly, the current which flows from the terminal pair 1302 is controlled to be supplied in a direction for charging the charge battery cell group.

Instead of the switching circuit 1305, the switching circuit 1304 may include the current control switch 1314. In that case, the polarities of the voltages applied to the terminal pair 1302 are controlled by controlling the polarities of the voltages applied to the terminal pair 1301 in response to the operation of the current control switch 1314 and the control signal S1. Thus, the current control switch 1314 controls the direction of current which flows to the charge battery cell group from the terminal pair 1302.

FIG. 28 is a circuit diagram illustrating structure examples of the switching circuit 1304 and the switching circuit 1305 which are different from those in FIG. 27.

In FIG. 28, the switching circuit 1304 includes a plurality of transistor pairs 1321, a bus 1324, and a bus 1325. The bus 1324 is connected to the terminal A1. The bus 1325 is connected to the terminal A2. One end of each of the transistor pairs 1321 is divided into a transistor 1322 and a transistor 1323. A source or a drain of the transistor 1322 is connected to the bus 1324. A source or a drain of the transistor 1323 is connected to the bus 1325. In addition, the other end of each of the transistor pairs 1321 is connected between two adjacent battery cells 1309. The other end of the transistor pair 1321 on the most upstream side of the transistor pairs 1321 is connected to a positive electrode terminal of the battery cell 1309 on the most upstream side of the battery portion 1308. The other end of the transistor pair 1321 on the most downstream side of the transistor pairs 1321 is connected to a negative electrode terminal of the battery cell 1309 on the most downstream side of the battery portion 1308.

The switching circuit 1304 switches the connection destination of the transistor pair 1321 to one of the terminal A1 and the terminal A2 by turning on or off the transistors 1322 and 1323 in response to the control signal S1. Specifically, when the transistor 1322 is turned on, the transistor 1323 is turned off, in which case the connection destination of the transistor pair 1321 is the terminal A1. In contrast, when the transistor 1323 is turned on, the transistor 1322 is turned off, in which case the connection destination of the transistor pair 1321 is the terminal A2. Which of the transistors 1322 and 1323 is turned on is determined by the control signal S1.

Two transistor pairs 1321 are used to connect the terminal pair 1301 and the discharge battery cell group. Specifically, the connection destinations of the two transistor pairs 1321 are determined on the basis of the control signal S1, and the discharge battery cell group and the terminal pair 1301 are connected to each other. The connection destinations of the two transistor pairs 1321 are controlled by the control signal S1 so that one of the connection destinations is the terminal A1 and the other is the terminal A2.

The switching circuit 1305 includes a plurality of transistor pairs 1331, a bus 1334, and a bus 1335. The bus 1334 is connected to the terminal B1. The bus 1335 is connected to the terminal B2. One end of each of the transistor pairs 1331 is divided into a transistor 1332 and a transistor 1333. A part of the one end connected to the transistor 1332 is connected to the bus 1334. The other part of the one end connected to the transistor 1333 is connected to the bus 1335. The other end of each of the transistor pairs 1331 is connected between two adjacent battery cells 1309. The other end of the transistor pair 1331 on the most upstream side of the transistor pairs 1331 is connected to the positive electrode terminal of the battery cell 1309 on the most upstream side of the battery portion 1308. The other end of the transistor pair 1331 on the most downstream side of the transistor pairs 1331 is connected to the negative electrode terminal of the battery cell 1309 on the most downstream side of the battery portion 1308.

The switching circuit 1305 switches the connection destination of the transistor pair 1331 to one of the terminal B1 and the terminal B2 by turning on or off the transistors 1332 and 1333 in response to the control signal S2. Specifically, when the transistor 1332 is turned on, the transistor 1333 is turned off, in which case the connection destination of the transistor pair 1331 is the terminal B1. In contrast, when the transistor 1333 is turned on, the transistor 1332 is turned off, in which case the connection destination of the transistor pair 1331 is the terminal B2. Which of the transistors 1332 and 1333 is turned on is determined by the control signal S2.

Two transistor pairs 1331 are used to connect the terminal pair 1302 and the charge battery cell group. Specifically, the connection destinations of the two transistor pairs 1331 are determined on the basis of the control signal S2, and the charge battery cell group and the terminal pair 1302 are connected to each other. The connection destinations of the two transistor pairs 1331 are controlled by the control signal S2 so that one of the connection destinations is the terminal B1 and the other is the terminal B2.

The connection destinations of the two transistor pairs 1331 are determined by the polarities of the voltages applied to the terminal pair 1302. Specifically, in the case where voltages which make the terminal B1 a positive electrode and the terminal B2 a negative electrode are applied to the terminal pair 1302, the transistor pair 1331 on the upstream side is controlled by the control signal S2 so that the transistor 1332 is turned on and the transistor 1333 is turned off while the transistor pair 1331 on the downstream side is controlled by the control signal S2 so that the transistor 1333 is turned on and the transistor 1332 is turned off. In the case where voltages which make the terminal B1 a negative electrode and the terminal B2 a positive electrode is applied to the terminal pair 1302, the transistor pair 1331 on the upstream side is controlled by the control signal S2 so that the transistor 1333 is turned on and the transistor 1332 is turned off while the transistor pair 1331 on the downstream side is controlled by the control signal S2 so that the transistor 1332 is turned on and the transistor 1333 is turned off. In this manner, terminals with the same polarity are connected to each other in the terminal pair 1302 and the charge battery cell group. Accordingly, the current which flows from the terminal pair 1302 is controlled to be supplied in a direction for charging the charge battery cell group.

The voltage transformation control circuit 1306 controls operation of the voltage transformer circuit 1307. The voltage transformation control circuit 1306 generates a voltage transformation signal S3 for controlling the operation of the voltage transformer circuit 1307 on the basis of the number of the battery cells 1309 included in the discharge battery cell group and the number of the battery cells 1309 included in the charge battery cell group and outputs the voltage transformation signal S3 to the voltage transformer circuit 1307.

In the case where the discharge battery cell group includes more battery cells 1309 than the charge battery cell group, it is necessary to prevent excessive application of charging voltage to the charge battery cell group. Thus, the voltage transformation control circuit 1306 outputs the voltage transformation signal S3 for controlling the voltage transformer circuit 1307 so that a discharging voltage (Vdis) is lowered within a range where the charge battery cell group can be charged.

In the case where the number of the battery cells 1309 included in the discharge battery cell group is less than or equal to the number of the battery cells 1309 included in the charge battery cell group, a voltage necessary for charging the charge battery cell group needs to be secured. Therefore, the voltage transformation control circuit 1306 outputs the voltage transformation signal S3 for controlling the voltage transformer circuit 1307 so that the discharging voltage (Vdis) is raised within a range where excessive charging voltage is not applied to the charge battery cell group.

The voltage value of the excessive charging voltage is determined in the light of product specifications and the like of the battery cell 1309 used in the battery portion 1308. The voltage which is raised or lowered by the voltage transformer circuit 1307 is applied as a charging voltage (Vcha) to the terminal pair 1302.

Figure 29A:
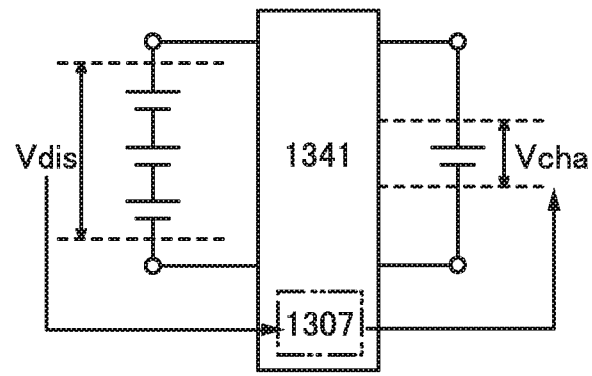
FIGS. 29A to 29C are conceptual diagrams each illustrating one embodiment of the present invention.
Figure 29B:
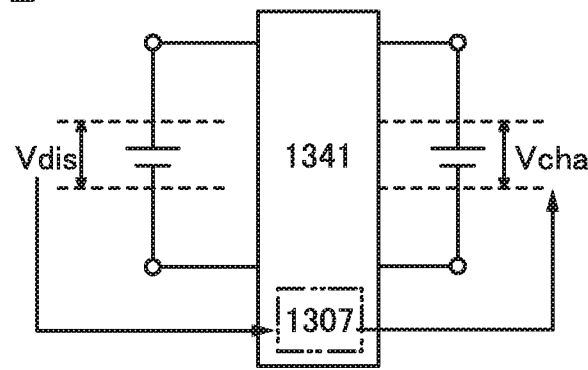
Figure 29C:
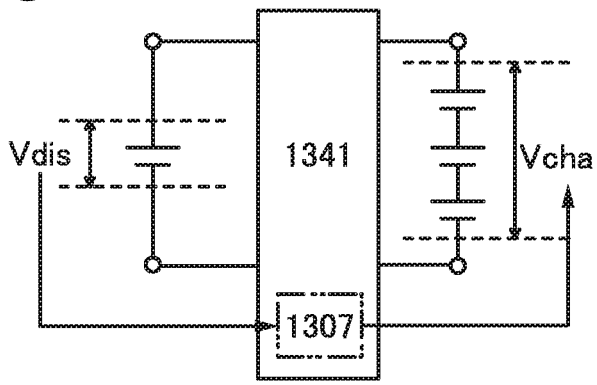

Here, operation examples of the voltage transformation control circuit 1306 in this embodiment are described with reference to FIGS. 29A to 29C. FIGS. 29A to 29C are conceptual diagrams for explaining the operation examples of the voltage transformation control circuit 1306 which controls the discharge battery cell group and the charge battery cell group illustrated in FIGS. 26A to 26C. FIGS. 29A to 29C each illustrate a battery management unit 1341. The battery management unit 1341 includes, as described above, the terminal pair 1301, the terminal pair 1302, the switching control circuit 1303, the switching circuit 1304, the switching circuit 1305, the voltage transformation control circuit 1306, and the voltage transformer circuit 1307.

In an example illustrated in FIG. 29A, the three consecutive high-voltage cells a to c and one low-voltage cell d are connected in series as described with reference to FIG. 26A. In that case, as described using FIG. 26A, the switching control circuit 1303 determines the high-voltage cells a to c as the discharge battery cell group and the low-voltage cell d as the charge battery cell group. The voltage transformation control circuit 1306 calculates a conversion ratio N for converting the discharging voltage (Vdis) to the charging voltage (Vcha) on the basis of the ratio of the number of the battery cells 1309 included in the charge battery cell group to the number of the battery cells 1309 included in the discharge battery cell group.

In the case where the discharge battery cell group includes more battery cells 1309 than in the charge battery cell group, when a discharging voltage is applied to the terminal pair 1302 without transforming the voltage, overvoltage may be applied to the battery cells 1309 included in the charge battery cell group through the terminal pair 1302. Thus, in the case of FIG. 29A, it is necessary that a charging voltage (Vcha) applied to the terminal pair 1302 be lower than the discharging voltage. In addition, in order to charge the charge battery cell group, it is necessary that the charging voltage be higher than the total voltage of the battery cells 1309 included in the charge battery cell group. Thus, the transformation control circuit 1306 sets the conversion ratio N larger than the ratio of the number of the battery cells 1309 included in the charge battery cell group to the number of the battery cells 1309 included in the discharge battery cell group.

Thus, the voltage transformation control circuit 1306 preferably sets the conversion ratio N larger than the ratio of the number of the battery cells 1309 included in the charge battery cell group to the number of the battery cells 1309 included in the discharge battery cell group by approximately 1% to 10%. Here, the charging voltage is made larger than the voltage of the charge battery cell group, but actual charging voltage is equal to the voltage of the charge battery cell group. Note that the voltage transformation control circuit 1306 feeds a current for charging the charge battery cell group in accordance with the conversion ratio N in order to make the voltage of the charge battery cell group equal to the charging voltage. The value of the current is set by the voltage transformation control circuit 1306.

Since three battery cells 1309 are included in the discharge battery cell group and one battery cell 1309 is included in the charge battery cell group in the example illustrated in FIG. 29A, the voltage transformation control circuit 1306 calculates a value which is slightly greater than ⅓ as the conversion ratio N. Then, the voltage transformation control circuit 1306 outputs the voltage transformation signal S3, which lowers the discharging voltage in accordance with the conversion ratio N and converts the voltage into a charging voltage, to the voltage transformer circuit 1307. The voltage transformer circuit 1307 applies the charging voltage which is transformed in response to the voltage transformation signal S3 to the terminal pair 1302. Then, the battery cells 1309 included in the charge battery cell group are charged with the charging voltage applied to the terminal pair 1302.

In each of examples illustrated in FIGS. 29B and 29C, the conversion ratio N is calculated in a manner similar to that of FIG. 29A. In each of the examples illustrated in FIGS. 29B and 29C, since the number of the battery cells 1309 included in the discharge battery cell group is less than or equal to the number of the battery cells 1309 included in the charge battery cell group, the conversion ratio N is greater than or equal to 1. Therefore, in this case, the voltage transformation control circuit 1306 outputs the voltage transformation signal S3 for raising the discharging voltage and converting the voltage into the charging voltage.

The voltage transformer circuit 1307 converts the discharging voltage applied to the terminal pair 1301 into a charging voltage on the basis of the voltage transformation signal S3. The voltage transformer circuit 1307 applies the converted charging voltage to the terminal pair 1302. Here, the voltage transformer circuit 1307 electrically insulates the terminal pair 1301 from the terminal pair 1302. Accordingly, the voltage transformer circuit 1307 prevents a short circuit due to a difference between the absolute voltage of the negative electrode terminal of the battery cell 1309 on the most downstream side of the discharge battery cell group and the absolute voltage of the negative electrode terminal of the battery cell 1309 on the most downstream side of the charge battery cell group. Furthermore, the voltage transformer circuit 1307 converts the discharging voltage, which is the total voltage of the discharge battery cell group, into the charging voltage on the basis of the voltage transformation signal S3, as described above.

An insulated direct current-direct current (DCDC) converter or the like can be used in the voltage transformer circuit 1307. In that case, the voltage transformation control circuit 1306 outputs a signal for controlling the on/off ratio (duty ratio) of the insulated DCDC converter as the voltage transformation signal S3 to control the charging voltage converted by the voltage transformer circuit 1307.

Examples of the insulated DCDC converter include a flyback converter, a forward converter, a ringing choke converter (RCC), a push-pull converter, a half-bridge converter, and a full-bridge converter. A suitable converter is selected in accordance with the intended output voltage.

Figure 30:
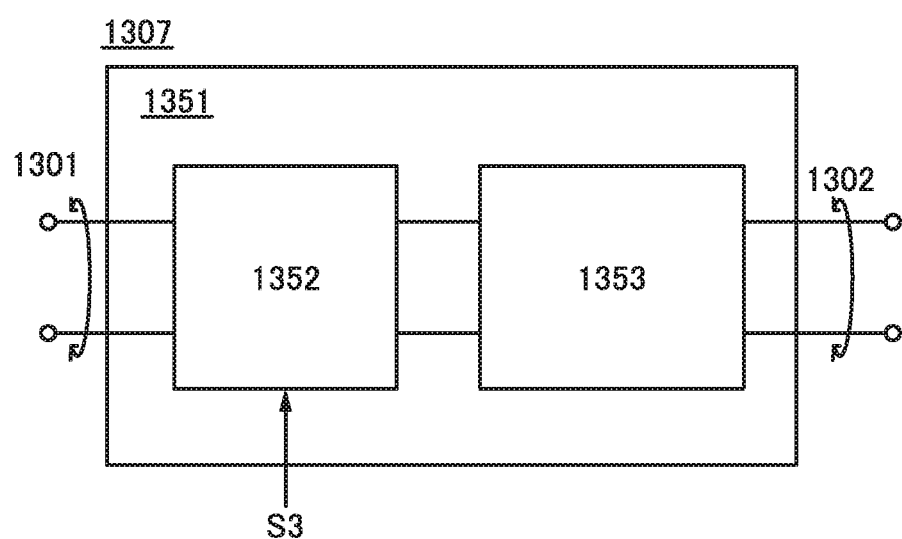
FIG. 30 is a block diagram illustrating one embodiment of the present invention.

The structure of the voltage transformer circuit 1307 including the insulated DCDC converter is illustrated in FIG. 30. An insulated DCDC converter 1351 includes a switch portion 1352 and a transformer 1353. The switch portion 1352 is a switch for switching on/off the insulated DCDC converter, and a metal oxide semiconductor field-effect transistor (MOSFET), a bipolar transistor, or the like is used as the switch portion 1352. The switch portion 1352 periodically turns on and off the insulated DCDC converter 1351 in accordance with the voltage transformation signal S3 which is output from the voltage transformation control circuit 1306 and is for controlling the on/off ratio. The switch portion 1352 can have any of various structures depending on the type of the insulated DCDC converter which is used. The transformer 1353 converts the discharging voltage applied from the terminal pair 1301 into the charging voltage. In detail, the transformer 1353 operates in conjunction with the on/off state of the switch portion 1352 and converts the discharging voltage into the charging voltage in accordance with the on/off ratio of the switch portion 1352. The charging voltage is increased as a period during which the switch portion 1352 is on becomes longer in its switching period, while is decreased as a period during which the switch portion 1352 is on becomes shorter in its switching period. In the case of using the insulated DCDC converter, the terminal pair 1301 and the terminal pair 1302 can be insulated from each other inside the transformer 1353.

Figure 31:
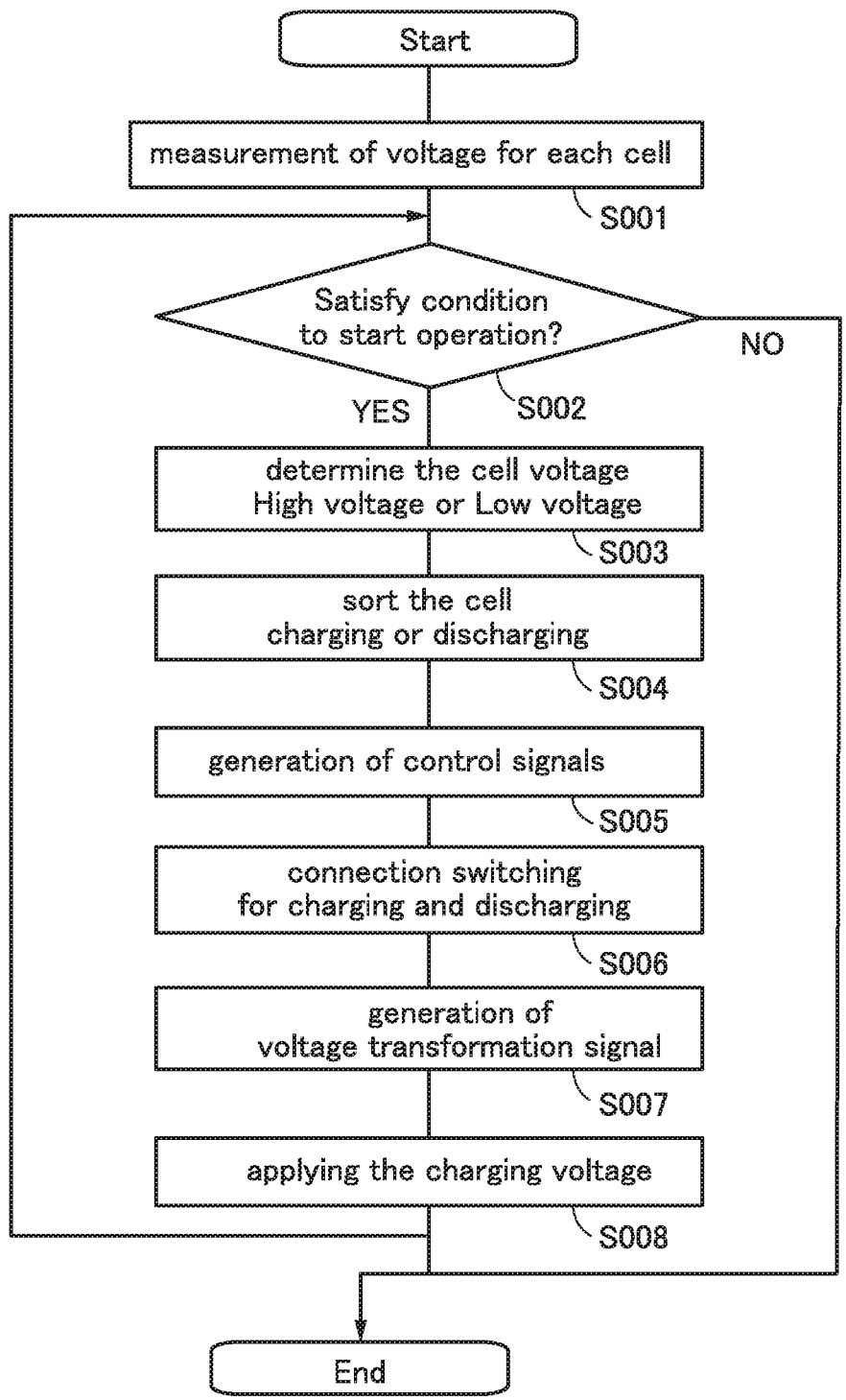
FIG. 31 is a flow chart illustrating one embodiment of the present invention.

A flow of operation of the power storage device 1300 of this embodiment is described with reference to FIG. 31. FIG. 31 is a flow chart illustrating the operation of the power storage device 1300.

First, the power storage device 1300 obtains a voltage measured for each of the battery cells 1309 (Step S001). Then, the power storage device 1300 determines whether or not the condition for starting the operation of reducing variation in voltages of the battery cells 1309 is satisfied (Step S002). An example of the condition can be that the difference between the maximum value and the minimum value of the voltage measured for each of the battery cells 1309 is higher than or equal to the predetermined threshold value. In the case where the condition is not satisfied (Step S002: NO), the power storage device 1300 does not perform the subsequent steps because voltages of the battery cells 1309 are well balanced. In contrast, in the case where the condition is satisfied (Step S002: YES), the power storage device 1300 performs the operation of reducing variation in the voltages of the battery cells 1309. In this operation, the power storage device 1300 determines whether each battery cell 1309 is a high-voltage cell or a low-voltage cell on the basis of the measured voltage of each cell (Step S003). Then, the power storage device 1300 determines a discharge battery cell group and a charge battery cell group on the basis of the determination result (Step S004). In addition, the power storage device 1300 generates the control signal S1 for setting the determined discharge battery cell group as the connection destination of the terminal pair 1301, and the control signal S2 for setting the determined charge battery cell group as the connection determination of the terminal pair 1302 (Step S005). The power storage device 1300 outputs the generated control signals S1 and S2 to the switching circuit 1304 and the switching circuit 1305, respectively. Then, the switching circuit 1304 connects the terminal pair 1301 and the discharge battery cell group, and the switching circuit 1305 connects the terminal pair 1302 and the discharge battery cell group (Step S006). The power storage device 1300 generates the voltage transformation signal S3 on the basis of the number of the battery cells 1309 included in the discharge battery cell group and the number of the battery cells 1309 included in the charge battery cell group (Step S007). Then, the power storage device 1300 converts the discharging voltage applied to the terminal pair 1301 into a charging voltage on the basis of the voltage transformation signal S3 and applies the charging voltage to the terminal pair 1302 (Step S008). In this manner, an electric charge of the discharge battery cell group is transferred to the charge battery cell group.

Although a plurality of steps are shown in order in the flow chart of FIG. 31, the execution order of the steps is not limited to the order.

With this embodiment, unlike in the a capacitor type circuit, a structure for temporarily storing an electric charge from the discharge battery cell group and then sending the stored electric charge to the charge battery cell group is unnecessary to transfer an electric charge from the discharge battery cell group to the charge battery cell group. In addition, the switching circuit 1304 and the switching circuit 1305 determine which battery cell in the discharge battery cell group and the charge battery cell group to be connected to the transformer circuit.

Furthermore, the voltage transformer circuit 1307 converts the discharging voltage applied to the terminal pair 1301 into the charging voltage on the basis of the number of the battery cells 1309 included in the discharge battery cell group and the number of the battery cells 1309 included in the charge battery cell group, and applies the charging voltage to the terminal pair 1302. Thus, even when any battery cell 1309 is selected as the discharge battery cell group and the charge battery cell group, an electric charge can be transferred without any problems.

Furthermore, the use of OS transistors as the transistor 1310 and the transistor 1313 can reduce the amount of electric charge leaking from the battery cell 1309 which does not belong to the charge battery cell group or the discharge battery cell group. Accordingly, a decrease in capacity of the battery cell 1309 which does not contribute to charging or discharging can be suppressed. In addition, since the variation in characteristics of the OS transistor due to heat is smaller than that of a Si transistor, an operation such as turning on or off the transistors in response to the control signals S1 and S2 can be performed normally even when the temperature of the battery cells 1309 is increased.

This application is based on Japanese Patent Application serial no. 2015-034223 filed with Japan Patent Office on Feb. 24, 2015, the entire contents of which are hereby incorporated by reference.

What is claimed is:

1. A manufacturing method of an electrode, comprising the steps of:
    putting a first electrode, a second electrode and a third electrode in an electrolyte solution;
    applying a first potential to the first electrode in the electrolyte solution; and
    applying a second potential to the second electrode and a third potential to the third electrode after applying the first potential to the first electrode,
    wherein the electrolyte solution comprises a lithium ion and an ion of an alkali metal element other than lithium,
    wherein the first potential is higher than or equal to a lithium equilibrium potential and lower than an equilibrium potential of the alkali metal element,
    wherein the second potential is lower than the third potential, and
    wherein a metal of the alkali metal element other than lithium is deposited during the application of the first potential.

2. The manufacturing method, according to claim 1, wherein the alkali metal element other than lithium is sodium or potassium.

3. The manufacturing method according to claim 1,
    wherein the first electrode comprises the alkali metal element other than lithium, and
    wherein the second electrode comprises a lithium metal.

4. The manufacturing method according to claim 1, wherein the third electrode comprises an active material particle.

5. The manufacturing method according to claim 4, wherein the active material particle is a positive electrode active material particle.

6. The manufacturing method according to claim 1,
    wherein a lithium metal is deposited during the application of the second potential and the third potential, and
    wherein current flows from the second electrode to the third electrode during the application of the second potential and the third potential.

7. The manufacturing method according to claim 1, wherein current flows from the first electrode to the second electrode during the application of the first potential.

8. The manufacturing method according to claim 1,
    wherein the alkali metal element other than lithium is deposited on a surface of the first electrode during the application of the first potential, and
    wherein the alkali metal element other than lithium deposited on the surface of the first electrode reacts with an impurity during the application of the second potential and the third potential.

9. A manufacturing method of a secondary battery, comprising the steps of:
    putting a first electrode, a second electrode and a third electrode in a first electrolyte solution, the third electrode comprising a positive electrode active material layer or a negative electrode active material layer;
    applying a first potential to the first electrode;
    applying a second potential to the second electrode and a third potential to the third electrode in the first electrolyte solution to cause an electrochemical reaction after applying the first potential;
    packing a stack including the third electrode and a fourth electrode in a region surrounded by an exterior body having an opening after applying the second potential and the third potential;
    putting a second electrolyte solution into the region surrounded by the exterior body after packing the stack; and
    closing the opening of the exterior body after putting the second electrolyte solution,
    wherein the fourth electrode comprises an active material layer,
    wherein the first electrolyte solution comprises a lithium ion and an ion of an alkali metal element other than lithium, and
    wherein a metal of the alkali metal element other than lithium is deposited during the application of the first potential.

10. The manufacturing method according to claim 9, wherein the fourth electrode comprises a negative electrode active material.

11. The manufacturing method according to claim 9,
    wherein the alkali metal element other than lithium is deposited on a surface of the first electrode during the application of the first potential, and
    wherein the alkali metal element other than lithium deposited on the surface of the first electrode reacts with an impurity during the application of the second potential and the third potential.

12. The manufacturing method according to claim 9,
    wherein a lithium metal is deposited during the application of the second potential and the third potential, and
    wherein current flows from the second electrode to the third electrode during the application of the second potential and the third potential.

* * * * *